(12) United States Patent
Guevara et al.

(10) Patent No.: US 7,964,272 B2
(45) Date of Patent: *Jun. 21, 2011

(54) LIGHTWEIGHT COMPOSITIONS AND ARTICLES CONTAINING SUCH

(75) Inventors: Tricia Guevara, Koppel, PA (US); Michael T. Williams, Beaver Falls, PA (US); David A. Cowan, Cranberry Township, PA (US); John K. Madish, Negley, OH (US); Kolapo Adewale, Moon Township, PA (US); Roger Moore, Columbia, TN (US); Jay Bowman, Florence, KY (US)

(73) Assignee: NOVA Chemicals Inc., Moon Township, PA (US)

( * ) Notice: Subject to any disclaimer, the term of this patent is extended or adjusted under 35 U.S.C. 154(b) by 473 days.

This patent is subject to a terminal disclaimer.

(21) Appl. No.: 11/931,401

(22) Filed: Oct. 31, 2007

(65) Prior Publication Data

US 2008/0057290 A1 Mar. 6, 2008

Related U.S. Application Data

(63) Continuation of application No. 11/361,654, filed on Feb. 24, 2006, now Pat. No. 7,666,258.

(60) Provisional application No. 60/656,596, filed on Feb. 25, 2005, provisional application No. 60/664,230, filed on Mar. 22, 2005, provisional application No. 60/686,858, filed on Jun. 2, 2005, provisional application No. 60/728,839, filed on Oct. 21, 2005.

(51) Int. Cl.
*B32B 3/26* (2006.01)
*C04B 16/08* (2006.01)

(52) U.S. Cl. ........... 428/312.4; 106/672; 106/677
(58) Field of Classification Search .......... 428/312.4; 106/672, 677

See application file for complete search history.

(56) References Cited

U.S. PATENT DOCUMENTS 2,983,692 A 5/1961 D'Alelio
(Continued)

FOREIGN PATENT DOCUMENTS

DE 203 16 376 U1 2/2004
(Continued)

OTHER PUBLICATIONS

Sri Ravindrarajah, R. and Sivakumar, R., "Effect of Polystyrene Particle Shape on the Properties of Lightweight Aggregate Concrete", Proceedings of the South African Conference on Polymers in Concrete, Jul. 2000, Kruger National Park, South Africa, pp. 195-203.

(Continued)

*Primary Examiner* — Hai Vo
(74) *Attorney, Agent, or Firm* — Gary F. Matz

(57) ABSTRACT

A lightweight cementitious composition containing from 22 to 90 volume percent of a cement composition and from 10 to 78 volume percent of particles having an average particle diameter of from 0.2 mm to 8 mm, a bulk density of from 0.03 g/cc to 0.64 g/cc, an aspect ratio of from 1 to 3, where after the lightweight cementitious composition is set it has a compressive strength of at least 1700 psi as tested according to ASTM C39. The cementitious composition can be used to make concrete masonry units, construction panels, road beds and other articles and can be included as a layer on wall panels and floor panels and can be used in insulated concrete forms. Aspects of the lightweight cementitious composition can be used to make lightweight structural units.

6 Claims, 21 Drawing Sheets

U.S. PATENT DOCUMENTS

| | | |
|---|---|---|
| 3,021,291 A | 2/1962 | Thiessen |
| 3,023,175 A | 2/1962 | Rodman, Jr. |
| 3,214,292 A | 10/1965 | Sefton |
| 3,214,393 A | 10/1965 | Sefton |
| 3,257,338 A | 6/1966 | Sefton |
| 3,272,765 A | 9/1966 | Sefton |
| 3,547,412 A | 12/1970 | Klages |
| 3,788,020 A | 1/1974 | Gregori |
| 3,869,295 A | 3/1975 | Bowles et al. |
| 4,026,723 A | 5/1977 | Grof et al. |
| 4,094,110 A | 6/1978 | Dickens et al. |
| 4,157,640 A | 6/1979 | Joannes |
| 4,223,501 A | 9/1980 | Delozier |
| 4,241,555 A | 12/1980 | Dickens et al. |
| 4,250,674 A | 2/1981 | Feist |
| 4,265,964 A | 5/1981 | Burkhart |
| 4,267,135 A | 5/1981 | Stroud et al. |
| 4,268,236 A | 5/1981 | Peille |
| 4,298,394 A | 11/1981 | Leeming et al. |
| 4,303,756 A | 12/1981 | Kajimura et al. |
| 4,303,757 A | 12/1981 | Kajimura et al. |
| 4,332,754 A | 6/1982 | Meunier et al. |
| 4,348,164 A | 9/1982 | Fujii et al. |
| 4,354,810 A | 10/1982 | Stidham |
| 4,376,741 A | 3/1983 | Stenzel |
| 4,379,107 A | 4/1983 | Berner |
| 4,382,759 A | 5/1983 | Vassalli |
| 4,399,086 A | 8/1983 | Walter |
| 4,412,961 A | 11/1983 | DiBlasi et al. |
| 4,435,345 A | 3/1984 | Colombo |
| 4,447,382 A | 5/1984 | Spurlock et al. |
| 4,485,059 A | 11/1984 | Krutchen et al. |
| 4,486,369 A | 12/1984 | Schafler et al. |
| 4,487,731 A | 12/1984 | Kobayashi |
| 4,489,023 A | 12/1984 | Proksa |
| 4,492,664 A | 1/1985 | Bruno |
| 4,498,660 A | 2/1985 | Brema et al. |
| 4,504,429 A | 3/1985 | Griffiths |
| 4,507,255 A | 3/1985 | Shizawa |
| 4,518,550 A | 5/1985 | Miettinen et al. |
| 4,530,806 A | 7/1985 | Melchior |
| 4,551,958 A | 11/1985 | Reneault et al. |
| 4,559,003 A | 12/1985 | Poncet |
| 4,564,487 A | 1/1986 | Bennett |
| 4,567,008 A | 1/1986 | Griffiths |
| 4,572,865 A | 2/1986 | Gluck et al. |
| 4,581,186 A | 4/1986 | Larson |
| 4,585,603 A | 4/1986 | Furuta et al. |
| 4,607,061 A | 8/1986 | Schmidt |
| 4,641,468 A | 2/1987 | Slater |
| 4,653,718 A | 3/1987 | Dickens |
| 4,666,393 A | 5/1987 | Kumasaka et al. |
| 4,685,872 A | 8/1987 | Erlenbach |
| 4,725,632 A | 2/1988 | Vess |
| 4,756,860 A | 7/1988 | Hooper et al. |
| 4,761,256 A | 8/1988 | Hardenbrook et al. |
| 4,783,287 A | 11/1988 | Eichberger et al. |
| 4,832,885 A | 5/1989 | Gross |
| 4,884,382 A | 12/1989 | Horobin |
| 4,885,888 A | 12/1989 | Young |
| 4,889,310 A | 12/1989 | Boeshart |
| 4,895,598 A * | 1/1990 | Hedberg et al. ............... 106/694 |
| 4,911,628 A | 3/1990 | Heilmayr et al. |
| 4,946,504 A | 8/1990 | Hodson |
| 4,953,334 A | 9/1990 | Dickens |
| 4,956,133 A | 9/1990 | Payne |
| 4,972,646 A | 11/1990 | Miller et al. |
| 4,981,427 A | 1/1991 | Prignitz |
| 5,067,298 A | 11/1991 | Petersen |
| D323,222 S | 1/1992 | Roland |
| 5,087,185 A | 2/1992 | Yada et al. |
| 5,140,794 A | 8/1992 | Miller |
| 5,187,905 A | 2/1993 | Pourtau et al. |
| 5,211,751 A | 5/1993 | Arfaei et al. |
| 5,229,138 A | 7/1993 | Carotti |
| 5,333,429 A | 8/1994 | Cretti |
| 5,375,988 A | 12/1994 | Klahre |
| 5,388,975 A | 2/1995 | Proksa et al. |
| 5,390,459 A | 2/1995 | Mensen |
| 5,411,389 A | 5/1995 | Kellerhof et al. |
| 5,414,972 A | 5/1995 | Ruiz et al. |
| D360,700 S | 7/1995 | Myers et al. |
| 5,454,199 A | 10/1995 | Blom et al. |
| 5,459,971 A | 10/1995 | Sparlman |
| 5,474,722 A | 12/1995 | Woodhams |
| RE35,194 E | 4/1996 | Gerber |
| 5,505,599 A | 4/1996 | Kemerer et al. |
| 5,512,222 A | 4/1996 | Sabol et al. |
| 5,524,400 A | 6/1996 | Schmechel |
| D373,836 S | 9/1996 | Bado et al. |
| 5,566,518 A | 10/1996 | Martin et al. |
| 5,568,710 A | 10/1996 | Smith et al. |
| 5,570,552 A | 11/1996 | Nehring |
| 5,580,378 A | 12/1996 | Shulman |
| 5,582,840 A | 12/1996 | Pauw et al. |
| 5,587,182 A | 12/1996 | Sulzbach et al. |
| 5,620,710 A | 4/1997 | Florentini et al. |
| 5,622,556 A | 4/1997 | Shulman |
| 5,625,989 A | 5/1997 | Brubaker et al. |
| 5,629,027 A | 5/1997 | Florentini et al. |
| 5,639,483 A | 6/1997 | Florentini et al. |
| 5,643,510 A | 7/1997 | Succh |
| 5,657,600 A | 8/1997 | Mensen |
| 5,665,286 A | 9/1997 | Sulzbach et al. |
| 5,665,287 A | 9/1997 | Florentini et al. |
| 5,701,710 A | 12/1997 | Tremelling |
| 5,709,060 A | 1/1998 | Vaughan et al. |
| 5,725,652 A | 3/1998 | Shulman |
| 5,749,960 A | 5/1998 | Belyayev |
| 5,771,648 A | 6/1998 | Miller et al. |
| 5,784,850 A | 7/1998 | Elderson |
| 5,787,665 A | 8/1998 | Carlin et al. |
| 5,792,481 A | 8/1998 | Cretti |
| 5,798,064 A | 8/1998 | Peterson |
| D399,010 S | 9/1998 | Current |
| 5,804,113 A | 9/1998 | Blackwell et al. |
| 5,809,725 A | 9/1998 | Cretti |
| 5,809,727 A | 9/1998 | Mensen |
| 5,809,728 A | 9/1998 | Tremeling |
| 5,822,940 A | 10/1998 | Carlin et al. |
| D401,361 S | 11/1998 | Mitchell |
| 5,844,015 A | 12/1998 | Steilen et al. |
| 5,845,449 A | 12/1998 | Vaughan et al. |
| 5,852,907 A | 12/1998 | Tobin et al. |
| 5,853,634 A | 12/1998 | Ont Kean |
| D406,360 S | 3/1999 | Finkell, Jr. |
| 5,890,337 A | 4/1999 | Boeshart |
| 5,896,714 A | 4/1999 | Cymbala et al. |
| D411,628 S | 6/1999 | Dyer |
| 5,913,791 A | 6/1999 | Balkwin |
| 5,945,048 A | 8/1999 | Ensinger |
| D414,275 S | 9/1999 | Azar |
| 5,966,885 A | 10/1999 | Chatelain |
| D418,926 S | 1/2000 | Owens et al. |
| D419,697 S | 1/2000 | Kroesbergen |
| 6,021,618 A | 2/2000 | Elderson |
| 6,030,446 A | 2/2000 | Dity et al. |
| D422,094 S | 3/2000 | Wolfrum |
| 6,036,898 A | 3/2000 | Sulzbach et al. |
| RE36,674 E | 4/2000 | Gluck et al. |
| 6,045,350 A | 4/2000 | Cretti |
| 6,098,367 A | 8/2000 | Fridman et al. |
| 6,119,418 A | 9/2000 | Johnson |
| 6,127,439 A | 10/2000 | Berghmans |
| 6,147,133 A | 11/2000 | Sulzbach et al. |
| 6,160,027 A | 12/2000 | Crevevoeur et al. |
| RE37,012 E | 1/2001 | Fiorentini et al. |
| 6,167,624 B1 | 1/2001 | Lanahan et al. |
| 6,170,220 B1 | 1/2001 | Moore, Jr. |
| 6,178,711 B1 | 1/2001 | Laird et al. |
| RE37,075 E | 2/2001 | Florentini et al. |
| D437,644 S | 2/2001 | Russo |
| RE37,115 E | 3/2001 | Florentini et al. |
| 6,202,375 B1 | 3/2001 | Kleinschmidt |
| 6,206,669 B1 | 3/2001 | Lewit et al. |
| D440,327 S | 4/2001 | Keating et al. |
| 6,226,943 B1 | 5/2001 | Grinshpun et al. |

| | | |
|---|---|---|
| 6,230,462 B1 | 5/2001 | Be'livean |
| 6,233,892 B1 | 5/2001 | Tylman |
| 6,235,367 B1 | 5/2001 | Holmes et al. |
| 6,242,540 B1 | 6/2001 | Crevevoeur et al. |
| 6,250,024 B1 | 6/2001 | Sculthorpe et al. |
| 6,264,734 B1 | 7/2001 | Dickens |
| 6,272,749 B1 | 8/2001 | Boeshart et al. |
| D449,392 S | 10/2001 | Kulik |
| 6,298,622 B1 | 10/2001 | Cretti |
| 6,301,854 B1 | 10/2001 | Daudet et al. |
| 6,314,694 B1 | 11/2001 | Cooper et al. |
| 6,314,697 B1 | 11/2001 | Moore, Jr. |
| 6,318,040 B1 | 11/2001 | Moore, Jr. |
| 6,322,651 B1 | 11/2001 | Phelps |
| 6,336,301 B1 | 1/2002 | Moore, Jr. |
| 6,350,308 B1 | 2/2002 | Dickens |
| D455,843 S | 4/2002 | Albany et al. |
| 6,378,260 B1 | 4/2002 | William Sun et al. |
| 6,385,942 B1 | 5/2002 | Grossman et al. |
| 6,412,243 B1 | 7/2002 | Sutelan |
| 6,418,687 B1 | 7/2002 | Cox |
| 6,438,918 B2 | 8/2002 | Moore, Jr. |
| 6,444,073 B1 | 9/2002 | Reeves et al. |
| 6,481,178 B2 | 11/2002 | Moore, Jr. |
| 6,494,012 B2 | 12/2002 | Seng |
| D469,885 S | 2/2003 | Zen |
| D470,602 S | 2/2003 | Pate |
| 6,530,185 B1 | 3/2003 | Scott et al. |
| 6,531,077 B1 | 3/2003 | Flarup-Knudsen |
| 6,537,054 B2 | 3/2003 | Kitahama et al. |
| 6,647,686 B2 | 11/2003 | Dunn et al. |
| 6,655,944 B2 | 12/2003 | Massarotto et al. |
| 6,662,503 B2 | 12/2003 | Cowell et al. |
| D487,317 S | 3/2004 | Guertin |
| 6,701,684 B2 | 3/2004 | Stadter |
| 6,708,460 B1 | 3/2004 | Elderson |
| D493,545 S | 7/2004 | Lancia et al. |
| D494,284 S | 8/2004 | Wenrick et al. |
| 6,800,129 B2 | 10/2004 | Jardine et al. |
| 6,820,384 B1 | 11/2004 | Pfeiffer |
| 6,833,095 B2 | 12/2004 | Sulzbach et al. |
| 6,833,188 B2 | 12/2004 | Semmens |
| 6,851,235 B2 | 2/2005 | Baldwin |
| 6,854,230 B2 | 2/2005 | Starke |
| 6,969,423 B2 | 11/2005 | Li et al. |
| 7,032,357 B2 | 4/2006 | Cooper et al. |
| 7,632,348 B2 * | 12/2009 | Cowan et al. ........... 106/724 |
| 7,644,548 B2 * | 1/2010 | Guevara et al. ......... 52/223.1 |
| 7,658,797 B2 * | 2/2010 | Guevara et al. ........... 106/724 |
| 7,666,258 B2 * | 2/2010 | Guevara et al. ........... 106/724 |
| 7,699,929 B2 * | 4/2010 | Guevara et al. ........... 106/724 |
| 2001/0009683 A1 | 7/2001 | Kitahama et al. |
| 2002/0026760 A1 | 3/2002 | Moore, Jr. |
| 2002/0117769 A1 | 8/2002 | Arch et al. |
| 2002/0139066 A1 | 10/2002 | Szymanski et al. |
| 2002/0184846 A1 | 12/2002 | Crowder |
| 2003/0029106 A1 | 2/2003 | Cooper et al. |
| 2003/0079420 A1 | 5/2003 | Klassen et al. |
| 2003/0079438 A1 | 5/2003 | Stephens et al. |
| 2003/0085483 A1 | 5/2003 | Kroeger |
| 2003/0109592 A1 * | 6/2003 | Shulman ................ 521/54 |
| 2003/0114065 A1 | 6/2003 | Peng et al. |
| 2003/0172607 A1 | 9/2003 | Brandes |
| 2003/0188667 A1 | 10/2003 | Beard et al. |
| 2004/0017652 A1 | 1/2004 | Billington et al. |
| 2004/0065034 A1 | 4/2004 | Messenger et al. |
| 2004/0065973 A1 | 4/2004 | Ebbing et al. |
| 2004/0096642 A1 | 5/2004 | Maruyama et al. |
| 2004/0152795 A1 | 8/2004 | Arch et al. |
| 2004/0202742 A1 | 10/2004 | Winter |
| 2004/0216415 A1 | 11/2004 | Pfeiffer et al. |
| 2004/0231916 A1 | 11/2004 | Englert et al. |
| 2005/0034401 A1 | 2/2005 | Sutelan et al. |
| 2005/0086906 A1 | 4/2005 | Bathon et al. |
| 2006/0217464 A1 | 9/2006 | Guevara et al. |
| 2006/0225618 A1 | 10/2006 | Guevara et al. |
| 2007/0062415 A1 | 3/2007 | Guevara et al. |
| 2008/0066408 A1 * | 3/2008 | Hileman et al. ............ 52/414 |
| 2008/0275149 A1 * | 11/2008 | Ladely et al. ............ 521/55 |
| 2008/0314295 A1 * | 12/2008 | Guevara et al. ............ 106/668 |
| 2010/0064943 A1 * | 3/2010 | Guevara et al. ............ 106/672 |
| 2010/0088984 A1 * | 4/2010 | Guevara et al. ............ 52/220.1 |

FOREIGN PATENT DOCUMENTS

| | | |
|---|---|---|
| EP | 0 459 924 A1 | 12/1991 |
| EP | 0 464 008 B1 | 2/1995 |
| EP | 0 652 188 A1 | 5/1995 |
| EP | 0 693 597 B1 | 1/1996 |
| FR | 2 539 410 A1 | 7/1984 |
| GB | 2 365 456 A | 2/2002 |
| WO | 98/02397 | 1/1998 |
| WO | 00/36000 | 12/1999 |
| WO | 00/02826 | 1/2000 |
| WO | 00/61519 | 10/2000 |
| WO | 01/66485 A2 | 9/2001 |
| WO | 02/20916 A1 | 3/2002 |
| WO | 02/35020 A3 | 5/2002 |
| WO | 2004/009929 A1 | 1/2004 |

OTHER PUBLICATIONS

Sabaa, B.A., and Sri Ravindrarajah, R., "Compressive and Tensile Strength of "Adjusted Density" Concrete Using Expanded Polystyrene Aggregate", Proceedings of the South African Conference on Polymers in Concrete, Jul. 2000, Kruger National Park, South Africa, pp. 133-141.

Sabaa, B.A., and Sri Ravindrarajah, R., "Controlling freeze and thaw durability of structural grade concrete with recycled expanded aggregate", Proceedings of the Second International Symposium on Structural Lightweight Aggregate Concrete, Jun. 18-22, 2000, Kristiansand, Norway, pp. 709-718.

Sri Ravindrarajah, R. and Tuck, A.J., "Properties of polystyrene aggregate concrete", Proc. of the 13th Australasian Conf. on the Mechanics of Structures & Materials, Jul. 5-6, 1993, Wollongong, Australia, pp. 705-712.

Sri Ravindrarajah, R. and Tuck, A.J., "Properties of Hardened Concrete Containing Treated Expanded Polystyrene Beads", Int. J. of Cement Composites, V 16, Dec. 1994, pp. 273-277.

Sri Ravindrarajah, R. and Sivapathasundaram, P., "Properties of Polystyrene Aggregate Concrete Having the Densities of 1300 and 1900 kg/m3", Journal of the Australian Ceramic Society, 1998, pp. 217-222.

Sri Ravindrarajah, R., "Bearing Strength of Concrete Containing Polystyrene Aggregate", Proceedings of the 8th RILEM Conference on the Durability of Building Materials & Components, Vancouver, Canada, 1999, pp. 505-514.

Sabaa, B.A., and Sri Ravindrarajah, R., "Investigation of Pull-Out Strength Between Polystyrene Aggregate Concrete and Reinforcing Steel", Proceedings of the Second International Symposium on Structural Lightweight Aggregate Concrete, Jun. 18-22, 2000, Kristiansand, Norway, pp. 729-736.

Sabaa, B.A., and Sri Ravindrarajah, R., "Impact Resistance of Polystyrene Aggregate Concrete With and Without Polypropylene Fibres", Proceedings of the Second International Symposium on Structural Lightweight Aggregate Concrete, Jun. 18-22, 2000, Kristiansand, Norway, pp. 719-728.

Naji, B., Sri Ravindrarajah, R. and Chung, H.W., "Flexural Behaviour of Ferrocement-Polystyrene Aggregate Concrete Composites", Proc. of the First Australasian Congress on Applied Mechanics, Feb. 21-23, 1996, Melbourne, Australia, pp. 351-356.

Naji, B. Sri Ravindrarajah, R. and Chung, H.W., "Impact-Echo Response in Ferrocement-Polystyrene Beaded Concrete Laminates", Proc. of the Int. Symp. on Non-Destructive Testing in Civil Engineering, Sep. 26-28, 1995, Berlin, Germany, pp. 503-511.

Dipl.-Ing. Thorsten et al., High Strength Lightweight-Aggregate Concrete; 2nd Int. PhD Symposium in Civil Engineering, 1998 Budapest. pp. 1-8.

"The Use of Styrocell B. Beads in Cellular Bricks, Plaster and Lightweight Concrete", Shell Chemicals Europe, Styrocell Bulletin, STY 1.4, Issued: Mar. 1998, 1st Edition, pp. 1-8.

ELFI Wall System, http//elfiwallsystem.com/index.htm, 2003.

Stoam Industries, Product Brochure, at least earlier than Feb. 24, 2006.

Plastbau Technology—Insul-Deck, "Lightweight Forming System for Concrete Floors and Roofs", Product Brochure, Cat. No. 5M02,2002.

Sicilferro, "Tecnova-Tecnologie Costruttive", Product Catalog, at least earlier than Feb. 24, 2006.

* cited by examiner

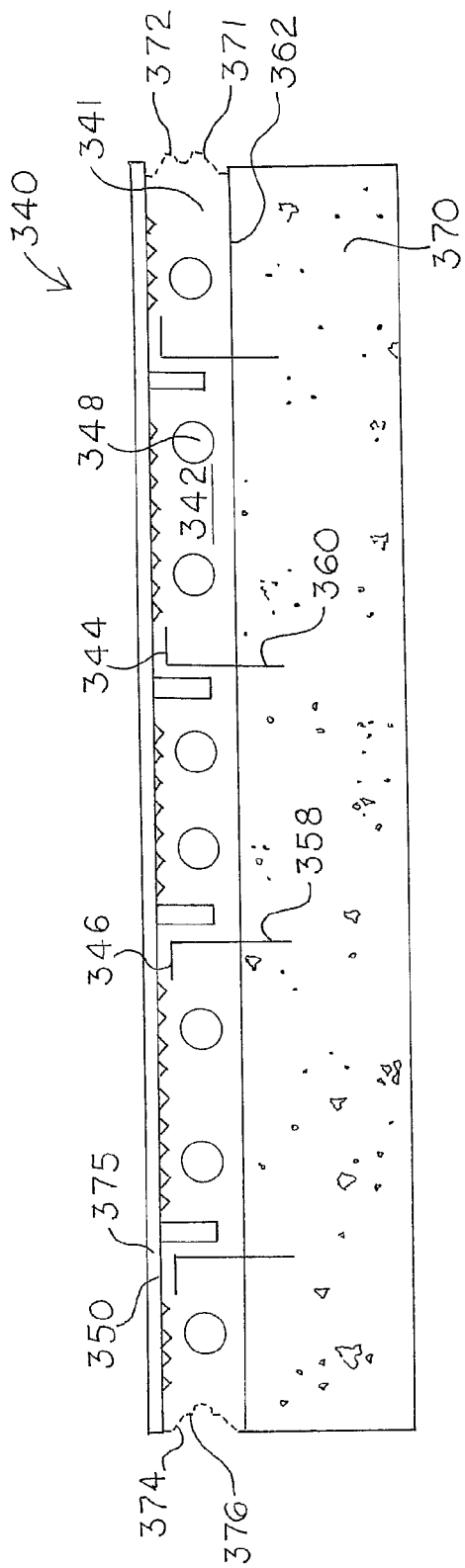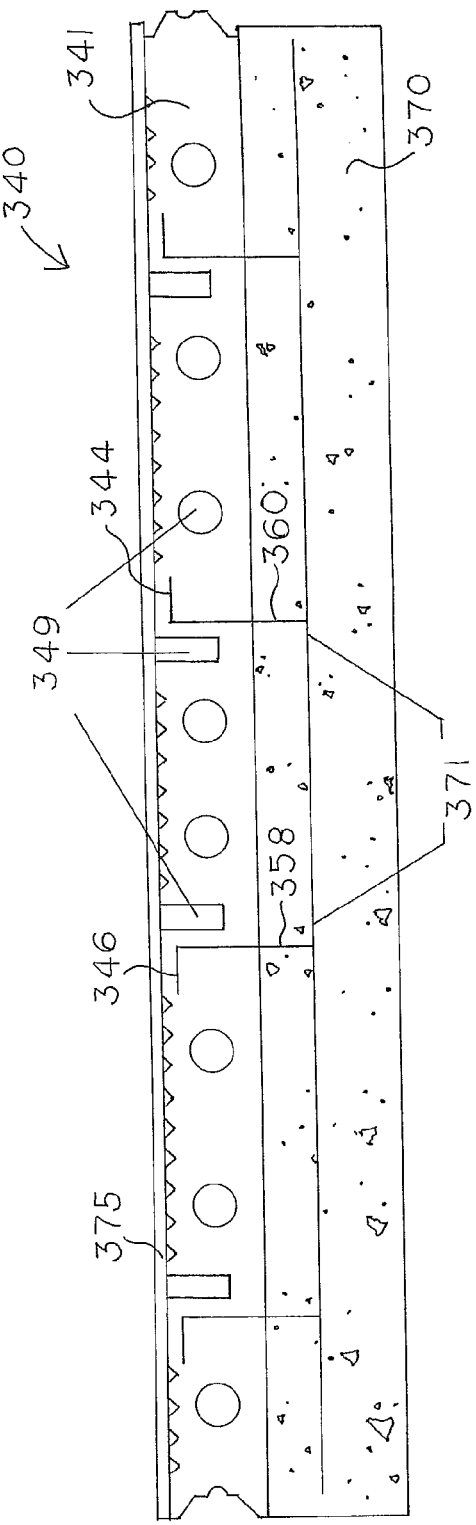

LIGHTWEIGHT COMPOSITIONS AND ARTICLES CONTAINING SUCH

REFERENCE TO RELATED APPLICATION

This application is a Continuation of U.S. application Ser. No. 11/361,654 filed Feb. 24, 2006 and entitled "Lightweight Concrete Compositions and Articles Containing Such," which claims the benefit of priority of U.S. Provisional Application Ser. Nos. 60/656,596 filed Feb. 25, 2005 and 60/664,120 filed Mar. 22, 2005, both entitled "Composite Pre-Formed Building Panels," 60/664,230 filed Mar. 22, 2005 entitled "Light Weight Concrete Composite Using EPS Beads," 60/686,858 filed Jun. 2, 2005 entitled "Lightweight Compositions and Materials" and U.S. Provisional Application Ser. No. 60/728,839 filed Oct. 21, 2005 entitled "Composite Pre-Formed Insulated Concrete Forms," which are all herein incorporated by reference in their entirety.

BACKGROUND OF THE INVENTION

1. Field of the Invention

The present invention is directed to novel compositions, materials, methods of their use and methods of their manufacture that are generally useful as agents in the construction and building trades. More specifically, the compounds of the present invention can be used in construction and building applications that benefit from a relatively lightweight, extendable, moldable, pourable, material that has high strength and often improved insulation properties.

2. Description of the Prior Art

In the field of preparation and use of lightweight cementitious materials, such as so-called lightweight concrete, the materials that have been available to the trades up until now have generally required the addition of various constituents to achieve a strong but lightweight concrete mass that has a high homogeneity of constituents and which is uniformly bonded throughout the mass.

U.S. Pat. Nos. 3,214,393, 3,257,338 and 3,272,765 disclose concrete mixtures that contain cement, a primary aggregate, particulate expanded styrene polymer, and a homogenizing and/or a surface-active additive.

U.S. Pat. No. 3,021,291 discloses a method of making cellular concrete by incorporating into the concrete mixture, prior to casting the mixture, a polymeric material that will expand under the influence of heat during curing. The shape and size of the polymeric particles is not critical.

U.S. Pat. No. 5,580,378 discloses a lightweight cementitious product made up of an aqueous cementitious mixture that can include fly ash, Portland cement, sand, lime and, as a weight saving component, micronized polystyrene particles having particle sizes in the range of 50 to 2000 µm and a density of about 1 lb/ft$^3$. The mixture can be poured into molded products such as foundation walls, roof tiles, bricks and the like. The product can also be used as a mason's mortar, a plaster, a stucco or a texture.

JP 9 071 449 discloses a lightweight concrete that includes Portland cement and a lightweight aggregate such as foamed polystyrene, perlite or vermiculite as a part or all parts of the aggregate. The foamed polystyrene has a granule diameter of 0.1-10 mm and a specific gravity of 0.01-0.08.

U.S. Pat. Nos. 5,580,378, 5,622,556, and 5,725,652 disclose lightweight cementitious products made up of an aqueous cementitious mixture that includes cement and expanded shale, clay, slate, fly ash, and/or lime, and a weight saving component, which is micronized polystyrene particles having particle sizes in the range of 50 to 2000 µm, and characterized by having water contents in the range of from about 0.5% to 50% v/v.

U.S. Pat. No. 4,265,964 discloses lightweight compositions for structural units such as wallboard panels and the like, which contain low density expandable thermoplastic granules; a cementitious base material, such as, gypsum; a surfactant; an additive which acts as a frothing agent to incorporate an appropriate amount of air into the mixture; a film forming component; and a starch. The expandable thermoplastic granules are expanded as fully as possible.

WO 98 02 397 discloses lightweight-concrete roofing tiles made by molding a hydraulic binder composition containing synthetic resin foams as the aggregate and having a specific gravity of about 1.6 to 2.

WO 00/61519 discloses a lightweight concrete that includes a blend of from around 40% to 99% of organic polymeric material and from 1% to around 60% of an air entraining agent. The blend is used for preparing lightweight concrete that uses polystyrene aggregate. The blend is required to disperse the polystyrene aggregate and to improve the bond between the polystyrene aggregate and surrounding cementitious binder.

WO 01/66485 discloses a lightweight cementitious mixture containing by volume: 5 to 80% cement, 10 to 65% expanded polystyrene particles; 10 to 90% expanded mineral particles; and water sufficient to make a paste with a substantially even distribution of expanded polystyrene after proper mixing.

U.S. Pat. No. 6,851,235 discloses a building block that includes a mixture of water, cement, and expanded polystyrene (EPS) foam beads that have a diameter from 3.18 mm (⅛ inch) to 9.53 mm (⅜ inch) in the proportions of from 68 to 95 liters (18 to 25 gallons) water; from 150 to 190 kg (325 to 425 lb) cement; and from 850 to 1400 liters (30 to 50 cubic feet) Prepuff beads.

Generally, the prior art recognizes the utility of using expanded polymers, in some form, in concrete compositions, to reduce the overall weight of the compositions. The expanded polymers are primarily added to take up space and create voids in the concrete and the amount of "air space" in the expanded polymer is typically maximized to achieve this objective. Generally, the prior art assumes that expanded polymer particles will lower the strength and/or structural integrity of lightweight concrete compositions. Further, concrete articles made from prior art lightweight concrete compositions have at best inconsistent physical properties, such as Young's modulus, thermal conductivity, and compressive strength, and typically demonstrate less than desirable physical properties.

Concrete walls in building construction are most often produced by first setting up two parallel form walls and pouring concrete into the space between the forms. After the concrete hardens, the builder then removes the forms, leaving the cured concrete wall.

This prior art technique has drawbacks. Formation of the concrete walls is inefficient because of the time required to erect the forms, wait until the concrete cures, and take down the forms. This prior art technique, therefore, is an expensive, labor-intensive process.

Accordingly, techniques have developed for forming modular concrete walls, which use a foam insulating material. The modular form walls are set up parallel to each other and connecting components hold the two form walls in place relative to each other while concrete is poured there between. The form walls, however, remain in place after the concrete cures. That is, the form walls, which are constructed of foam insulating material, are a permanent part of the building after the concrete cures. The concrete walls made using this technique can be stacked on top of each other many stories high to form all of a building's walls. In addition to the efficiency gained by retaining the form walls as part of the permanent structure, the materials of the form walls often provide adequate insulation for the building.

Although the prior art includes many proposed variations to achieve improvements with this technique, drawbacks still exist for each design. The connecting components used in the prior art to hold the walls are constructed of (1) plastic foam, (2) high density plastic, or (3) a metal bridge, which is a non-structural support, i.e., once the concrete cures, the connecting components serve no function. Even so, these members provide thermal and sound insulation functions and have long been accepted by the building industry.

Thus, current insulated concrete form technology requires the use of small molded foam blocks normally 12 to 24 inches in height with a standard length of four feet. The large amount of horizontal and vertical joints that require bracing to correctly position the blocks during a concrete pour, restricts their use to shorter wall lengths and lower wall heights. Wall penetrations such as windows and doors require skillfully prepared and engineered forming to withstand the pressures exerted upon them during concrete placement. Plaster finishing crews have difficulty hanging drywall on such systems due to the problem of locating molded in furring strips. The metal or plastic furring strips in current designs are non-continuous in nature and are normally embedded within the foam faces. The characteristics present in current block forming systems require skilled labor, long lay-out times, engineered blocking and shoring and non-traditional finishing skills. This results in a more expensive wall that is not suitable for larger wall construction applications. The highly skilled labor force that is required to place, block, shore and apply finishes in a block system seriously restricts the use of such systems when compared to traditional concrete construction techniques.

One approach to solving the problem of straight and true walls on larger layouts has been to design larger blocks. Current existing manufacturing technology has limited this increase to 24 inches in height and eight feet in length. Other systems create hot wire cut opposing foamed plastic panels mechanically linked together in a secondary operation utilizing metal or plastic connectors. These panels are normally 48 inches in width and 8 feet in height and do not contain continuous furring strips.

However, none of the approaches described above adequately address the problems of form blowout at higher wall heights due to pressure exerted by the poured concrete, fast and easy construction with an unskilled labor force, and ease of finishing the walls with readily ascertainable attachment points.

Therefore, there is a need in the art for lightweight concrete compositions that provide lightweight concrete articles having predictable and desirable physical properties as well as for composite pre-formed building panels and insulated concrete forms with internal blocking and bracing elements that overcome the above-described problems.

SUMMARY OF THE INVENTION

The present invention provides a lightweight cementitious composition containing from 22 to 90 volume percent of a cement composition and from 10 to 78 volume percent of particles having an average particle diameter of from 0.2 mm to 8 mm, a bulk density of from 0.03 g/cc to 0.64 g/cc, an aspect ratio of from 1 to 3, wherein after the lightweight cementitious composition is set, it has a compressive strength of at least 1700 psi as tested according to ASTM C39.

The present invention also provides the above-described lightweight cementitious composition set in the form of concrete masonry units (CMUs), construction articles, pre-cast/pre-stressed construction articles, construction panels, or road beds.

The present invention further provides a method of making an optimized lightweight concrete article that includes:
  identifying the desired density and strength properties of a set lightweight concrete composition;
  determining the type, size and density of polymer beads to be used in the lightweight concrete composition;
  determining the size and density the polymer beads are to be expanded to;
  optionally expanding the polymer beads to form expanded polymer beads;
  dispersing the polymer beads in a cementitious mixture to form the lightweight concrete composition; and
  allowing the lightweight concrete composition to set in a desired form.

The present invention additionally provides a composite building panel that includes:
  a central body, substantially parallelepipedic in shape, comprised of an expanded polymer matrix, having opposite faces, a top surface, and an opposing bottom surface;
  at least one embedded framing studs longitudinally extending across the central body between said opposite faces, having a first end embedded in the expanded polymer matrix, a second end extending away from the bottom surface of the central body, and one or more expansion holes located in the embedded stud between the first end of the embedded stud and the bottom surface of the central body, wherein, the central body comprises a polymer matrix that expands through the expansion holes; and
  a concrete layer containing the above-described lightweight cementitious composition covering at least a portion of the top surface and/or bottom surface.

The present invention also provides a composite floor panel that includes:
  a central body, substantially parallelepipedic in shape, containing an expanded polymer matrix, having opposite faces, a top surface, and an opposing bottom surface; and
  two or more embedded floor joists longitudinally extending across the central body between said opposite faces, having a first end embedded in the expanded polymer matrix having a first transverse member extending from the first end generally contacting or extending above the top surface, a second end extending away from the bottom surface of the central body having a second transverse member extending from the second end, and one or more expansion holes located in the embedded joists between the first end of the embedded joists and the bottom surface of the central body;
  wherein, the central body includes a polymer matrix that expands through the expansion holes;
  wherein the embedded joists include one or more utility holes located in the embedded joists between the bottom surface of the central body and the second end of the embedded joists and the space defined by the bottom surface of the central body and the second ends of the embedded joists is adapted for accomodating utility lines;

wherein a concrete layer containing the above-described lightweight cementitious composition covers at least a portion of the top surface and/or bottom surface; and wherein the composite floor panel is positioned generally perpendicular to a structural wall and/or foundation.

The present invention further provides an insulated concrete structure that includes:

a first body, substantially parallelepipedic in shape, containing an expanded polymer matrix, having opposite faces, a first surface, and an opposing second surface;

a second body, substantially parallelepipedic in shape, containing an expanded polymer matrix, having opposite faces, a first surface, an opposing second surface; and one or more reinforcing embedded studs logitudinally extending across the first body and the second body between the first surfaces of each body, having a first end embedded in the expanded polymer matrix of the first body, and a second end embedded in the expanded polymer matrix of the second body, one or more expansion holes located in the portion of the embedded studs embedded in the first body and the second body;

wherein, the first body and the second body include a polymer matrix that expands through the expansion holes; and the space defined between the first surfaces of the first body and the second body is capable of accepting concrete poured therein; and wherein a concrete layer containing the above-described lightweight cementitious composition fills at least a portion of a space between the first surface of the first body and the first surface of the second body.

The present invention additionally provides a lightweight structural unit that includes:

a core, having a first major face and a second major face, the core containing a solid set lightweight cementitious composition that includes 22 to 90 volume percent of a cement composition and from 10 to 78 volume percent of particles having an average particle diameter of from 0.2 mm to 8 mm, a bulk density of from 0.03 g/cc to 0.64 g/cc, an aspect ratio of from 1 to 3 a first face covering applied over at least a portion of the first major face; and a second face covering applied over at least a portion of the second major face.

DESCRIPTION OF THE DRAWINGS

FIG. 11 shows a cross-sectional view of a concrete composite pre-formed tilt-up insulated panel according to the invention;

FIG. 12 shows a cross-sectional view of a concrete composite pre-formed tilt-up insulated panel according to the invention;

DETAILED DESCRIPTION OF THE INVENTION

Figure 1:
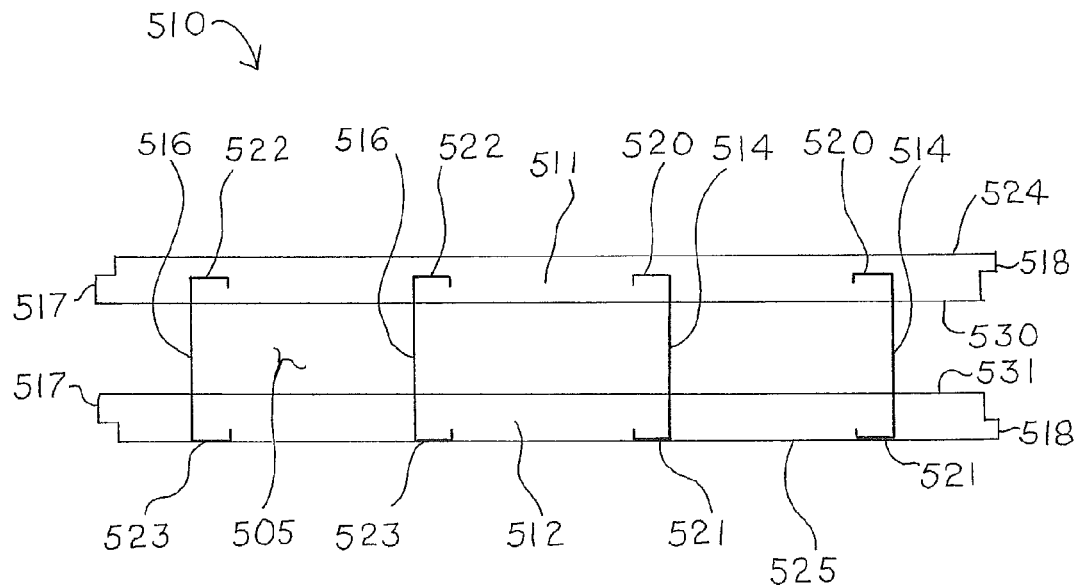
FIG. 1 shows a top plan view of a pre-formed insulated concrete form according to the invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein the term "formable material" refers to any material in liquid, semi-solid, viscoelastic, and/or other suitable form that can be manipulated and placed into an enclosed space of predetermined shape and/or dimensions where it becomes solid by either cooling, curing, and/or setting.

As used herein, the term "particles containing void spaces" refer to expanded polymer particles, prepuff particles, and other particles that include cellular and/or honeycomb-type chambers at least some of which are completely enclosed, that contain air or a specific gas or combination of gasses, as a non-limiting example prepuff particles as described herein.

As used herein the terms "cement" and "cementitious" refer to materials that bond a concrete or other monolithic product, not the final product itself. In particular, hydraulic cement refers to a material that sets and hardens by undergoing a hydration reaction in the presence of a sufficient quantity of water to produce a final hardened product.

As used herein, the term "cementitious mixture" refers to a composition that includes a cement material, and one or more fillers, adjuvants, or other materials known in the art that form a slurry that hardens upon curing. Cement materials include, but are not limited to, hydraulic cement, gypsum, gypsum compositions, lime and the like and may or may not include water. Adjuvants and fillers include, but are not limited to sand, clay, fly ash, aggregate, air entrainment agents, colorants, water reducers/superplasticizers, and the like.

As used herein, the term "concrete" refers to a hard strong building material made by mixing a cementitious mixture with sufficient water to cause the cementitious mixture to set and bind the entire mass.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass, without limitation, homopolymers, copolymers, graft copolymers, and blends and combinations thereof.

In its broadest context, the present invention provides a method of controlling air entrainment in a formed article. The formed article can be made from any formable material, where particles containing void spaces are used to entrain air in a structurally supportive manner. Any suitable formable material can be used, so long as the particles containing void spaces are not damaged during the forming process. As such, when suitable particles are used, the formable material can be a cementitious composition, a metal, a ceramic, a plastic, a rubber, or a composite material.

Metals that can be used in the invention include, but are not limited to aluminum, iron, titanium, molybdenum, nickel, copper, combinations thereof and alloys thereof. Suitable ceramics include inorganic materials such as pottery, enamels and refractories and include but are not limited to metal silicates, metal oxides, metal nitrides and combinations thereof. Suitable plastics include, but are not limited to polyolefins, homopolymers of vinyl aromatic monomers; copolymers of vinyl aromatic monomers, poly(meth)acrylates, polycarbonates, polyesters, polyamides, and combinations thereof. Suitable rubbers include natural rubbers, synthetic rubbers and combinations thereof.

As used herein, the term "composite material" refers to a solid material which includes two or more substances having different physical characteristics and in which each substance retains its identity while contributing desirable properties to the whole. As a non-limiting example, composite materials can include a structural material made of plastic within which a fibrous material, such as silicon carbide, glass fibers, aramid fibers, and the like, are embedded.

The particles are selected such that they do not melt or otherwise become damaged during the forming process. For example, a polymer particle would typically not be used in a metal forming operation. Suitable materials from which the particles containing voids can be selected include polymers, plastics, ceramics, and the like. When polymers and/or plastics are used, they can be expanded materials as described below. When ceramics are used, they are formed with voids therein. As a non-limiting example, a ceramic can be formed by incorporating a polymer therein, which is subsequently burned away leaving void spaces in the ceramic. The ceramic with void spaces can then be used in metal to provide a lightweight formed metal part.

Thus, the present invention is directed to methods of controlling air entrainment where an article is formed by combining a formable material and particles containing void spaces to provide a mixture and placing the mixture in a form.

Although the application discloses in detail cementitious mixtures with polymer particles, the concepts and embodiments described herein can be applied by those skilled in the art to the other applications described above.

Embodiments of the present invention are directed to a lightweight concrete (LWC) composition that includes a cementitious mixture and polymer particles. Surprisingly, it has been found that the size, composition, structure, and physical properties of the expanded polymer particles, and in some instances their resin bead precursors, can greatly affect the physical properties of LWC articles made from the LWC compositions of the invention. Of particular note is the relationship between bead size and expanded polymer particle density on the physical properties of the resulting LWC articles.

In an embodiment of the invention, the cementitious mixture can be an aqueous cementitious mixture.

The polymer particles, which can optionally be expanded polymer particles, are present in the LWC composition at a level of at least 10, in some instances at least 15, in other instances at least 20, in particular situations up to 25, in some cases at least 30, and in other cases at least 35 volume percent and up to 78, in some instances up to 75, in other instance up to 65, in particular instances up to 60, in some cases up to 50, and in other cases up to 40 volume percent based on the total volume of the LWC composition. The amount of polymer will vary depending on the particular physical properties desired in a finished LWC article. The amount of polymer particles in the LWC composition can be any value or can range between any of the values recited above.

The polymer particles can include any particles derived from any suitable expandable thermoplastic material. The actual polymer particles are selected based on the particular physical properties desired in a finished LWC article. As a non-limiting example, the polymer particles, which can optionally be expanded polymer particles, can include one or more polymers selected from homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

In an embodiment of the invention, the polymer particles include thermoplastic homopolymers or copolymers selected from homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer as described above with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, wherein the vinyl aromatic monomer is present in at least 50% by weight of the copolymer. In an embodiment of the invention, styrenic polymers are used, particularly polystyrene. However, other suitable polymers can be used, such as polyolefins (e.g. polyethylene, polypropylene), polycarbonates, polyphenylene oxides, and mixtures thereof.

In a particular embodiment of the invention, the polymer particles are expandable polystyrene (EPS) particles. These particles can be in the form of beads, granules, or other particles convenient for the expansion and molding operations.

In the present invention, particles polymerized in a suspension process, which are essentially spherical resin beads, are useful as polymer particles or for making expanded polymer particles. However, polymers derived from solution and bulk polymerization techniques that are extruded and cut into particle sized resin bead sections can also be used.

In an embodiment of the invention, resin beads (unexpanded) containing any of polymers or polymer compositions described herein have a particle size of at least 0.2, in some situations at least 0.33, in some cases at least 0.35, in other cases at least 0.4, in some instances at least 0.45 and in other instances at least 0.5 mm. Also, the resin beads can have a particle size of up to 3, in some instances up to 2, in other instances up to 2.5, in some cases up to 2.25, in other cases up to 2, in some situations up to 1.5 and in other situations up to 1 mm. In this embodiment, the physical properties of LWC articles made according to the invention have inconsistent or undesirable physical properties when resin beads having particle sizes outside of the above described ranges are used to make the expanded polymer particles. The resin beads used in this embodiment can be any value or can range between any of the values recited above.

The expandable thermoplastic particles or resin beads can optionally be impregnated using any conventional method with a suitable blowing agent. As a non-limiting example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g. CFC's and HCFC'S, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540 in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated polymer particles or resin beads are optionally expanded to a bulk density of at least 0.5 lb/ft$^3$ (0.008 g/cc), in some cases at least 1.25 lb/ft$^3$ (0.02 g/cc), in other cases at least 1.5 lb/ft$^3$ (0.024 g/cc), in some situations at least 1.75 lb/ft$^3$ (0.028 g/cc), in some circumstances at least 2 lb/ft$^3$ (0.032 g/cc) in other circumstances at least 3 lb/ft$^3$ (0.048 g/cc) and in particular circumstances at least 3.25 lb/ft$^3$ (0.052 g/cc) or 3.5 lb/ft$^3$ (0.056 g/cc). When non-expanded resin beads are used higher bulk density beads can be used. As such, the bulk density can be as high as 40 lb/ft$^3$ (0.64 g/cc). The bulk density of the polymer particles can be any value or range between any of the values recited above.

The expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175.

The impregnated polymer particles can be foamed cellular polymer particles as taught in U.S. patent application Ser. No. 10/021,716, the teachings of which are incorporated herein by reference. The foamed cellular particles can be polystyrene that are expanded and contain a volatile blowing agent at a level of less than 14 wt %, in some situations less than 6 wt %, in some cases ranging from about 2 wt % to about 5 wt %, and in other cases ranging from about 2.5 wt % to about 3.5 wt % based on the weight of the polymer.

An interpolymer of a polyolefin and in situ polymerized vinyl aromatic monomers that can be included in the expanded thermoplastic resin or polymer particles according to the invention is disclosed in U.S. Pat. Nos. 4,303,756 and 4,303,757 and U.S. Application Publication 2004/0152795, the relevant portions of which are herein incorporated by reference.

The polymer particles can include customary ingredients and additives, such as flame retardants, pigments, dyes, colorants, plasticizers, mold release agents, stabilizers, ultraviolet light absorbers, mold prevention agents, antioxidants, rodenticides, insect repellants, and so on. Typical pigments include, without limitation, inorganic pigments such as carbon black, graphite, expandable graphite, zinc oxide, titanium dioxide, and iron oxide, as well as organic pigments such as quinacridone reds and violets and copper phthalocyanine blues and greens.

In a particular embodiment of the invention the pigment is carbon black, a non-limiting example of such a material being EPS SILVER®, available from NOVA Chemicals Inc.

In another particular embodiment of the invention the pigment is graphite, a non-limiting example of such a material being NEOPOR®, available from BASF Aktiengesellschaft Corp., Ludwigshafen am Rhein, Germany.

When materials such as carbon black and/or graphite are included in the polymer particles, improved insulating properties, as exemplified by higher R values for materials containing carbon black or graphite (as determined using ASTM—C578), are provided. As such, the R value of the expanded polymer particles containing carbon black and/or graphite or materials made from such polymer particles are at least 5% higher than observed for particles or resulting articles that do not contain carbon black and/or graphite.

The expanded polymer particles can have an average particle size of at least 0.2, in some circumstances at least 0.3, in other circumstances at least 0.5, in some cases at least 0.75, in other cases at least 0.9 and in some instances at least 1 mm and can be up to 8, in some circumstances up to 6, in other circumstances up to 5, in some cases up to 4, in other cases up to 3, and in some instances up to 2.5 mm. When the size of the expanded polymer particles is too small or too large, the physical properties of LWC articles made using the present LWC composition can be undesirable. The average particle size of the expanded polymer particles can be any value and can range between any of the values recited above. The average particle size of the expanded polymer particles can be determined using laser diffraction techniques or by screening according to mesh size using mechanical separation methods well known in the art.

In an embodiment of the invention, the polymer particles or expanded polymer particles have a minimum average cell wall thickness, which helps to provide desirable physical properties to LWC articles made using the present LWC composition. The average cell wall thickness and inner cellular dimensions can be determined using scanning electron microscopy techniques known in the art. The expanded polymer particles can have an average cell wall thickness of at least 0.15 µm, in some cases at least 0.2 µm and in other cases at least 0.25 µm. Not wishing to be bound to any particular theory, it is believed that a desirable average cell wall thickness results when resin beads having the above-described dimensions are expanded to the above-described densities.

In an embodiment of the invention, the polymer beads are optionally expanded to form the expanded polymer particles such that a desirable cell wall thickness as described above is achieved. Though many variables can impact the wall thickness, it is desirable, in this embodiment, to limit the expansion of the polymer bead so as to achieve a desired wall thickness and resulting expanded polymer particle strength. Optimizing processing steps and blowing agents can expand the polymer beads to a minimum of 0.5 lb/ft$^3$. This property of the expanded polymer, bulk density, may be described by pcf (lb/ft$^3$) or by an expansion factor (cc/g).

As used herein, the term "expansion factor" refers to the volume a given weight of expanded polymer bead occupies, typically expressed as cc/g.

In order to provide expanded polymer particles with desirable cell wall thickness and strength, the expanded polymer particles are not expanded to their maximum expansion factor; as such an extreme expansion yields particles with undesirably thin cell walls and insufficient strength. As such, the polymer beads can be expanded at least 5%, in some cases at least 10%, and in other cases at least 15% of their maximum expansion factor. However, so as not to cause the cell wall thickness to be too thin, the polymer beads are expanded up to 80%, in some cases up to 75%, in other cases up to 70%, in some instances up to 65%, in other instances up to 60%, in some circumstances up to 55%, and in other circumstances up to 50% of their maximum expansion factor. The polymer beads can be expanded to any degree indicated above or the expansion can range between any of the values recited above. Typically, the polymer beads or prepuff beads do not further expand when formulated into the present cementitious compositions and do not further expand while the cementitious compositions set, cure and/or harden.

As used herein, the term "prepuff" refers to an expandable particle, resin and/or bead that has been expanded, but has not been expanded to its maximum expansion factor.

The prepuff or expanded polymer particles typically have a cellular structure or honeycomb interior portion and a generally smooth continuous polymeric surface as an outer surface, i.e., a substantially continuous outer layer. The smooth continuous surface can be observed using scanning electron microscope (SEM) techniques at 1000× magnification. SEM observations do not indicate the presence of holes in the outer surface of the prepuff or expanded polymer particles. Cutting sections of the prepuff or expanded polymer particles and taking SEM observations reveals the generally honeycomb structure of the interior of the prepuff or expanded polymer particles.

The polymer particles or expanded polymer particles can have any cross-sectional shape that allows for providing desirable physical properties in LWC articles. In an embodiment of the invention, the expanded polymer particles have a circular, oval or elliptical cross-section shape. In embodiments of the invention, the prepuff or expanded polymer particles have an aspect ratio of 1, in some cases at least 1 and the aspect ratio can be up to 3, in some cases up to 2 and in other cases up to 1.5. The aspect ratio of the prepuff or expanded polymer particles can be any valur or range between any of the values recited above.

The cementitious mixture is present in the LWC composition at a level of at least 22, in some cases at least 40 and in other cases at least 50 volume percent and can be present at a level of up to 90, in some circumstances up to 85, in other circumstances up to 80, in particular cases up to 75, in some cases up to 70, in other cases up to 65, and in some instances up to 60 volume percent of the LWC composition. The cementitious mixture can be present in the LWC composition at any level stated above and can range between any of the levels stated above.

In an embodiment of the invention, the cementitious mixture includes a hydraulic cement composition. The hydraulic cement composition can be present at a level of at least, in certain situations at least 5, in some cases at least 7.5, and in other cases at least 9 volume percent and can be present at levels up to 40, in some cases up to 35, in other cases up to 32.5, and in some instances up to 30 volume percent of the cementitious mixture. The cementitious mixture can include the hydraulic cement composition at any of the above-stated levels or at levels ranging between any of levels stated above.

In a particular embodiment of the invention, the hydraulic cement composition can be one or more materials selected from Portland cements, pozzolana cements, gypsum cements, aluminous cements, magnesia cements, silica cements, and slag cements.

In an embodiment of the invention, the cementitious mixture can optionally include other aggregates and adjuvants known in the art including but not limited to sand, additional aggregate, plasticizers and/or fibers. Suitable fibers include, but are not limited to glass fibers, silicon carbide, aramid fibers, polyester, carbon fibers, composite fibers, fiberglass, and combinations thereof as well as fabric containing the above-mentioned fibers, and fabric containing combinations of the above-mentioned fibers.

Non-limiting examples of fibers that can be used in the invention include MeC-GRID® and C-GRID® available from TechFab, LLC, Anderson, S.C., KEVLAR® available from E.I. du Pont de Nemours and Company, Wilmington Del., TWARON® available from Teijin Twaron B. V., Arnheim, the Netherlands, SPECTRA® available from Honeywell International Inc., Morristown, N.J., DACRON® available from Invista North America S.A.R.L. Corp. Willmington, Del., and VECTRAN® available from Hoechst Cellanese Corp., New York, N.Y. The fibers can be used in a mesh structure, intertwined, interwoven, and oriented in any desirable direction.

Further to this embodiment, the additional aggregate can include, but is not limited to, one or more materials selected from common aggregates such as sand, stone, and gravel. Common lightweight aggregates can include ground granulated blast furnace slag, fly ash, glass, silica, expanded slate and clay; insulating aggregates such as pumice, perlite, vermiculite, scoria, and diatomite; LWC aggregate such as expanded shale, expanded slate, expanded clay, expanded slag, fumed silica, pelletized aggregate, extruded fly ash, tuff, and macrolite; and masonry aggregate such as expanded shale, clay, slate, expanded blast furnace slag, sintered fly ash, coal cinders, pumice, scoria, and pelletized aggregate.

When included, the other aggregates and adjuvants are present in the cementitious mixture at a level of at least 0.5, in some cases at least 1, in other cases at least 2.5, in some instances at least 5 and in other instances at least 10 volume percent of the cementitious mixture. Also, the other aggregates and adjuvants can be present at a level of up to 95, in some cases up to 90, in other cases up to 85, in some instances up to 65 and in other instances up to 60 volume percent of the cementitious mixture. The other aggregates and adjuvants can be present in the cementitious mixture at any of the levels indicated above or can range between any of the levels indicated above.

The cementitious mixture, expanded polymer particles, and any other aggregates and adjuvants are mixed using methods well known in the art. In an embodiment of the invention a liquid, in some instances water, is also mixed into the other ingredients.

In an embodiment of the invention, the concrete composition is a dispersion where the cementitious mixture provides, at least in part, a continuous phase and the polymer particles and/or expanded polymer particles exist as a dispersed phase of discrete particles in the continuous phase.

As a particular and non-limiting embodiment of the invention, the concrete composition is substantially free of wetting agents or dispersing agents used to stabilize the dispersion.

As a non-limiting embodiment of the invention and as not wishing to be limited to any single theory, some key factors that can affect the performance of the present LWC composition can include the volume fraction of the expanded resin bead, the average expanded bead size and the microstructure created by the inter-bead spacing within the concrete. In this embodiment, the inter-bead spacing can be estimated using a two-dimensional model. For simplicity in description, the inter-bead spacing can be limited to the bead radius. Additionally, and without meaning to limit the invention in any way, it is assumed in this embodiment that the beads are arranged in a cubic lattice, bead size distribution in the LWC composition is not considered, and the distribution of expanded bead area in the cross-section is not considered. In order to calculate the number of beads per sample, a three-dimensional test cylinder is assumed.

The smaller the expanded bead size, the greater the number of expanded beads required to maintain the same expanded bead volume fraction as described by equation 1 below. As the number of expanded beads increases exponentially, the spacing between the expanded beads decreases.

$$N_b = K/B^3 \quad (1)$$

$N_b$ represents the number of expanded beads.

A LWC test specimen with diameter D and height H (usually 2"×4" or 6"×12"), containing dispersed expanded polymer beads of average expanded bead diameter B, and a given volume fraction $V_d$ contains an amount of expanded polymer beads $N_b$ given by equation 1:

Note that $N_b$ is inversely proportional to the cube of the expanded polymer bead diameter. The constant of proportionality, $K=1.5 V_d H D^2$, is a number that is dependent only on the sample size and the volume fraction of expanded polymer beads. Thus for a given sample size, and known expanded polymer bead volume fraction, the number of beads increases to a third power as the bead diameter decreases.

As a non-limiting example, for a 2"×4" LWC specimen, at 90 pcf (lb/ft³) (corresponding to expanded polymer bead 43% volume fraction with pre-puff bulk density of 1.25 pcf), the number of beads increases fourfold and sevenfold moving from a 0.65 mm bead to 0.4 mm and 0.33 mm beads respectively. At 2.08 pcf, the increase in the number of beads is sixfold and sevenfold for 0.4 mm and 0.33 mm beads respectively. At 5 pcf, the increases are twofold and threefold respectively. Thus, the density correlates to the bead size. As shown below, the density also affects the cell wall thickness. The strength of a concrete matrix populated by expanded beads is typically affected by the cell wall stiffness and thickness.

In an embodiment of the invention, where monodisperse spherical cells are assumed, it can be shown that the mean cell diameter d is related to the mean wall thickness δ by equation 2:

$$d = \delta \bigg/ \left( \frac{1}{\sqrt{1-\rho/\rho_s}} - 1 \right) \quad (2)$$

where ρ is the density of the foam and $\rho_s$ is the density of the solid polymer bead.

Thus for a given polymer, depending on the particular expansion process used, one can obtain the same cell wall thickness (at a given cell size) or the same cell size at various values of δ. The density is controlled not only by the cell size but also by varying the thickness of the cell wall.

The table below exemplifies the variation of expanded polymer bead density with bead size for three classes of beads.

| Bead Size, microns | Density (pcf) | Foam Particle Size (mm) | Expansion factor (cc/g) | Average Number of beads for 43% volume fraction |
|---|---|---|---|---|
| 650 | 2.00 | 1.764 | 31 | 96,768 |
| 650 | 3.00 | 1.541 | 21 | 145,152 |
| 650 | 4.00 | 1.400 | 16 | 193,536 |
| 400 | 2.00 | 1.086 | 31 | 415,233 |
| 400 | 3.00 | 0.949 | 21 | 622,849 |

| Bead Size, microns | Density (pcf) | Foam Particle Size (mm) | Expansion factor (cc/g) | Average Number of beads for 43% volume fraction |
|---|---|---|---|---|
| 400 | 4.00 | 0.862 | 16 | 830,466 |
| 330 | 2.00 | 0.896 | 31 | 739,486 |
| 330 | 3.00 | 0.783 | 21 | 1,109,229 |
| 330 | 4.00 | 0.711 | 16 | 1,478,972 |

Desirable microstructures and/or morphologies can fall into distinct classes. The first is a bicontinous or co-continuous composite with special interfaces and the second comprises of special inclusions in a connected matrix. The effective properties of both bicontinous and singly connected microstructures are described by known optimal cross-property bounds.

In many cases, the smaller the beads, the greater the number of beads required to maintain the same expanded polymer bead volume fraction as described by equation 1. As the number of beads increases exponentially, the spacing between the beads decreases.

The optimal bounds can be described by a number of relations representing critical numbers or limits. As a non-limiting example, for a given volume fraction, there is often a critical bead size corresponding to a critical number of beads that can be dispersed to provide a desired morphology such that all the beads are isolated and the concrete is singly connected. It is also possible to form a morphology where all of the beads are non-isolated but contacting.

Finite element analysis of a 2-dimensional cross section was performed using ANSYS® (a finite element analysis program available from ANSYS Inc., Canonsburg, Pa.). In the finite element mesh of the cross-section, the beads are modeled as non-contacting or isolated circles in a singly connected concrete matrix.

The results demonstrate that under loading, the stresses build up in a direction perpendicular to the load axis. The maximum stress concentrations are at the horizontal boundary between the expanded polymer beads, which tend to be deformed from a circular shape to an elliptical shape.

In a particular embodiment of the invention, the concrete composition contains at least some of the expanded polymer particles arranged in a cubic or hexagonal lattice.

In an embodiment of the invention, the present LWC composition is substantially free of air entraining agents, which are typically added to create air cells or voids in a batch of concrete.

In another embodiment of the invention, the LWC composition can include reinforcement fibers. Such fibers act as reinforcing components, having a large aspect ratio, that is, their length/diameter ratio is high, so that a load is transferred across potential points of fracture. Non-limiting examples of suitable fibers include fiberglass strands of approximately one to one and three fourths inches in length, although any material can be used that has a higher Young's modulus than the matrix of the cementitious mixture, polypropylene fiber and other fibers as described above.

The LWC compositions according to the invention can be set and/or hardened to form final concrete articles using methods well known in the art.

The density of the set and/or hardened final concrete articles containing the LWC composition of the invention can be at least 40 lb/ft$^3$ (0.64 g/cc), in some cases at least 45 lb/ft$^3$ (0.72 g/cc) and in other cases at least 50 lb/ft$^3$ (0.8 g/cc) lb/ft$^3$ and the density can be up to 130 lb/ft$^3$ (2.1 g/cc), in some cases 120 lb/ft$^3$ (1.9 g/cc), in other cases up to 115 lb/ft$^3$ (1.8 g/cc), in some circumstances up to 110 lb/ft$^3$ (1.75 g/cc), in other circumstances up to 105 lb/ft$^3$ (1.7 g/cc), in some instances up to 100 lb/ft$^3$ (1.6 g/cc), and in other instances up to 95 lb/ft$^3$ (1.5 g/cc). The density of the present concrete articles can be any value and can range between any of the values recited above.

The LWC compositions can be used in most, if not all, applications where traditional concrete formulations are used. As non-limiting examples, the present LWC compositions can be used in structural and architectural applications, non-limiting examples being party walls, ICF or SIP structures, bird baths, benches, shingles, siding, drywall, cement board, decorative pillars or archways for buildings, etc., furniture or household applications such as counter tops, in-floor radiant heating systems, floors (primary and secondary), tilt-up walls, sandwich wall panels, as a stucco coating, road and airport safety applications such as arresting walls, Jersey Barriers, sound barriers and walls, retaining walls, runway arresting systems, air entrained concrete, runaway truck ramps, flowable excavatable backfill, and road construction applications such as road bed material and bridge deck material.

Additionally, LWC articles according to the invention readily accept direct attachment of screws, as a non-limiting example drywall screws and nails, which can be attached by traditional, pneumatic, or powder actuated devices. This allows easy attachment of materials such as plywood, drywall, studs and other materials commonly used in the construction industry, which cannot be done using traditional concrete formulations.

When the LWC compositions of the invention are used in road bed construction, the polymer particles can aid in preventing and or minimizing crack propagation, especially when water freeze-thaw is involved.

In an embodiment of the invention, the set and/or hardened LWC compositions according to the invention are used in structural applications and can have a minimum compressive strength for load bearing masonry structural applications of at least 1500 psi (105.5 kgf/cm$^2$), in some cases at least 1700 psi (119.5 kgf/cm$^2$), in other cases at least 1800 psi (126.5 kgf/cm$^2$), in some instances at least 1900 psi, and in other instances at least 2000 psi (140.6 kgf/cm$^2$). For structural lightweight concrete the compositions can have a minimum compressive strength of at least 2500 psi (175.8 kgf/cm$^2$). Compressive strengths are determined according to ASTM C39.

The compositions of the invention are well suited to the fabrication of molded construction articles and materials, non-limiting examples of such include wall panels including tilt-up wall panels, T beams, double T beams, roofing tiles, roof panels, ceiling panels, floor panels, I beams, foundation walls and the like. The compositions exhibit greater strength than prior art LWC compositions.

In an embodiment of the invention, the molded construction articles and materials can be pre-cast and/or pre-stressed.

A particular advantage that the present invention provides is that the set concrete composition and/or molded construction articles formed from such compositions can be readily cut and/or sectioned using conventional methods as opposed to having to use specialized concrete or diamond tipped cutting blades and/or saws. This provides substantial time and cost savings when customizing concrete articles.

The compositions can be readily cast into molds according to methods well known to those of skill in the art for roofing tiles in virtually any three dimensional configuration desired, including configurations having certain topical textures such as having the appearance of wooden shakes, slate shingles or smooth faced ceramic tiles. A typical shingle can have approximate dimensions of ten inches in width by seventeen inches in length by one and three quarters inches in thickness. In the molding of roofing materials, the addition of an air entrainment agent makes the final product more weatherproof in terms of resistance to freeze/thaw degradation.

When foundation walls are poured using the LWC compositions of the invention, the walls can be taken above grade due to the lighter weight. Ordinarily, the lower part of the foundation wall has a tendency to blow outwards under the sheer weight of the concrete mixture, but the lighter weight of the compositions of the invention tend to lessen the chances of this happening. Foundation walls prepared using the present LWC compositions can readily take conventional fasteners used in conventional foundation wall construction.

Embodiments of the present invention provide a stay in place insulating concrete forming system that is continuous in nature with length being limited only by transportation and handling limitations, where the present lightweight concrete composition is poured and allowed to set in the insulating concrete forming system. The present insulating concrete forming system includes two opposing foamed plastic faces, containing an expanded polymer matrix, connected internally and spaced apart by perforated structural metal members. The foamed plastic faces and metal spacing members are aligned within the form to properly position vertically and horizontally concrete reinforcement steel, while allowing for proper concrete flow and finish work attachments. The molded in structural steel members act as internal bracing keeping the forms straight and aligned during concrete placement eliminating the need for most external blocking.

Further, the present invention provides pre-formed insulated concrete forms, into which the present lightweight concrete composition can be formed, that include one or more reinforcing structural elements or bars running longitudinally, the end of which are at least partially embedded in oppositely facing expanded polymer bodies. The remainder of the reinforcing structural element(s), the portion between the expanded polymer bodies, are at least partially exposed. The portions of the ends that are encapsulated in the expanded polymer matrix can provide a thermal break from the external environment. The reinforcing structural elements can be flanged lengthwise on either side to provide attachment points for external objects to the panel. Perforations in the reinforcing structural elements in the end portions which are encapsulated in the expanded polymer matrix allow for fusion of the expandable polymer particles perpendicularly. Perforations in the exposed portion of the reinforcing structural element provide attachment points for lateral bracing and/or rebar and allow for uniform concrete flow when concrete is poured into the present insulated concrete form. A tongue and groove or overlapping connection point design provides for panel abutment while maintaining the integrity of the concrete form. Longitudinal holes can run through the expanded polymer matrix and can be variable in diameter and location to provide areas for placement of utilities, lightening the structure and channels for venting of gasses. Panel manufacture is accomplished through the use of a semi-continuous or continuous molding process allowing for variable panel lengths.

The embedded framing studs or floor joists used in the invention can be made of any suitable material. Suitable materials are those that add strength, stability and structural integrity to the pre-formed building panels. Such materials provide embedded framing studs meeting the requirements of applicable test methods known in the art, as non-limiting examples ASTM A 36/A 36M-05, ASTM A 1011/A 1011M-05a, ASTM A 1008/A 1008M-05b, and ASTM A 1003/A 1003M-05 for various types of steel.

Suitable materials include, but are not limited to metals, construction grade plastics, composite materials, ceramics, combinations thereof, and the like. Suitable metals include, but are not limited to, aluminum, steel, stainless steel, tungsten, molybdenum, iron and alloys and combinations of such metals. In a particular embodiment of the invention, the metal bars, studs, joists and/or members are made of a light gauge metal.

Suitable construction grade plastics include, but are not limited to reinforced thermoplastics, thermoset resins, and reinforced thermoset resins. Thermoplastics include polymers and polymer foams made up of materials that can be repeatedly softened by heating and hardened again on cooling. Suitable thermoplastic polymers include, but are not limited to homopolymers and copolymers of styrene, homopolymers and copolymers of $C_2$ to $C_{20}$ olefins, $C_4$ to $C_{20}$ dienes, polyesters, polyamides, homopolymers and copolymers of $C_2$ to $C_{20}$ (meth)acrylate esters, polyetherimides, polycarbonates, polyphenylethers, polyvinylchlorides, polyurethanes, and combinations thereof.

Suitable thermoset resins are resins that when heated to their cure point, undergo a chemical cross-linking reaction causing them to solidify and hold their shape rigidly, even at elevated temperatures. Suitable thermoset resins include, but are not limited to alkyd resins, epoxy resins, diallyl phthalate resins, melamine resins, phenolic resins, polyester resins, urethane resins, and urea, which can be crosslinked by reaction, as non-limiting examples, with diols, triols, polyols, and/or formaldehyde.

Reinforcing materials and/or fillers that can be incorporated into the thermoplastics and/or thermoset resins include, but are not limited to carbon fibers, aramid fibers, glass fibers, metal fibers, woven fabric or structures of the mentioned fibers, fiberglass, carbon black, graphite, clays, calcium carbonate, titanium dioxide, woven fabric or structures of the above-referenced fibers, and combinations thereof.

A non-limiting example of construction grade plastics are thermosetting polyester or vinyl ester resin systems reinforced with fiberglass that meet the requirements of required test methods known in the art, non-limiting examples being ASTM D790, ASTM D695, ASTM D3039 and ASTM D638.

The thermoplastics and thermoset resins can optionally include other additives, as a non-limiting example ultraviolet (UV) stabilizers, heat stabilizers, flame retardants, structural enhancements, biocides, and combinations thereof.

In a particular embodiment of the invention, the embedded framing studs or embedded floor joists are made of a light gauge metal.

The embedded studs or embedded floor joists described herein can have a thickness of at least 0.4 mm, in some cases at least 0.5 mm, in other cases at least 0.75 mm, in some instances at least 1 mm, in other instances at least 1.25 mm and in some circumstances at least 1.5 mm and can have a thickness of at least 10 mm, in some cases at least 8 mm, in other cases at least 6 mm, in some instances at least 4 mm and in other cases at least 2 mm. The thickness of the embedded studs or embedded floor joists will depend on the intended use of the pre-formed building panel.

In an embodiment of the invention, the embedded framing studs or embedded floor joists have holes or openings along their length to facilitate fusion of the expanded plastic material and to reduce any thermal bridging effects in the reinforcing bars, studs, joists and/or members.

In the present invention, the foamed plastic faces can be molded from any suitable expandable plastic material, as described above, on a molding machine capable of inserting the metal members and forming two opposing face panels while maintaining the composite materials in their relative position in a continuous or semi continuous process.

The expanded polymer matrix makes up the expanded polymer body described herein below. The expanded polymer matrix is typically molded from expandable thermoplastic particles. These expandable thermoplastic particles are made from any suitable thermoplastic homopolymer or copolymer. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer as described above with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, wherein the vinyl aromatic monomer is present in at least 50% by weight of the copolymer. In an embodiment of the invention, styrenic polymers are used, particularly polystyrene. However, other suitable polymers can be used, such as polyolefins (e.g. polyethylene, polypropylene), polycarbonates, polyphenylene oxides, and mixtures thereof.

In a particular embodiment of the invention, the expandable thermoplastic particles are expandable polystyrene (EPS) particles. These particles can be in the form of beads, granules, or other particles convenient for the expansion and molding operations. Particles polymerized in an aqueous suspension process are essentially spherical and are useful for molding the expanded polymer body described herein below. These particles can be screened so that their size ranges from about 0.008 inches (0.2 mm) to about 0.1 inches (2.5 mm).

The expandable thermoplastic particles can be impregnated using any conventional method with a suitable blowing agent. As a non-limiting example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g. CFC's and HCFC'S, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540 in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated thermoplastic particles are generally pre-expanded to a density of at least 0.5 lb/ft$^3$ (0.008 g/cc), in some cases at least 1 lb/ft$^3$ (0.016 g/cc), in other cases at least 1.25 lb/ft$^3$ (0.02 g/cc), in some situations at least 1.5 lb/ft$^3$ (0.024 g/cc), in other situations at least 2 lb/ft$^3$ (0.032 g/cc), and in some instances at least about 3 lb/ft$^3$ (0.048 g/cc). Also, the density of the impregnated pre-expanded particles can be up to 35 lb/ft$^3$ (0.56 g/cc), in some cases up to 30 lb/ft$^3$ (0.48 g/cc), and in other cases up to 25 lb/ft$^3$ (0.4 g/cc). The density of the impregnated pre-expanded particles can be any value or range between any of the values recited above. The pre-expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175.

The impregnated thermoplastic particles can be foamed cellular polymer particles as taught in U.S. patent application Ser. No. 10/021,716, the teachings of which are incorporated herein by reference. The foamed cellular particles can be polystyrene that are pre-expanded and contain a volatile blowing agent at a level of less than 6.0 weight percent, in some cases ranging from about 2.0 wt % to about 5.0 wt %, and in other cases ranging from about 2.5 wt % to about 3.5 wt % based on the weight of the polymer.

An interpolymer of a polyolefin and in situ polymerized vinyl aromatic monomers that can be included in the expandable thermoplastic resin according to the invention is disclosed in U.S. Pat. Nos. 4,303,756 and 4,303,757 and U.S. Application Publication 2004/0152795, the relevant portions of which are herein incorporated by reference. A non-limiting example of interpolymers that can be used in the present invention include those available under the trade name ARCEL®, available from NOVA Chemicals Inc., Pittsburgh, Pa. and PIOCELAN®, available from Sekisui Plastics Co., Ltd., Tokyo, Japan.

The expanded polymer matrix can include customary ingredients and additives, such as pigments, dyes, colorants, plasticizers, mold release agents, stabilizers, ultraviolet light absorbers, mold prevention agents, antioxidants, and so on. Typical pigments include, without limitation, inorganic pigments such as carbon black, graphite, expandable graphite, zinc oxide, titanium dioxide, and iron oxide, as well as organic pigments such as quinacridone reds and violets and copper phthalocyanine blues and greens.

In a particular embodiment of the invention the pigment is carbon black, a non-limiting example of such a material being EPS SILVER®, available from NOVA Chemicals Inc.

In another particular embodiment of the invention the pigment is graphite, a non-limiting example of such a material being NEOPOR®, available from BASF Aktiengesellschaft Corp., Ludwigshafen am Rhein, Germany.

The pre-expanded particles or "pre-puff" are heated in a closed mold in the semi-continuous or continuous molding process described below to form the pre-formed building panels according to the invention.

The pre-formed building panels used in the present invention can be made using batch shape molding techniques. However, this approach can lead to inconsistencies and can be very time intensive and expensive.

Alternatively, the foamed plastic faces can be molded from any suitable expandable plastic material, as described above, on a molding machine capable of inserting the metal members and forming two opposing face panels while maintaining the composite materials in their relative position in a continuous or semi continuous process.

The pre-formed building panels used to make the ICF units and other building panels described herein can be made using an apparatus for molding a semi-continuous or continuous foamed plastic element that includes a) One or more molds that include:
 i) a bottom wall, a pair of opposite side walls and a cover, and
 ii) a molding seat, having a shape mating that of the element, defined in the mold between the side walls, the bottom wall and the cover;
b) means for displacing the covers and the side walls of the molds towards and away from the bottom wall to longitudinally close and respectively open the mold; and
c) first means for positioning in an adjustable manner said covers away from and towards said bottom wall of the mold to control in an adjustable and substantially continuous manner the height of the molding seat.

The apparatus is configured to include the embedded framing studs or embedded floor joists configured as discussed herein. As a non-limiting example, the methods and apparatus disclosed in U.S. Pat. No. 5,792,481 can be adapted to make the ICF units, of the present invention. The relevant parts of U.S. Pat. No. 5,792,481 are incorporated herein by reference.

More particularly, the present insulated concrete form includes a first body, substantially parallelepipedic in shape, containing an expanded polymer matrix, having opposite faces, a first surface, and an opposing second surface; a second body, substantially parallelepipedic in shape, containing an expanded polymer matrix, having opposite faces, a first surface, an opposing second surface; and one or more embedded studs logitudinally extending across the first body and the second body between the first surfaces of each body, having a first end embedded in the expanded polymer matrix of the first body, and a second end embedded in the expanded polymer matrix of the second body. One or more expansion holes are provided in the portion of the embedded stud embedded in the first body and the second body. The first body and the second body include a polymer matrix that expands through the expansion holes. The space defined between the first surfaces of the first body and the second body is capable of accepting concrete poured therein.

An embodiment of the present invention provides insulated concrete forms (ICF) and ICF systems. As shown in FIG. 1, ICF 510 includes first expanded polymer body 511 and second expanded polymer body 512, left facing embedded metal studs 514, and right facing embedded metal studs 516 (reinforcing embed bars). The embedded metal studs 514 and 516 have embedded ends 520 and 522 respectively that do not touch outer surface 524 of first expanded polymer body 511. Embedded metal studs 514 and 516 have embedded ends 521 and 523 respectively that are adjacent to outer surface 525 of second expanded polymer body 512. Space 505 is defined as the space between inner surface 530 of first expanded polymer body 511 and inner surface 531 of second expanded polymer body 512 for the height of ICF 510.

Expanded polymer bodies 511 and 512 can have a thickness, measured as the distance from inner surface 530 or 531 respectively to outer surface 524 or 525 respectively of at least 2, in some cases at least 2.5, and in other cases at least 3 cm and can be up to 10, in some cases up to 8, and in other cases up to 6 cm from inner surface 30 of expanded polymer body 512. The thickness of expanded polymer bodies 511 and 512 can independently be any dimension or range between any of the dimensions recited above.

Embedded ends 520 and 522 extend at least 1, in some cases at least 2, and in other cases at least 3 cm into expanded polymer body 512 away from inner surface 530. Also, Embedded ends 520 and 522 can extend up to 10, in some cases up to 8, and in other cases up to 6 cm away from inner surface 530 into first expanded polymer body 511. Embedded ends 526 and 528 can extend any of the distances or can range between any of the distances recited above from inner surface 530 into polymer body 511.

In another embodiment of the invention, embedded ends 520 and 522 can extend from $1/10$ to $9/10$, in some cases $1/3$ to $2/3$ and in other cases $1/4$ to $3/4$ of the thickness of first expanded polymer body 511 into expanded polymer body 511.

The orientation of embedded metal studs 514 and 516 is referenced by the direction of ends 520, 521, 522, and 523. The ends can be oriented in any direction that suits the strength, attachment objectives or stability of the insulated concrete form.

The spacing between each of embedded metal studs 514 and 516 is typically adapted to be consistent with local construction codes or methods, but can be modified to suit special needs. As such, the spacing between the metal studs can be at least 10, in some instances at least 25 and in some cases at least 30 cm and can be up to 110, in some cases up to 100, in other cases up to 75, and in some instances up to 60 cm. The spacing between embedded metal studs 514 and 516 can be any distance or range between any of the distances recited above.

ICF 510 can extend for a distance with alternating embedded metal studs 514 and 516 placed therein. The length of ICF 510 can be any length that allows for safe handling and minimal damage to ICF 510. The length of ICF 510 can typically be at least 1, in some cases at least 1.5, and in other cases at least 2 m and can be up to 25, in some cases up to 20, in other cases up to 15, in some instances up to 10 and in other instances up to 5 m. The length of ICF 510 can be any value or can range between any of the values recited above. In some embodiments of the invention, each end of ICF 510 is terminated with an embedded metal stud.

The height of ICF 510 can be any height that allows for safe handling, minimal damage, and can withstand the pressure from concrete poured within ICF 510. The height of ICF 510 can be at least 1 and in some cases at least 1.25 m and can be up to 3 M and in some cases up to 2.5 m. In some instances, in order to add stability to ICF unit 510, reinforcing cross-members or rebar (not shown) can be attached to embedded metal studs 514 and 516. The height of ICF 10 can be any value or can range between any of the values recited above.

Space 505, the space between inner surface 530 and inner surface 531 for the height of ICF 510, can be any suitable volume and/or dimensions. Suitable volume and/or dimensions are those where the weight of the lightweight concrete poured into space 505 is not so high as to cause any part of ICF 510 to fail, i.e., allow concrete to break through ICF 510 such that the volume of concrete is not contained in space 505, but large enough that the poured and set concrete can support whatever is to be built on the resulting ICF concrete wall. Thus, the distance between inner surface 530 and inner surface 531 taken with the height defined above can be at least 5 in some cases at least 10 and in other cases at least 12 cm and can be up to 180, in some cases up to 150 cm and in other cases up to 120 cm. In some instances, in order to add stability to ICF unit 510, reinforcing cross-members or rebar (not shown) can be attached to embedded metal studs 514 and 516. The distance between inner surface 530 and inner surface 531 can be any value or can range between any of the values recited above.

In a particular embodiment of the invention, ICF 510 can be used as a storm wall. In this embodiment, space 505 is filled with the present lightweight concrete composition as described herein and the distance from inner surface 530 to inner surface 531 can be at least 2 in some cases at least 5 and in other cases at least 10 cm and can be up to 16, in some cases up to 14 cm and in other cases up to 12 cm. In this storm wall embodiment, the distance between inner surface 530 and inner surface 531 can be any value or can range between any of the values recited above.

Storm walls made according to the present invention can be used as any of the other wall panels and tilt-up walls described herein.

As shown in FIG. 1, ICF 510 has a finite length and first body 511 and second body 512 have an inner lip terminus 517 and an outer lip terminus 518. Typically, lengths of ICF 510 are interconnected by inserting an inner lip terminus 517 of one ICF 510 adjacent an outer lip terminus 518 of another ICF 510 to form a continuous ICF. Thus, a larger ICF containing any number of ICF 510 units can be assembled and/or arrayed.

Figure 2:
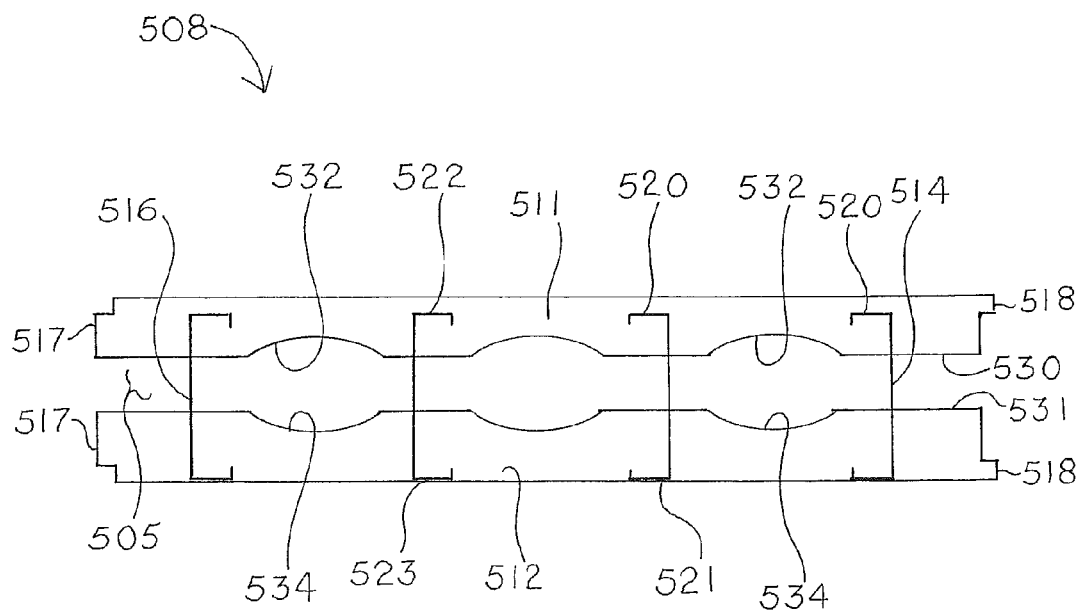
FIG. 2 shows a top plan view of a pre-formed insulated concrete form according to the invention.

An alternative embodiment of the invention is shown in FIG. 2, where ICF 508 is similar to ICF 510 except that inner surface 530 of body 511 and inner surface 531 of body 512 include oppositely opposed inner arching sections 532 and 534 respectively. Inner arching sections 532 and 534 provide a non-linear space within ICF 508, such that lightweight concrete poured into ICF 508 will have sections that have a larger cross-sectional width and sections having a smaller cross-sectional width.

Figure 3:
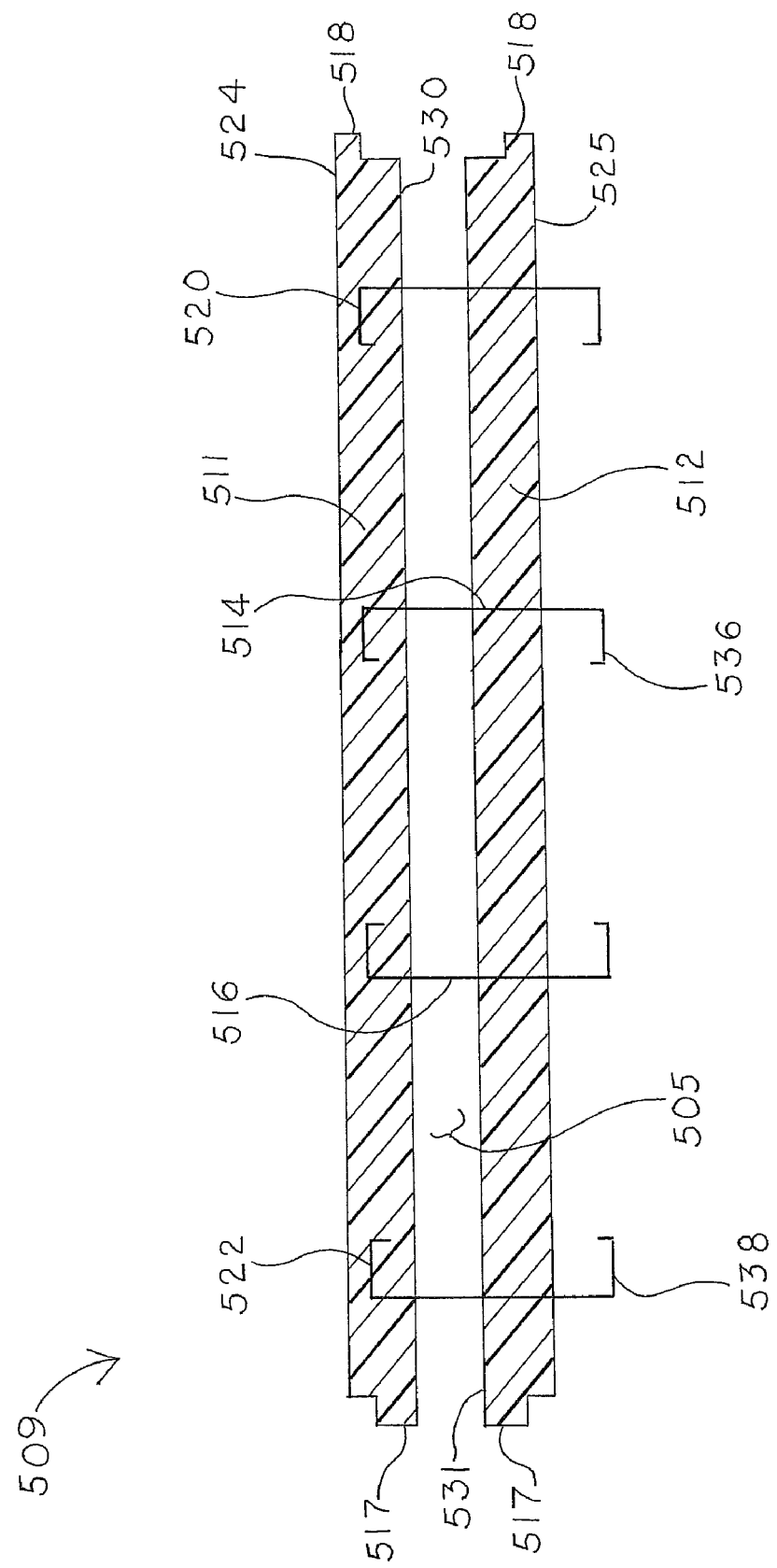
FIG. 3 shows a cross-sectional view of a pre-formed insulated concrete form according to the invention.

In another embodiment of the invention shown in FIG. 3, ICF 509 has exposed ends 536 and 538 instead of embedded ends 521 and 523. Exposed ends 536 and 538 extend at least 1, in some cases at least 2, and in other cases at least 3 cm away from outer surface 525 of second expanded polymer body 512. Exposed ends 536 and 538 can be used to attach finish surfaces, such as drywall, plywood, paneling, etc. as described herein to ICF 509. Also, Exposed ends 536 and 538 can extend up to 60, in some cases up to 40, and in other cases up to 20 cm away from outer surface 525 of expanded polymer body 512. Exposed ends 536 and 538 can extend any of the distances or can range between any of the distances recited above from outer surface 525.

Referring to FIG. 3 embedded metal studs 514 and 516 can have utility holes (as described below) spaced along their length between outer surface 525 and exposed ends 536 and 538. The utility holes (not shown here, but as described and illustrated below) are useful for accomodating utilities such as wiring for electricity, telephone, cable television, speakers, and other electronic devices, gas lines and water lines. The utility holes can have various cross-sectional shapes, non-limiting examples being round, oval, elliptical, square, rectangular, triangular, hexagonal or octagonal. The cross-sectional area of the utility holes can also vary independently one from another or they can be uniform. The cross-sectional area of the utility holes is limited by the dimensions of embedded metal studs 514 and 516, as the utility holes will fit within their dimensions and not significantly detract from their structural integrity and strength. The cross-sectional area of the utility holes can independently be at least 1, in some cases at least 2, and in other cases at least 5 cm$^2$ and can be up to 30, in some cases up to 25, in other cases up to 20 cm$^2$. The cross-sectional area of the utility holes can independently be any value or range between any of the values recited above.

In an embodiment of the invention, the utility holes can have a flanged and in many cases a rolled flange surface to provided added strength to the embedded metal studs.

Figure 4:
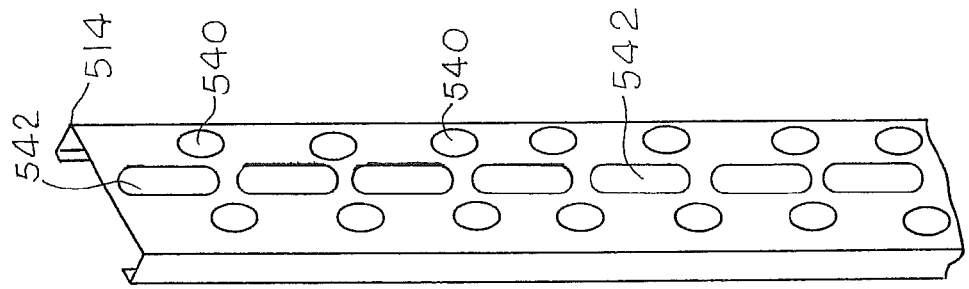
FIG. 4 shows a partial perspective view of a stud used in the invention.
Figure 5:
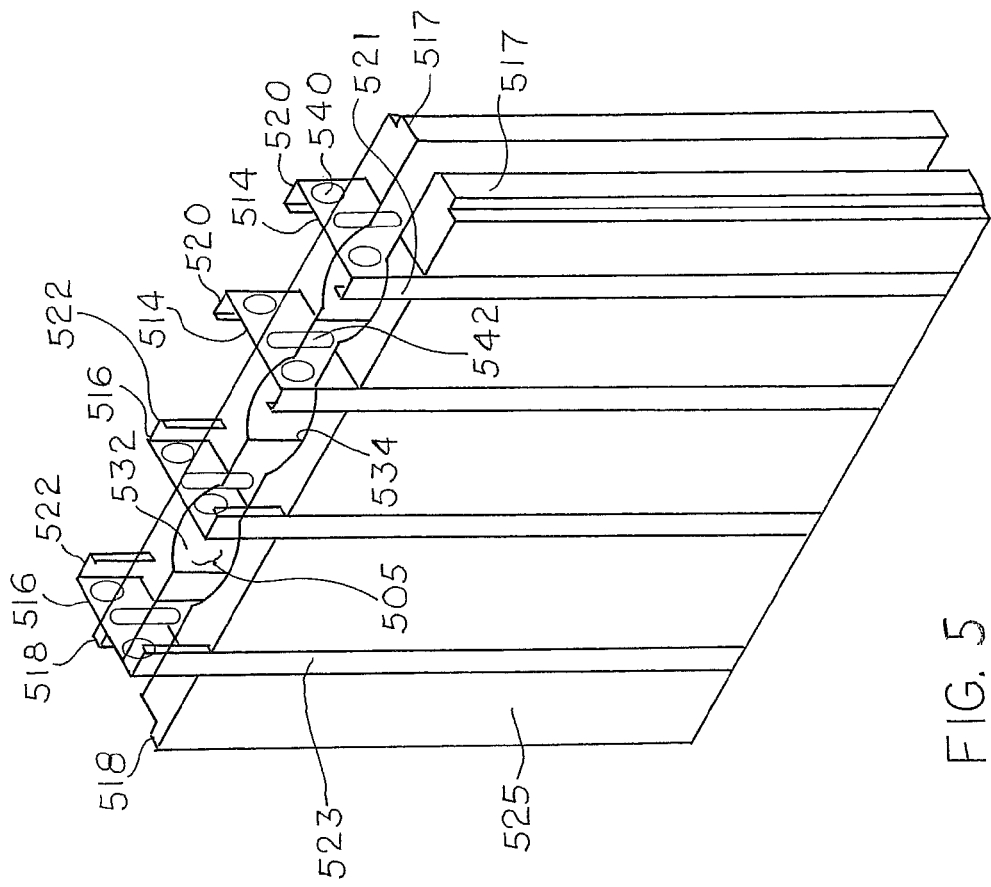
FIG. 5 shows a perspective view of a pre-formed insulated concrete form according to the invention.

FIGS. 4 and 5 show features of the present ICF and storm panels as they relate to ICF 508 (FIG. 2). A feature of embedded metal studs 514 and 516 is that they can include expansion holes 540 and pour holes 542. As such pour holes 544 can be a punched hole extending along the vertical axis of embedded metal studs 514 and/or 516 that is positioned to allow the free flow of the lightweight concrete and to fix and position horizontal concrete reinforcements. Similarly, expansion holes 540 can be a punched hole of sufficient diameter or slot of sufficient void area to allow the fusion and flow of the polymer matrix through the formed plastic panel.

Figure 6:
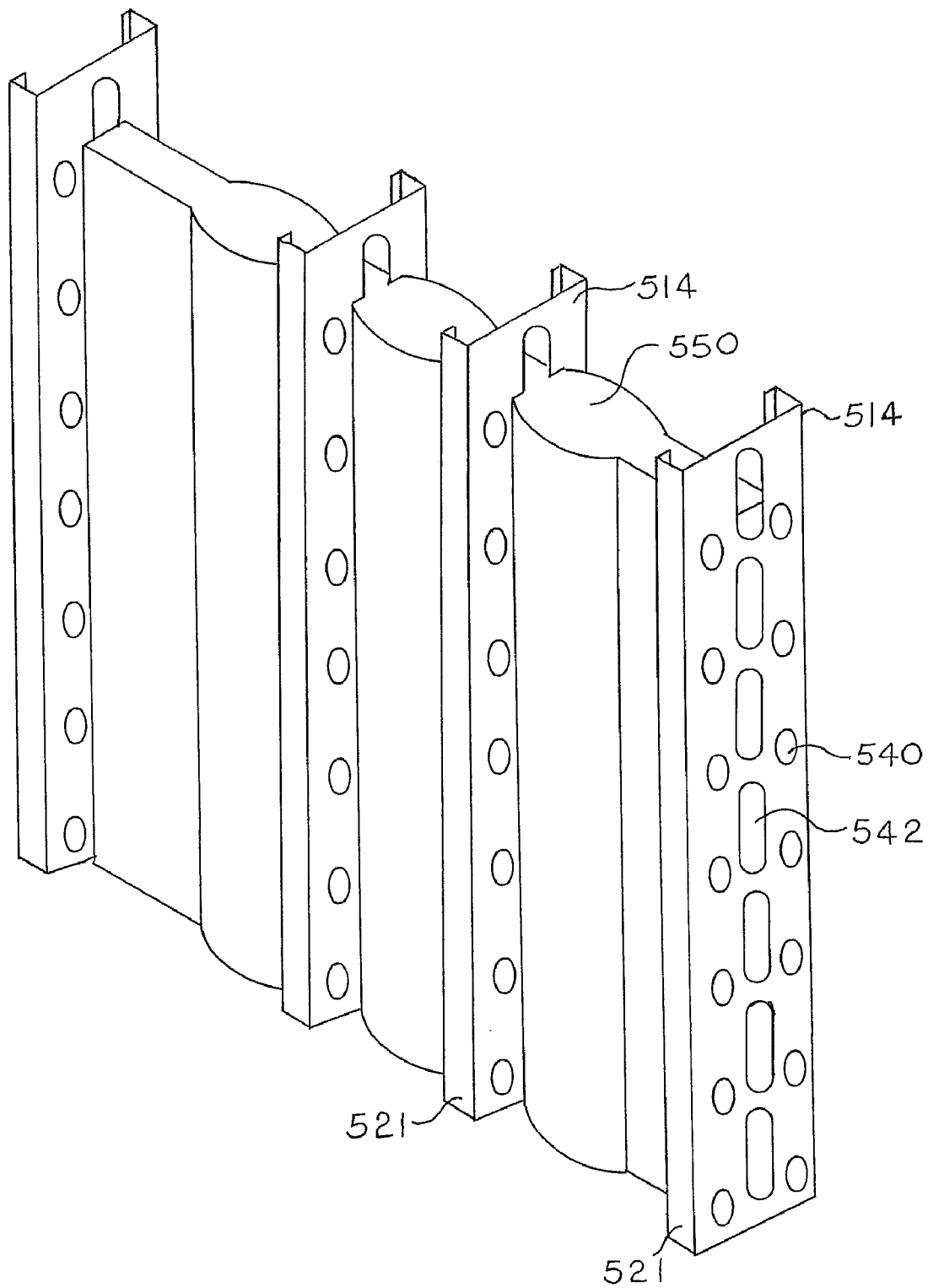
FIG. 6 shows a perspective view of the concrete and stud portion of an insulated concrete form according to the invention.
Figure 7:
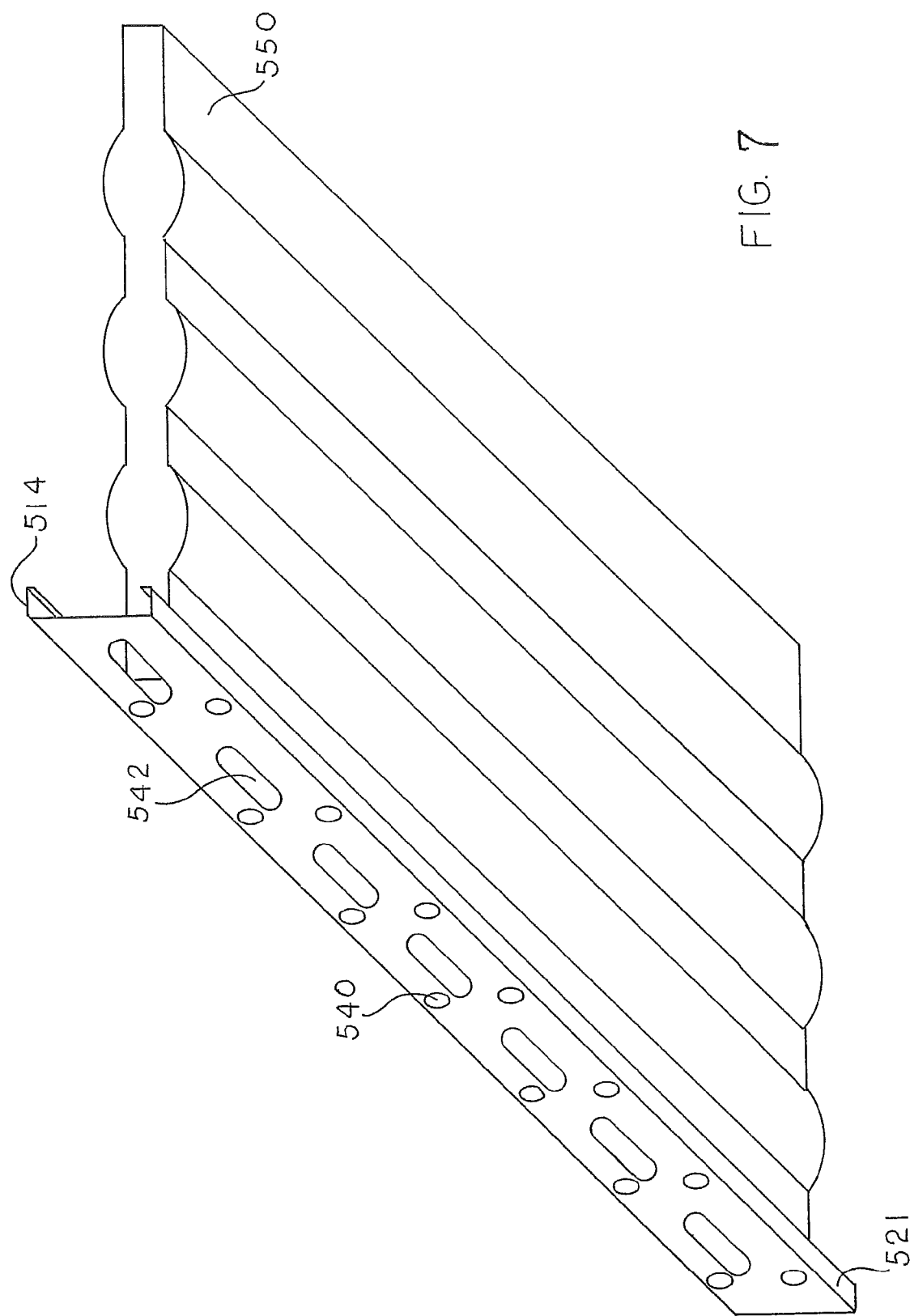
FIG. 7 shows a perspective view of the concrete and a stud portion of an insulated concrete form according to the invention.

The molded in light gauge metal structural members, embedded metal studs 514 and 516, can be continuously or semi continuously formed to create a composite panel of unlimited length. The structural metal members are strategically punched along the outer vertical axis to provide expansion holes 540, which allow for the flow of and fusion of the expandable plastic materials through the metal members. The center vertical axis of the metal member is punched to provide pour holes 542, which permit the free flow of normal concrete and to aid in the fixing and placement of horizontal concrete reinforcement materials. FIGS. 6 and 7 show the formed and set lightweight concrete 550 in relation to embedded metal studs 514.

Embedded ends 521 and 523 act as continuous furring strips running vertically on predetermined centers to aid in the direct connection of finish materials, top and bottom structural tracks, wall penetrations and roof and floor connection points, such as the level track described herein.

The expandable plastic materials in the composite panel acts as a forming panel when lightweight concrete is placed within the form and can also provides insulation and sound deadening. Further, the expandable plastic materials face of the composite panel acts as a forming panel when concrete is placed within the form and also provides insulation and sound deadening.

The design of the present ICF provides horizontal and vertical concrete pathways created by the two opposing face panels fixed by the light gauge structural members.

When lightweight concrete is poured into space 505 of the present ICF, an internal concrete post is formed by the two opposing face panels within the vertical post wall configuration of the panel design, set lightweight concrete 550. The concrete core created in the form acts as horizontal bracing to the light-gauge structural metal members in the present ICF. In the vertical post wall panel design the concrete core allows for horizontal reinforcement along the axis of the vertical post created between the form face panels.

In the present ICF, the interlocking panel ends formed by inner lip 517 and outer lip 518 are self aligning, self sealing and securely connect one panel side termination to the other panel side termination point, forming a continuous horizontal as well as continuous vertical concrete placement form.

Figure 8:
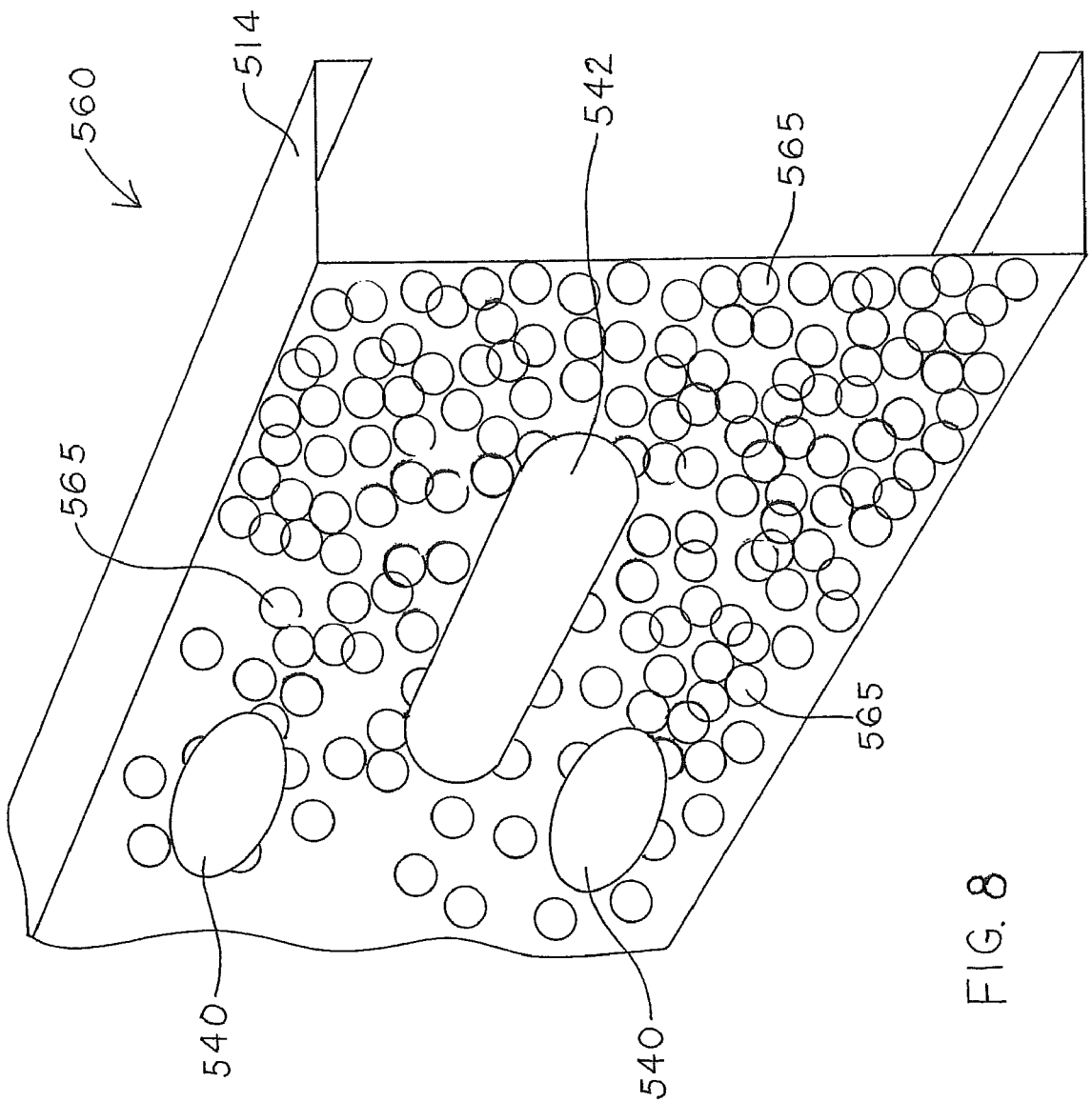
FIG. 8 shows a partial perspective view of a stud used in the invention.

FIG. 8 shows an embodiment of the invention where the surface of steel member 560, which can be used as embedded metal studs 514 and/or 516 in the present ICF have dimples 565 in opposing directions creating a surface that increases concrete adhesion and prevents cracking of the concrete in contact with steel member 560. The dimple effect on the member surface adds to the shear resistance of the steel and concrete composition. The dimpling of the steel surface creates a stronger connection between the foam and the steel member of the plastic foam faces of the panel when molded as a composite structure.

Figure 9:
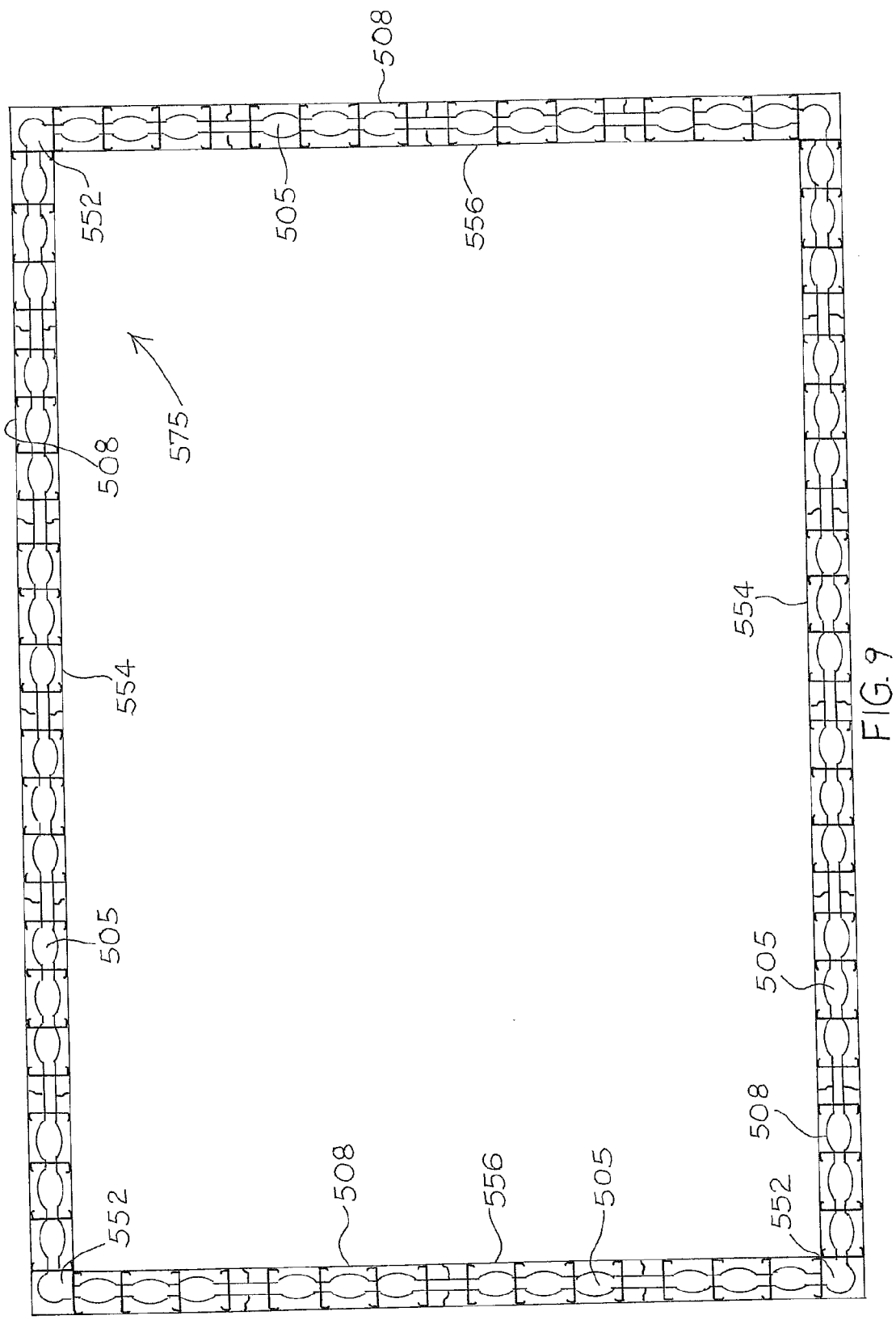
FIG. 9 shows a plan view of an insulated concrete form system according to the invention.

FIG. 9 shows an embodiment of an insulated concrete form system 575 for providing a foundation that includes a plurality of ICF's 508 connected end to end to form ICF system 575. Corner unit 552 is used to interconnect parallel ICF lines 554 and perpendicular ICF lines 556. Lightweight concrete is poured into space 505 of ICF wall system 575 and allowed to set to form a completed insulated concrete wall system.

Figure 10:
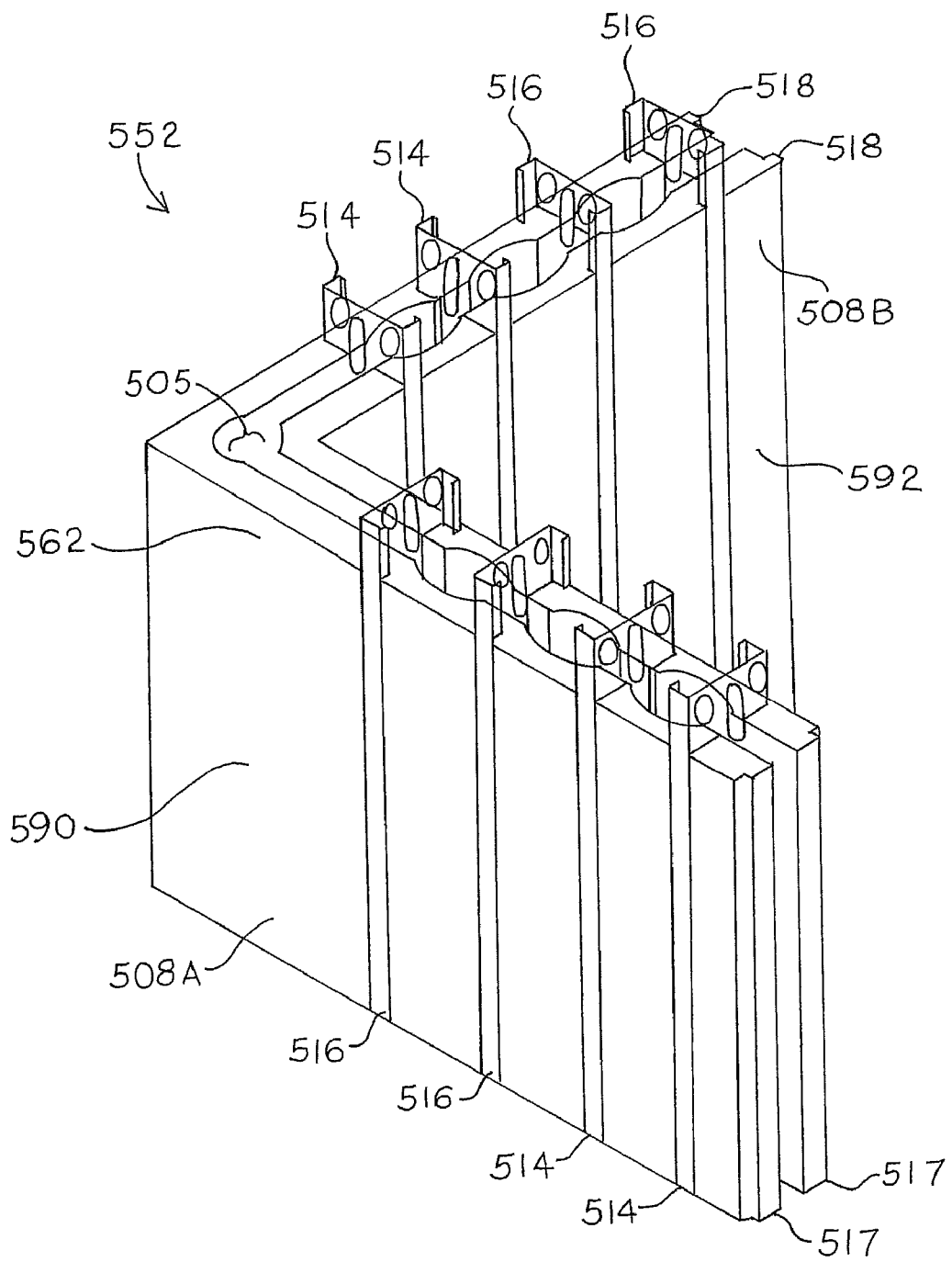
FIG. 10 shows an insulated concrete form corner unit according to the invention.
Figure 13:
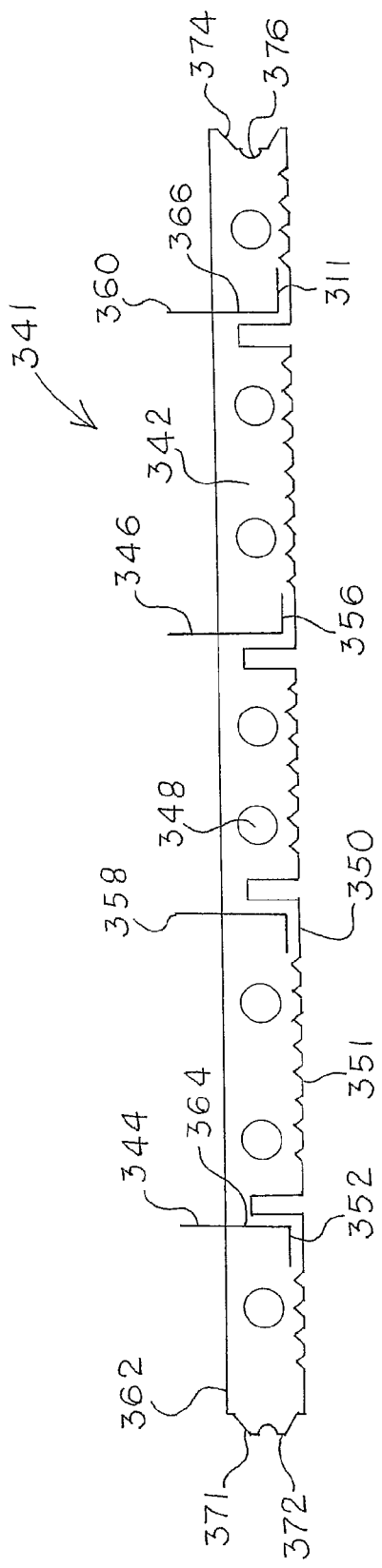
FIG. 13 shows a cross-sectional view of a reinforced body for use in making the concrete composite pre-formed tilt-up insulated panel in FIGS. 11 and 12.
Figure 16:
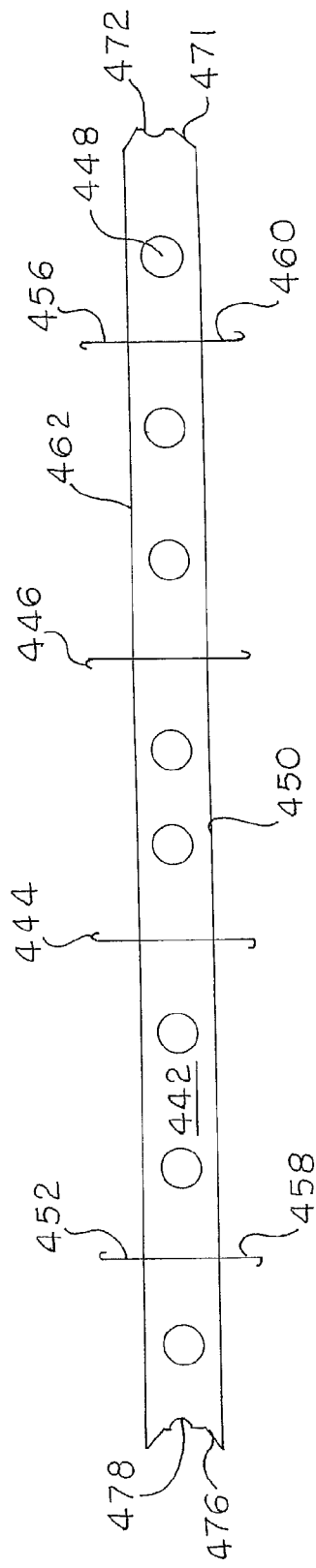
FIG. 16 shows a cross-sectional view of a reinforced body for use in making the concrete composite pre-formed tilt-up insulated panel in FIG. 15.
Figure 14:
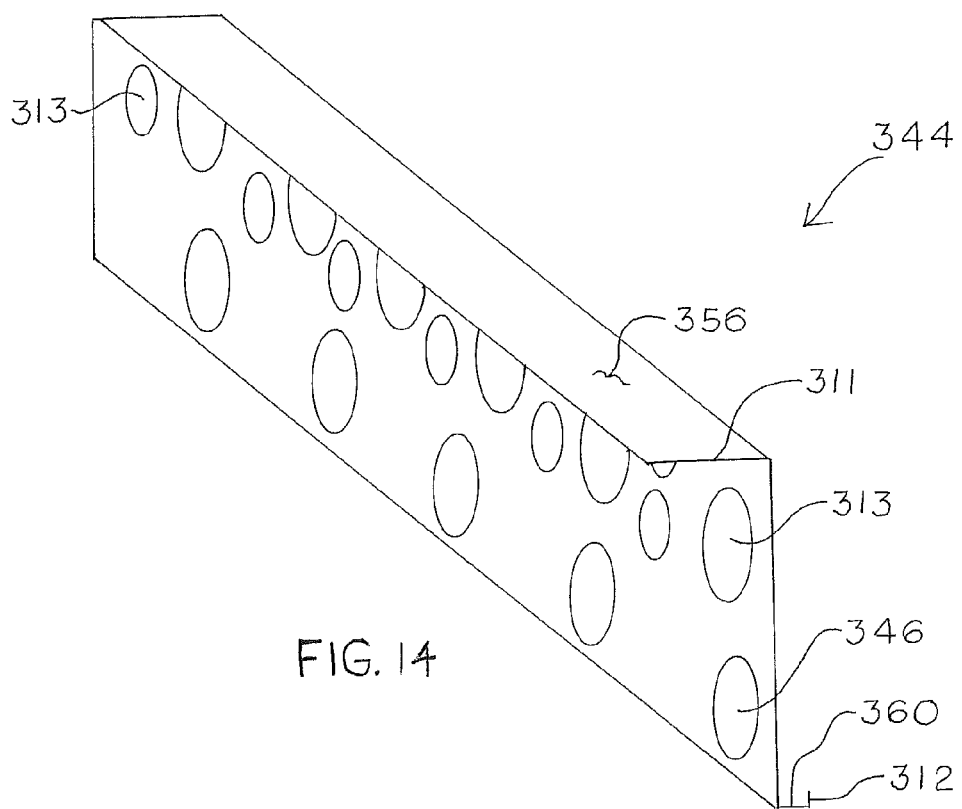
FIG. 14 shows a perspective view of an embedded metal stud for use in making the reinforced body in FIG. 13 and the concrete composite pre-formed tilt-up insulated panels in FIGS. 11 and 12.
Figure 18:
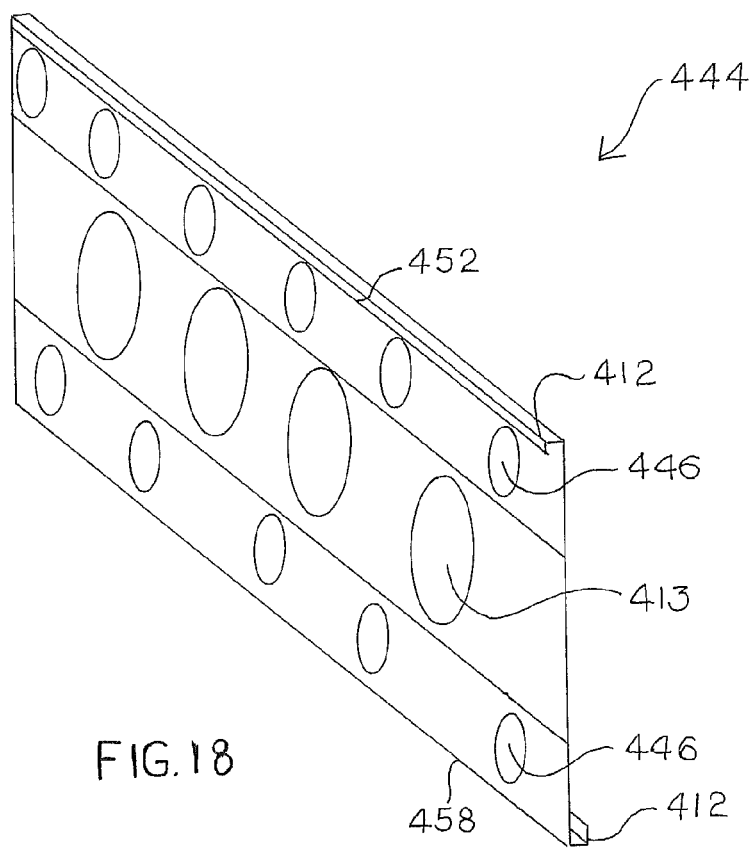
FIG. 18 shows a perspective view of an embedded metal stud for use in making the reinforced body in FIG. 16 and the concrete composite pre-formed tilt-up insulated panels in FIGS. 13 and 15.

Corner unit 552, as shown in FIG. 10 essentially includes a first ICF 508A and a second ICF 508B (like features are numbered as above) oriented at an angle to first ICF 508A, where corner section 552 is molded to include first ICF 508A and second ICF 508B to form a continuous first body 590 and a continuous second body 592 and providing a continuous space 505 there between.

Referring to FIG. 3, a particular advantages of ICF 509 includes the ability to easily run utilities prior to attaching a finish surface to the exposed ends of the embedded metal studs. The exposed metal studs facilitate field structural framing changes and additions and leave the structural portions of the assembly exposed for local building officials to inspect the framing.

A utility space defined by outer surface 525 of expanded polymer body 512 and exposed ends 536 and 538 can be adapted for accommodating utilities. Typically, exposed ends 536 and 538 have a finish surface attached to them, a side of which further defines the utility space.

In an embodiment of the invention, the utility space is adapted and dimensioned to receive standard and/or premanufactured components, such as windows, doors and medicine cabinets as well as customized cabinets and shelving.

Further, the air space between the outer surface of the expanded polymer body 512 and the finish surface allows for improved air circulation, which can minimize or prevent mildew. Additionally, because the metal studs are not in direct contact with the outside environment, thermal bridging via the highly conductive embedded metal studs is avoided and insulation properties are improved.

Suitable finish surfaces include, but are not limited to finish surfaces such as wood, rigid plastics, wood paneling, concrete panels, cement panels, drywall, SHEETROCK® plaster wall board (United States Gypsum Co., Chicago Ill.), particle board, rigid plastic panels, or any other suitable material having decorating and/or structural functions or other construction substrates In a particular type of wall construction useful in the invention uses foam plastic walls to form a sandwich structure containing the poured LWC composition. After hardening, the foam walls are left intact to add significantly to the insulation properties of the walls. Such walls can be made of extruded or expanded polymer particles as described above or the like, and frequently are available to contractors in preformed wall and corner units that snap or clip together, according to methods well known to those in the construction trades.

An embodiment of the invention relates to a tilt up insulated panel that is adapted for use as a wall or ceiling panel. As shown in FIGS. 11-14, one-sided wall panel 340 includes a reinforced body 341 that includes expanded polymer form 342 (central body) and embedded metal studs 344 and 346 (embedded reinforcing bars). Expanded polymer form 342 can include openings 348 and utility chases 349, which traverse all or part of the length of expanded polymer form 342. The embedded metal studs 344 and 346 have embedded ends 352 and 356 respectively that are not in contact with inner face 350 of expanded polymer form 342. The embedded metal studs 344 and 346 also have exposed ends 358 and 360 respectively that extend from outer face 362 of expanded polymer form 342.

Expanded polymer form 342 can have a thickness, measured as the distance from inner face 350 to outer face 362 of at least 8, in some cases at least 10, and in other cases at least 12 cm and can be up to 100, in some cases up to 75, and in other cases up to 60 cm. The thickness of expanded polymer form 342 can be any distances or can range between any of the distances recited above.

Exposed ends 358 and 360 extend at least 1, in some cases at least 2, and in other cases at least 3 cm away outer face 362 of expanded polymer form 342. Also, Exposed ends 358 and 360 can extend up to 60, in some cases up to 40, and in other cases up to 20 cm away from outer face 362 of expanded polymer form 342. Exposed ends 358 and 360 can extend any of the distances or can range between any of the distances recited above from outer face 362.

In an embodiment of the invention, embedded metal studs members 344 and 346 have a cross-sectional shape that includes embedding lengths 364 and 366, embedded ends 352 and 356, and exposed ends 358 and 360. The orientation of embedded metal studs members 344 and 346 is referenced by the direction of embedded ends 352 and 356. In a particular embodiment of the invention, embedded ends 352 and 356 are oriented away from each other. In this embodiment, one-sided wall panel 340 is adapted so that exposed ends 358 and 360 of embedded metal studs 344 and 346 are imbedded in concrete 370 that is applied to outer face 362.

The spacing between each of embedded metal studs 344 and 346 is at least 25 and in some cases at least 30 cm and can be up to 110, in some cases up to 100, in other cases up to 75, and in some instances up to 60 cm measured from a midpoint of exposed end 358 to a midpoint of exposed end 360. The spacing between embedded metal studs 344 and 346 can be any distance or range between any of the distances recited above.

In an embodiment of the invention, one-sided wall panel 340 includes expanded polymer body 342 (central body), embedded metal studs 344 and 346 (reinforcing embedded bars), which include flanges 311, cornered ends 312, utility holes 346 located in an exposed portion of embedded metal studs 344 and 346, expansion holes 313 in an embedded portion of embedded metal studs 344 and 346, and embedded ends 344 and 346, which do not touch inner face 350.

In an embodiment of the invention, inner face 350 can have a corrugated surface, which can be molded in or cut in, which enhances air flow between inner face 350 and any surface attached thereto.

Expansion holes 313 are useful in that as expanded polymer body 342 is molded, the polymer matrix expands through expansion holes 313 and the expanding polymer fuses. This allows the polymer matrix to encase and hold embedded metal studs 344 and 346 by way of fusion in the expanding polymer. In an embodiment of the invention, expansion holes 313 can have a flanged and in many cases a rolled flange surface to provided add strength to the embedded metal studs.

Openings 348 can have various cross-sectional shapes, non-limiting examples being round, oval, elliptical, square, rectangular, triangular, hexagonal or octagonal. The cross-sectional size of openings 348 can be uniform or they can vary independently of each other with regard to size and location relative to outer face 362 and inner face 350. The spacing between each opening 348 can be at least 1 and in some cases at least 3 cm and can be up to 110, in some cases up to 100, in other cases up to 75, and in some instances up to 60 cm measured from a midpoint of one opening 348 to an adjacent opening 348. The spacing between openings 348 can independently be any distance or range between any of the distances recited above.

The cross-sectional area of openings 348 can also vary independently one from another or they can be uniform. The cross-sectional area of openings 348 is limited by the dimensions of expanded polymer form 342, as openings 348 will fit within the dimensions of expanded polymer form 342. The cross-sectional area of openings 348 can independently be at least 1, in some cases at least 5, and in other cases at least 9 cm² and can be up to 130, in some cases up to 100, in other cases up to 75 cm². The cross-sectional area of openings 348 can independently be any value or range between any of the values recited above.

Reinforced body 341 has a finite length and has a male terminal end 371 that includes forward edge 372 and a receiving end 376 which includes recessed section 376, which is adapted to receive forward edge 372. Typically, lengths of one-sided wall panel 340 are interconnected by inserting a forward edge 372 from a first one-sided wall panel 340 into a recessed section 378 of a second one-sided wall panel. In this manner, a larger wall or ceiling section containing any number of one-sided wall panels can be assembled and/or arrayed. The width of one-sided wall panel 340, measured as the distance from protruding edge 380 to trailing edge 374 can typically be at least 20, in some cases at least 30, and in other cases at least 35 cm and can be up to 150, in some cases up to 135, and in other cases up to 125 cm. The width of one-sided wall panel 340 can be any value or can range between any of the values recited above.

An example of a one-sided wall panel 340 according to the invention is shown in FIG. 11, where four embedded metal studs 344 and 346 are used. The present LWC composition is poured, finished and set to form a concrete layer 370 that encases exposed ends 358 and 360 of embedded metal studs 344 and 346.

The embedded ends 350 and 356 of embedded metal studs 344 and 346 are available as attachment points for a finish surface such as wood, rigid plastics, wood paneling, concrete panels, cement panels, drywall, SHEETROCK plaster wall board, particle board, rigid plastic panels, or any other suitable material having decorating and/or structural functions or other construction substrates SHEETROCK plaster wall board 375 as shown in FIG. 11). In a particular embodiment of the invention, the lightweight gypsum based product described below is used as drywall or SHEETROCK plaster wall board 375. The attachment is typically accomplished through the use of screws.

An embodiment of the invention is shown in FIG. 12. In this embodiment, reinforcement mesh 371 is attached to exposed ends 358 and 360 of embedded metal studs 344 and 346. Reinforcement mesh 371 can be made of any suitable material, non-limiting examples being fiberglass, metals such as steel, stainless steel and aluminum, plastics, synthetic fibers and combinations thereof. Desirably, after reinforcement mesh 371 is attached to exposed ends 358 and 360, concrete layer 370 is poured, finished and set so as to encase reinforcement mesh 371 and exposed ends 358 and 360. In this embodiment, reinforcement mesh 371 increases the strength of concrete layer 370 as well as increasing the strength of the attachment of concrete layer 370 to reinforced body 341.

In an embodiment of the invention, one-sided wall panel 340 is assembled on a flat surface and a first end is lifted while a second end remains stationary resulting in orienting one-sided wall panel 340 generally perpendicular to the flat surface. This is often referred to as "tilting a wall" in the art and in this embodiment of the invention, one-sided wall panel 340 is referred to as a "tilt-up wall."

An embodiment of the invention relates to a second tilt up insulated panel that is adapted for use as a wall or ceiling panel. As shown in FIGS. 15-18, two-sided wall panel 440 includes a reinforced body 441 that includes expanded polymer form 442 (central body) and embedded metal studs 444 and 446 (embedded reinforcing bars). Expanded polymer form 442 can include openings 448 that traverse all or part of the length of expanded polymer form 442. The embedded metal studs 444 and 446 have a first exposed end 452 and second exposed end 456 respectively that extend from first face 462 of expanded polymer form 442. The embedded metal studs 444 and 446 also have second exposed ends 458 and 460 respectively that extend from second face 450 of expanded polymer form 442.

Expanded polymer form 442 can have a thickness, measured as the distance from second face 450 to first face 462 similar in dimensions to that described above regarding expanded polymer form 342.

The exposed ends can extend at least 1, in some cases at least 2, and in other cases at least 3 cm away either face 450 or face 462 of expanded polymer form 442. Also, The exposed ends can extend up to 60, in some cases up to 40, and in other cases up to 20 cm away from either face of expanded polymer form 442. The exposed ends can extend any of the distances or can range between any of the distances recited above from either face of expanded polymer form 442.

In an embodiment of the invention, exposed ends 452, 456, 458, and 460 are imbedded in first concrete layer 469 and second concrete layer 470 that are applied to faces 450 and 462.

The spacing between each of embedded metal studs 444 and 446 can be as described regarding embedded metal studs 344 and 346.

In an embodiment of the invention, two-sided wall panel 440 includes expanded polymer body 442 (central body), embedded metal studs 444 and 446 (reinforcing embedded bars), which cornered ends 412, utility holes 446 located in an exposed portion of embedded metal studs 444 and 446, and expansion holes 413 in an embedded portion of embedded metal studs 444 and 446.

Expansion holes 413 are useful in that as expanded polymer body 442 is molded, the polymer matrix expands through expansion holes 413 and the expanding polymer fuses. This allows the polymer matrix to encase and hold embedded metal studs 444 and 446 by way of fusion in the expanding polymer. In an embodiment of the invention, expansion holes 413 can have a flanged and in many cases a rolled flange surface to provided added strength to the embedded metal studs.

Openings 448 can have various cross-sectional shapes, and similar spacing and cross-sectional area as described regarding openings 348 in expanded polymer body 342.

Reinforced body 441 has a finite length and has a male terminal end 471 that includes forward edge 472 and a receiving end 476 which includes recessed section 478, which is adapted to receive forward edge 472. Typically, lengths of two-sided wall panel 440 are interconnected by inserting a forward edge 472 from a first two-sided wall panel 440 into a recessed section 478 of a second two-sided wall panel. In this manner, a larger wall or ceiling section containing any number of two-sided wall panels can be assembled and/or arrayed. The width of one-sided wall panel 440, measured as the distance from forward edge 472 to recessed section 478 can typically be at least 20, in some cases at least 30, and in other cases at least 35 cm and can be up to 150, in some cases up to 135, and in other cases up to 125 cm. The width of two-sided wall panel 440 can be any value or can range between any of the values recited above.

Figure 15:
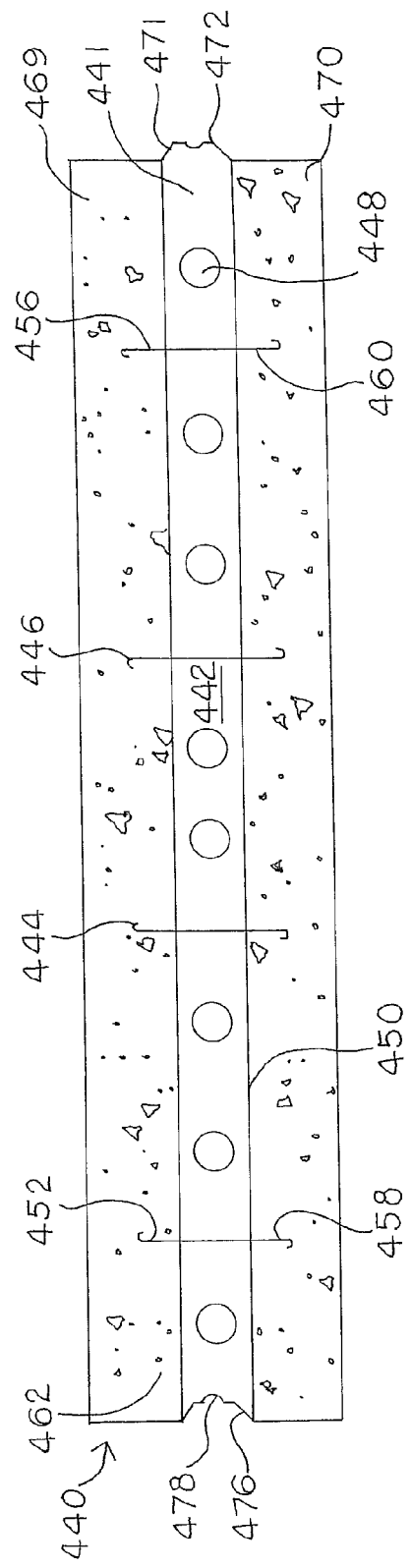
FIG. 15 shows a cross-sectional view of a concrete composite pre-formed tilt-up insulated panel according to the invention.

An example of a two-sided wall panel 440 according to the invention is shown in FIG. 15, where four embedded metal studs 444 and 446 are used. The present LWC composition is poured, finished and set to form concrete layers 469 and 470 that encases exposed ends 452, 456, 458, and 460 of the embedded metal studs.

Figure 17:
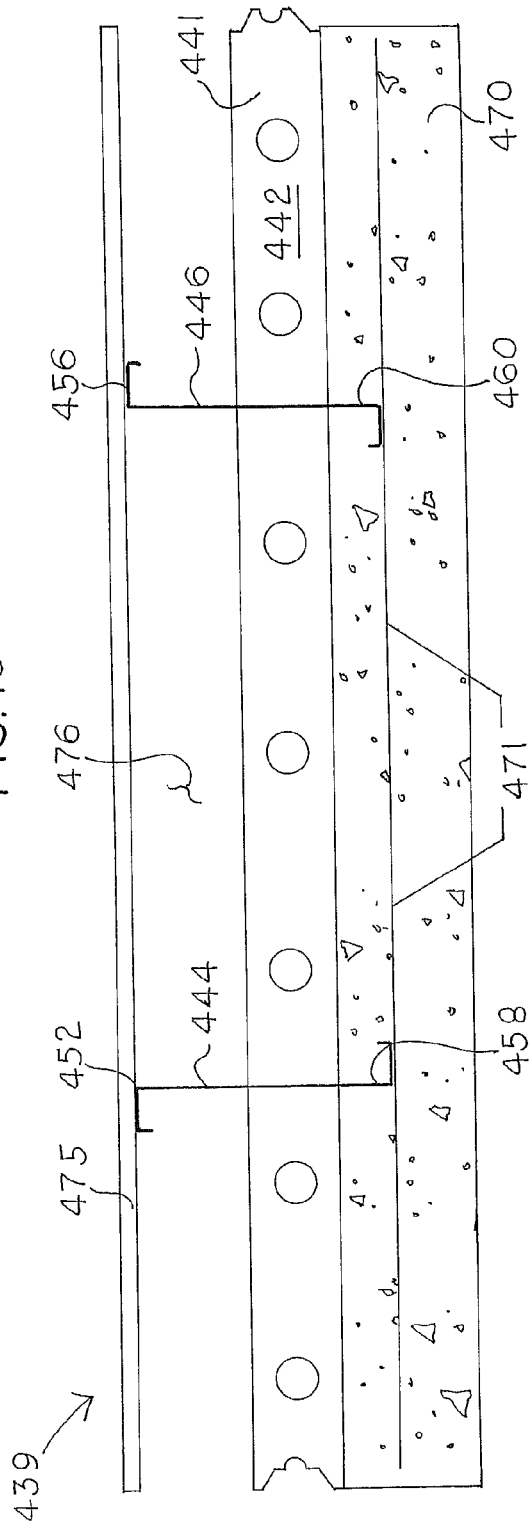
FIG. 17 shows a cross-sectional view of a concrete composite pre-formed tilt-up insulated panel according to the invention.

Alternatively, as shown in FIG. 17, two-sided wall panel 439 includes variations of two-sided wall panel 440. In two-sided wall panel 439 one (or alternatively both, which is not shown) of exposed ends 452 and 456 (and alternatively also 458 and 460) are available as attachment points for a finish surface 475 such as wood, rigid plastics, wood paneling, concrete panels, cement panels, drywall, SHEETROCK plaster wall board, particle board, rigid plastic panels, or any other suitable material having decorating and/or structural functions or other construction substrates. The drywall or SHEETROCK plaster wall board can include the lightweight gypsum based product described below. The attachment is typically accomplished through the use of screws. In this embodiment, the space 476 defined by the finished surface, the exposed ends 444 and 446 and the expanded polymer body 442 can be used to run utilities, insulation and anchors for interior finishes as described above.

In this alternative embodiment, reinforcement mesh 471 is attached to exposed ends 458 and 460 of embedded metal studs 444 and 446. Reinforcement mesh 471 can be made of any suitable material, non-limiting examples being fiberglass, metals such as steel, stainless steel and aluminum, plastics, synthetic fibers and combinations thereof. Desirably, after reinforcement mesh 471 is attached to exposed ends 458 and 460, concrete layer 470 is poured, finished and set so as to encase reinforcement mesh 471 and exposed ends 458 and 460. In this embodiment, reinforcement mesh 471 increases the strength of concrete layer 470 as well as increasing the strength of the attachment of concrete layer 470 to reinforced body 441.

In an embodiment of the invention, two-sided wall panel 440 is assembled on a flat surface and a first end is lifted while a second end remains stationary resulting in orienting two-sided wall panel 440 generally perpendicular to the flat surface, i.e., "tilting a wall" as described above.

The present invention also provides floor units and floor systems that include composite floor panels containing the present lightweight concrete composition. The floor panels generally include a central body, substantially parallelepipedic in shape, containing an expanded polymer matrix, having opposite faces, a top surface, and an opposing bottom surface; and two or more embedded floor joists longitudinally extending across the central body between the opposite faces, having a first end embedded in the expanded polymer matrix, having a first transverse member extending from the first end generally contacting or extending above the top surface, a second end extending away from the bottom surface of the central body having a second transverse member extending from the second end, and one or more expansion holes located in the embedded joists between the first end of the embedded joists and the bottom surface of the central body. The central body contains a polymer matrix as described above that expands through the expansion holes. The embedded joists include one or more utility holes located in the embedded joists between the bottom surface of the central body and the second end of the embedded joists and the space defined by the bottom surface of the central body and the second ends of the reinforcing embedded joists is adapted for accomodating utility lines. A concrete layer containing the present lightweight cementitious composition covers at least a portion of the top surface and/or bottom surface. The composite floor panel is positioned generally perpendicular to a structural wall and/or foundation.

Figure 19:
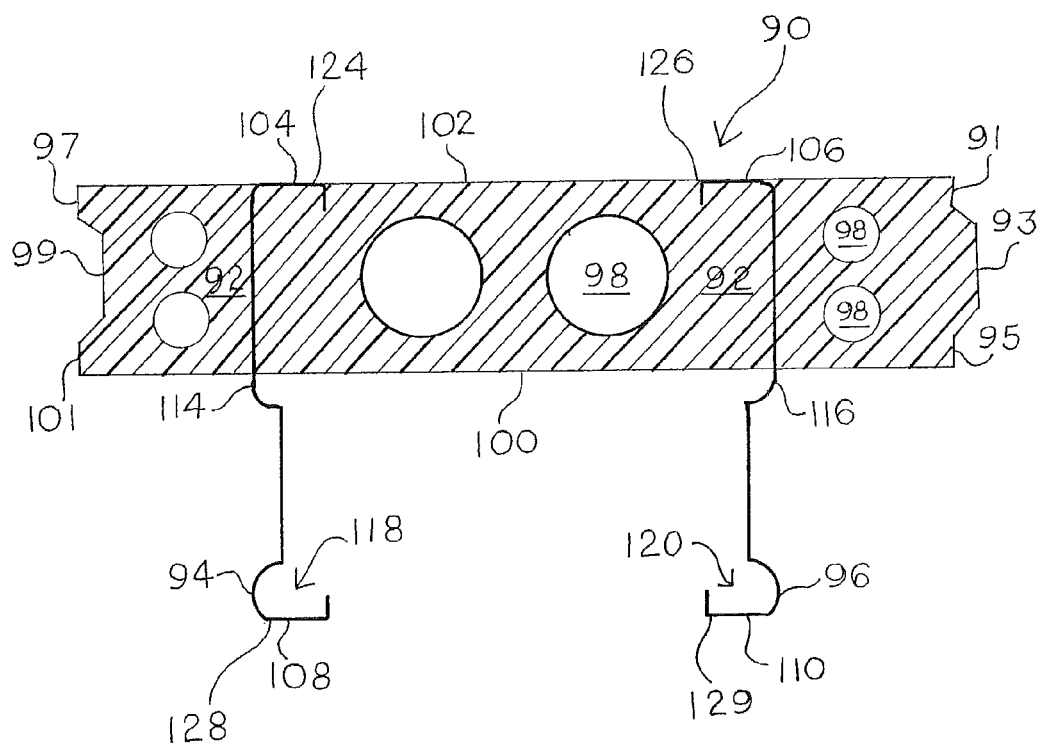
FIG. 19 shows a cross-sectional view of a pre-formed building panel according to the invention.

As shown in FIG. 19, floor unit 90 includes expandable polymer panel 92 (central body) and embedded metal joists 94 and 96 (reinforcing embedded bars). Expandable polymer panel 92 includes openings 98 that traverse all or part of the length of expanded polymer panel 92. The embedded metal joists 94 and 96 have embedded ends 104 and 106 respectively that are in contact with top surface 102 of expanded polymer panel 92. The embedded metal joists 94 and 96 also have exposed ends 108 and 110 respectively that extend from bottom surface 100 of expanded polymer panel 92.

Embedded metal joists 94 and 96 include first transverse members 124 and 126 respectively extending from embedded ends 104 and 106 respectively, which are generally in contact with top surface 102 and exposed ends 108 and 110 include second transverse members 128 and 129 respectively, which extend from exposed ends 108 and 110 respectively. The space defined by bottom surface 100 of expanded polymer panel 92 and the exposed ends 108 and 110 and second transverse members 128 and 129 of embedded metal joists 94 and 96 can be oriented to accept ductwork placed between embedded metal joists 94 and 96 adjacent bottom surface 100.

Expanded polymer panel 92 can have a thickness, measured as the distance from top surface 102 to bottom surface 100 of at least 2, in some cases at least 2.5, and in other cases at least 3 cm and can be up to 50, in some cases up to 40, in other cases up to 30, in some instances up to 25, in other instances up to 20, in some situations up to 15 and in other situations up to 10 cm from top surface 102 of expanded polymer panel 92. The thickness of panel 92 can be any distances or can range between any of the distances recited above.

Exposed ends 108 and 110 extend at least 1, in some cases at least 2, and in other cases at least 3 cm away from bottom surface 100 of expanded polymer panel 92. Also, Exposed ends 108 and 110 can extend up to 60, in some cases up to 40, and in other cases up to 20 cm away from bottom surface 100 of expanded polymer panel 92. Exposed ends 108 and 110 can extend any of the distances or can range between any of the distances recited above from bottom surface 100.

In an embodiment of the invention, embedded metal joists 94 and 96 have a cross-sectional shape that includes embedding lengths 114 and 116, embedded ends 104 and 106, and exposed ends 108 and 110. The orientation of embedded metal joists 94 and 96 is referenced by the direction of open ends 118 and 120. In an embodiment of the invention, open ends 118 and 120 are oriented toward each other. In this embodiment, floor unit 90 is adapted to accept ductwork. As a non-limiting example, a HVAC duct can be installed along the length of embedded metal joists 94 and 96.

As used herein, the term "ductwork" refers to any tube, pipe, channel or other enclosure through which air can flow from a source to a receiving space; non-limiting examples being air flowing from heating and/or air-conditioning equipment to a room, make-up air flowing from a room to heating and/or air-conditioning equipment, fresh air flowing to an enclosed space, and/or waste air flowing from an enclosed space to a location outside of the enclosed space. In some embodiments, ductwork includes generally rectangular metal tubes that are located below and extend generally adjacent to a floor.

The spacing between each of embedded metal joists 94 and 96 can be as described regarding embedded metal studs 344 and 346.

Openings 98 can have various cross-sectional shapes, and similar spacing and cross-sectional area as described regarding openings 348 in expanded polymer body 342.

As shown in FIG. 19, expanded polymer panel 92 can extend for a distance with alternating embedded metal joists 94 and 96 placed therein. The length of floor unit 90 can be any length that allows for safe handling and minimal damage to floor unit 90. The length of floor unit 90 can typically be at least 1, in some cases at least 1.5, and in other cases at least 2 m and can be up to 25, in some cases up to 20, in other cases up to 15, in some instances up to 10 and in other instances up to 5 m. The length of floor unit 90 can be any value or can range between any of the values recited above. In some embodiments, an end of floor unit 90 can be terminated with an embedded metal joist.

As shown in FIG. 19, expanded polymer panel 92 has a finite length and has a male terminal end 91 that includes forward edge 93 and trailing edge 95 and a receiving end 97 which includes recessed section 99 and extended section 101, which is adapted to receive forward edge 93, and trailing edge 95. Typically, lengths of floor units 90 are interconnected by inserting a forward edge 93 from a first floor unit 90 into a recessed section 99 from a second floor unit 90. In this manner, a larger floor section containing any number of floor units can be assembled and/or arrayed.

The width of floor unit 90 can be any width that allows for safe handling and minimal damage to floor unit 90. The width of floor unit 90 is determined by the length of embedded metal joists 94 and 96. The width of floor unit 90 can be at least 1 and in some cases at least 1.5 m and can be up to 3 m and in some cases up to 2.5 m. In some instances, in order to add stability to floor unit 90, reinforcing cross-members (not shown) can be attached to embedded metal joists 94 and 96. The width of floor unit 90 can be any value or can range between any of the values recited above.

Floor unit 90 is typically part of an overall floor system that includes a plurality of the composite floor panels described herein, where the male ends include a tongue edge and the female ends include a groove arrayed such that a tongue and/or groove of each panel is in sufficient contact with a corresponding tongue and/or groove of another panel to form a plane. A concrete layer that contains the present lightweight concrete composition covers at least a portion of a surface of the floor system. The established plane extends laterally from a foundation and/or a structural wall.

In the present floor system, ductwork can be attached to the reinforcing metal bars of at least one composite floor panel.

Additionally, a flooring material can be attached to one or more of the first transverse members of the composite floor panels. Any suitable flooring material can be used in the invention. Suitable flooring materials are materials that can be attached to the transverse members and cover at least a portion of the expanded polymer panel. Suitable flooring materials include, but are not limited to plywood, wood planks, tongue and grooved wood floor sections, sheet metal, sheets of structural plastics, stone, ceramic, cement, concrete, and combinations thereof.

Figure 20:
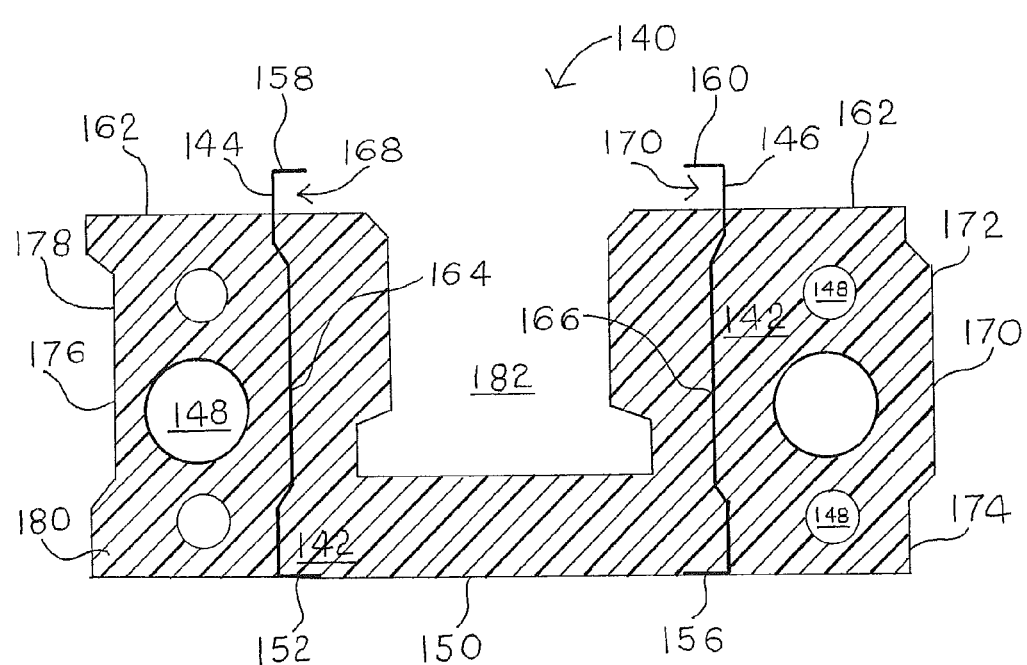
FIG. 20 shows a cross-sectional view of a pre-formed building panel according to the invention.

An embodiment of the invention relates to a floor or tilt up insulated panel that is adapted to act as a lightweight concrete I-beam form. As shown in FIG. 20, I-beam panel 140 includes expanded polymer form 142 (central body) and embedded metal studs 144 and 146 (embedded reinforcing bars). Expanded polymer form 142 includes openings 148 that traverse all or part of the length of expanded polymer form 142. The embedded metal studs 144 and 146 have embedded ends 152 and 156 respectively that are in contact with inner face 150 of expanded polymer form 142. The embedded metal studs 144 and 146 also have exposed ends 158 and 160 respectively that extend from outer face 162 of expanded polymer form 142.

Expanded polymer form 142 can have a thickness, measured as the distance from inner face 150 to outer face 162 similar in dimensions to that described above regarding expanded polymer panel 92.

Exposed ends 158 and 160 extend at least 1, in some cases at least 2, and in other cases at least 3 cm away outer face 162 of expanded polymer form 142. Also, Exposed ends 158 and 160 can extend up to 60, in some cases up to 40, and in other cases up to 20 cm away from outer face 162 of expanded polymer form 142. Exposed ends 158 and 160 can extend any of the distances or can range between any of the distances recited above from outer face 100.

In an embodiment of the invention, embedded metal studs 144 and 146 have a cross-sectional shape that includes embedding lengths 164 and 166, embedded ends 152 and 156, and exposed ends 158 and 160. The orientation of embedded metal studs 144 and 146 is referenced by the direction of open ends 168 and 170. In an embodiment of the invention, open ends 168 and 170 are oriented toward each other. In this embodiment, I-beam panel 140 is adapted to be imbedded in lightweight concrete that can be applied to outer face 162.

The spacing between each of embedded metal studs 144 and 146 can be as described regarding embedded metal studs 344 and 346.

Openings 148 can have various cross-sectional shapes, and similar spacing and cross-sectional area as described regarding openings 348 in expanded polymer body 342.

As shown in FIG. 20, expanded polymer panel 140 has a finite length and has a male terminal end 170 that includes forward edge 172 and trailing edge 174 and a receiving end 176 which includes recessed section 178, which is adapted to receive forward edge 172, and protruding edge 180. Typically, lengths of I-beam panels 140 are interconnected by inserting a forward edge 172 from a first I-beam panel 140 into a recessed section 178 of a second I-beam panel. In this manner, a larger roof, ceiling, floor or wall section containing any number of I-beam panels can be assembled and/or arrayed. The width of I-beam panel 140, measured as the distance from protruding edge 180 to trailing edge 174 can typically be at least 20, in some cases at least 30, and in other cases at least 35 cm and can be up to 150, in some cases up to 135, and in other cases up to 125 cm. The width of I-beam panel 140 can be any value or can range between any of the values recited above.

I-beam panel 140 includes I-beam channel 182. The present I-beam panel is advantageous when compared to prior art systems in that the connection between adjacent panels in the prior art is provided along the thin section of expanded polymer below I-beam channel 182. The resulting thin edge is prone to damage and/or breakage during shipment and handling. The I-beam panel of the present invention eliminates this problem by molding in the I-beam channel, eliminating the exposure of a thin edge section to potential damage.

In an embodiment of the invention, rebar or other concrete reinforcing rods can be placed in I-beam channel 182 in order to strengthen and reinforce a lightweight concrete I-beam formed within I-beam channel 182.

Figure 21:
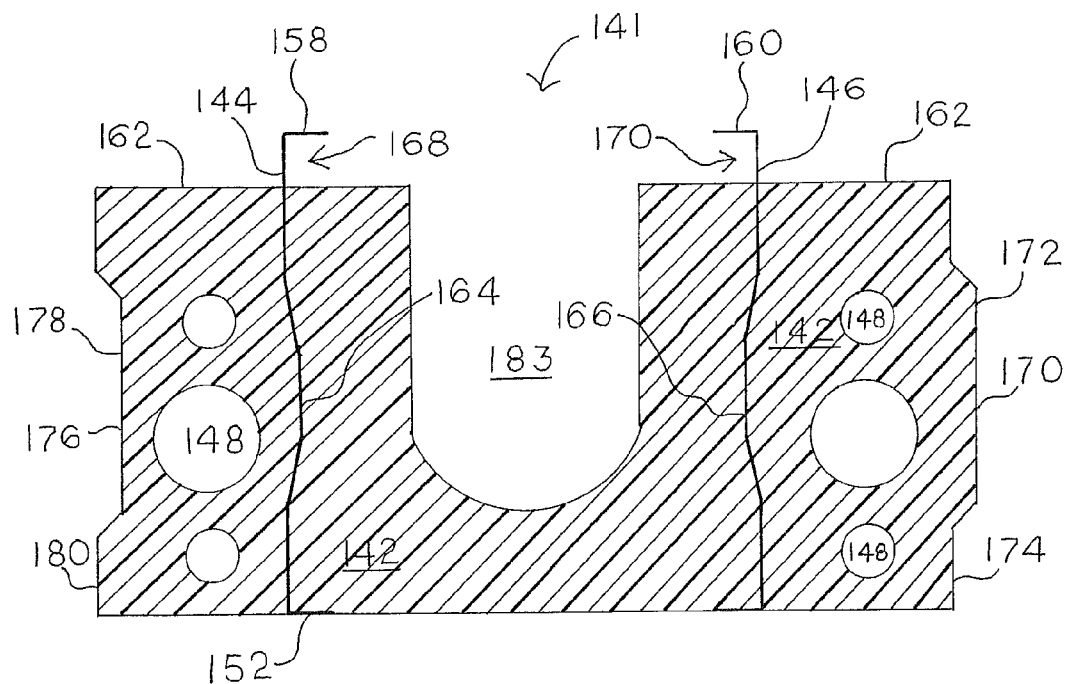
FIG. 21 shows a cross-sectional view of a pre-formed building panel according to the invention.

In another embodiment of the invention shown in FIG. 21, instead of I-beam channel 182, I-beam panel 141 includes channel 183. Channel 183 is adapted to accept round ductwork or other mechanical and utility parts and devices and/or can be filled with lightweight concrete as described above.

Figure 22:
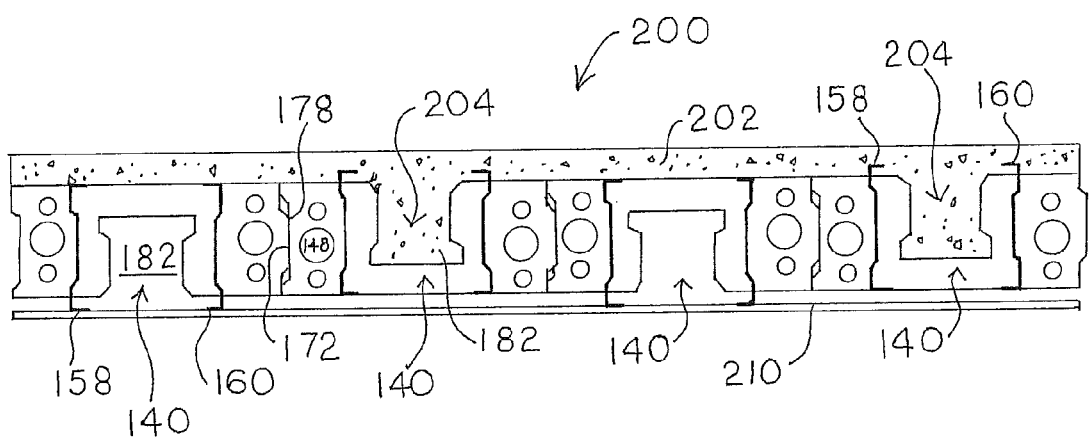
FIG. 22 shows a cross-sectional view of a concrete composite pre-formed building panel system according to the invention.

An example of an I-beam system 200 according to the invention is shown in FIG. 22, where four I-beam panels 140 are connected by inserting a forward edge 172 from a first I-beam panel 140 into a recessed section 178 of a second I-beam panel. Lightweight concrete is poured, finished and set to form a lightweight concrete layer 202 that includes lightweight concrete I-beams 204, which are formed in I-beam channels 182. The embodiment shown in FIG. 22 is an alternating embodiment, where the direction of I-beam channel 182 of each I-beam panel 140 alternately faces toward lightweight concrete layer 202 and includes lightweight concrete I-beam 204 or faces away from lightweight concrete layer 202 and I-beam channel 182 does not contain concrete. In an embodiment of the invention, the facing away I-beam panel can be I-beam panel 141. Alternatively, every I-beam panel 140 could face lightweight concrete layer 202 and include lightweight concrete I-beam 204.

In the embodiment shown, exposed ends 158 and 160 are either embedded in lightweight concrete layer 202 or are exposed. The exposed ends 158 and 160 are available as attachment points for a finish surface 210, which can include wood, rigid plastics, wood paneling, concrete panels, cement panels, drywall, SHEETROCK plaster wall board, particle board, rigid plastic panels, lightweight concrete construction articles described herein, or any other suitable material having decorating and/or structural functions or other construction substrates 210. The attachment is typically accomplished through the use of screws, nails, adhesive or other fasteners known in the art.

In an embodiment of the invention, I-beam system 200 is assembled on a flat surface and a first end is lifted while a second end remains stationary resulting in orienting I-beam system 200 generally perpendicular to the flat surface and erected by "tilting a wall" as described above.

In another embodiment of the invention, I-beam system 200 can be used as a roof on a structure or a floor in a structure.

Generally, the floor system forms a plane that extends laterally from a foundation and/or a structural wall.

Figure 23:
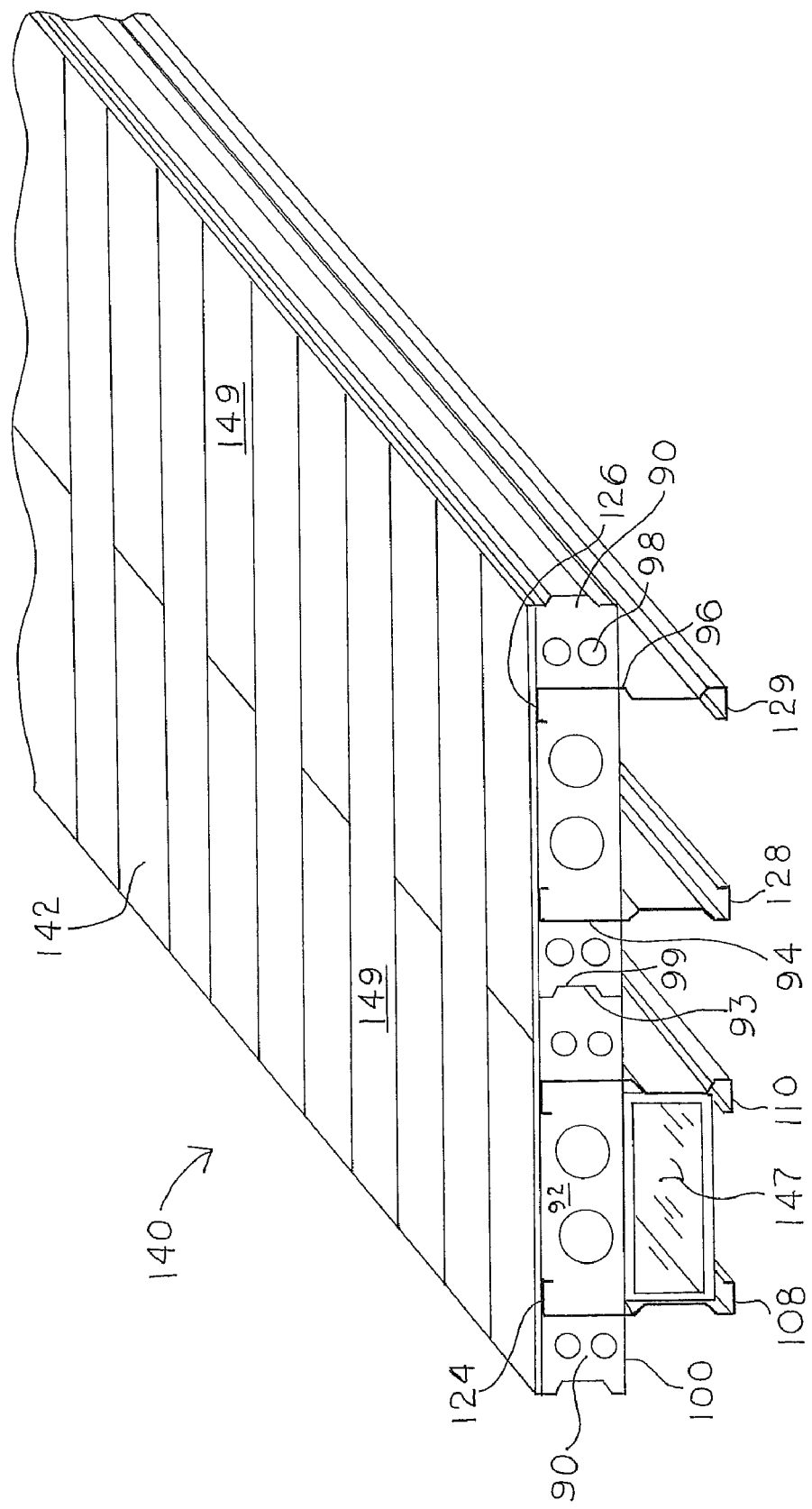
FIG. 23 shows a perspective view of a floor system according to the invention.
Figure 24:
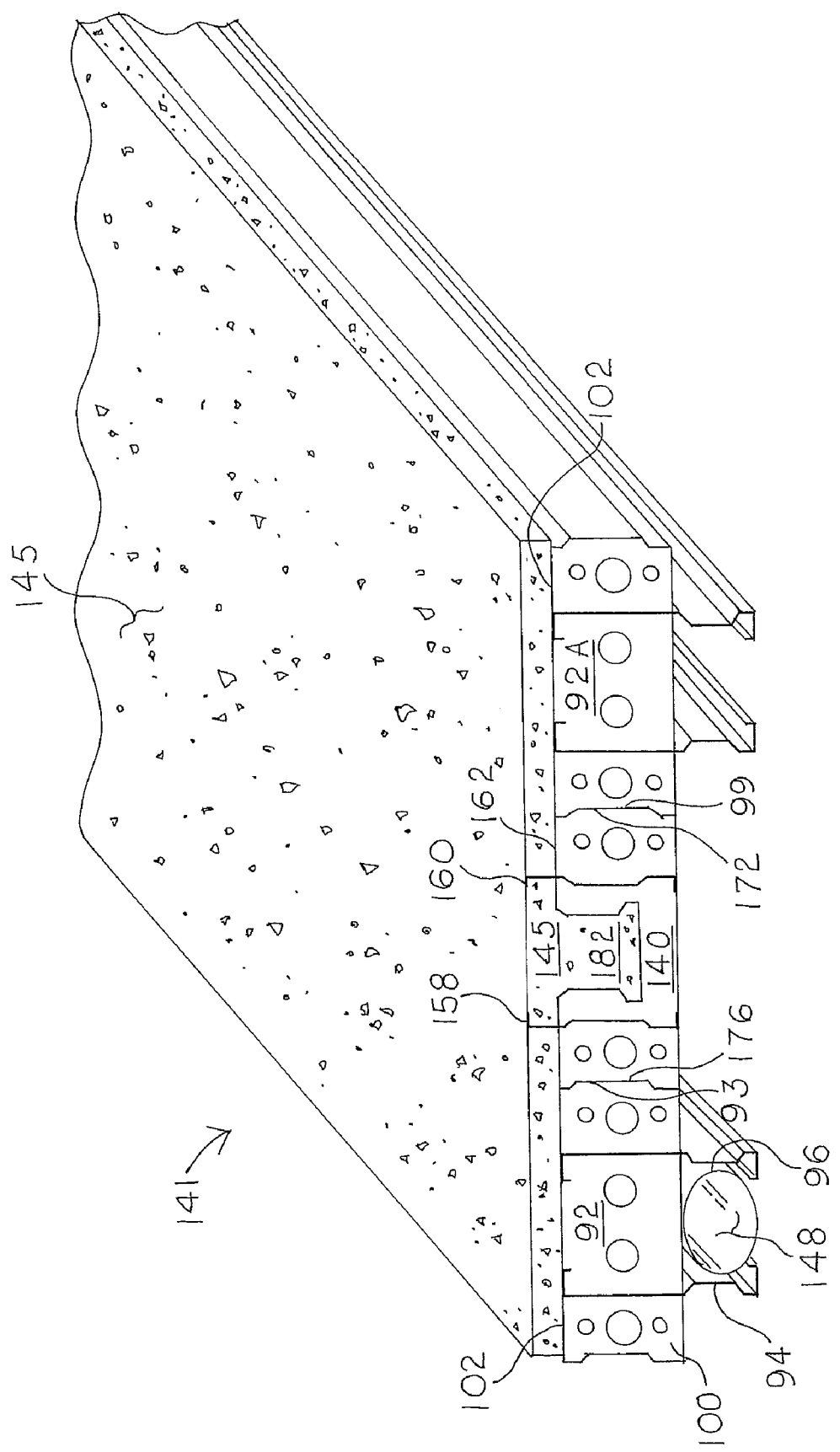
FIG. 24 shows a perspective view of a floor system according to the invention.

FIGS. 23 and 24 show floor systems 140 and 141 respectively. Floor system 140 is established by contacting forward edge 93 with recessed section 99 to form a continuous floor 142. Like features of the individual floor panels are labeled as indicated above. As described above, various shaped types of ductwork can be secured in the space defined by bottom surface 100 of expanded polymer panel 92 and the exposed ends 108 and 110 and second transverse members 128 and 129 of embedded metal joists 94 and 96. As non-limiting examples, rectangular ventilation duct 147 is shown in FIG. 23 and circular air duct 148 is shown in FIG. 24.

Embodiments of the present invention provide a composite building panel that includes a central body, substantially parallelepipedic in shape, containing an expanded polymer matrix as described above, having opposite faces, a top surface, and an opposing bottom surface; at least one embedded framing stud longitudinally extending across the central body between the opposite faces, having a first end embedded in the expanded polymer matrix, a second end extending away from the bottom surface of the central body, and one or more expansion holes located in the embedded stud between the first end of the embedded stud and the bottom surface of the central body, where the central body contains a polymer matrix that expands through the expansion holes; and a lightweight concrete layer covers at least a portion of the top surface and/or bottom surface.

The embodiment of the invention shown in FIG. 24 shows an example of using combinations of the composite panels described herein and combining features of the various panels. This embodiment combines I-beam panel 140 and floor panel 92 (shown as 92 and 92A). In this embodiment, receiving end 176 of I-beam panel 140 accepts forward edge 93 of floor panel 92 and recessed section 99 of floor panel 92A accepts forward edge 172 of I-beam panel 140 to provide tongue and groove connections to establish continuous floor system 141. In this embodiment, circular ductwork 148 is installed along bottom surface 100 of floor panel 92 between embedded metal joists 94 and 96. In this embodiment, the flooring material is the present lightweight concrete composition as layer 145, which covers top surface 102 of floor panels 92 and 92A and outer face 162 of I-beam panel 140. I-beam channel 182 extends from and is open to outer face 162 and is filled with lightweight concrete and the thickness of concrete layer 145 is sufficient to encase exposed ends 158 and 160 of I-beam panel 140. The combination shown in this embodiment provides an insulated concrete floor system where utilities can be run under an insulation layer.

As shown in the embodiment of FIG. 23, a layer of the present lightweight concrete composition 149, with a grooved exposed surface, covers floor units 90. In an alternative embodiment (not shown) a plywood, plastic, particle board or other suitable sub-floor can be attached to first transverse members 124 and 126 and the lightweight concrete composition layer 149 applied thereto.

Figure 25:
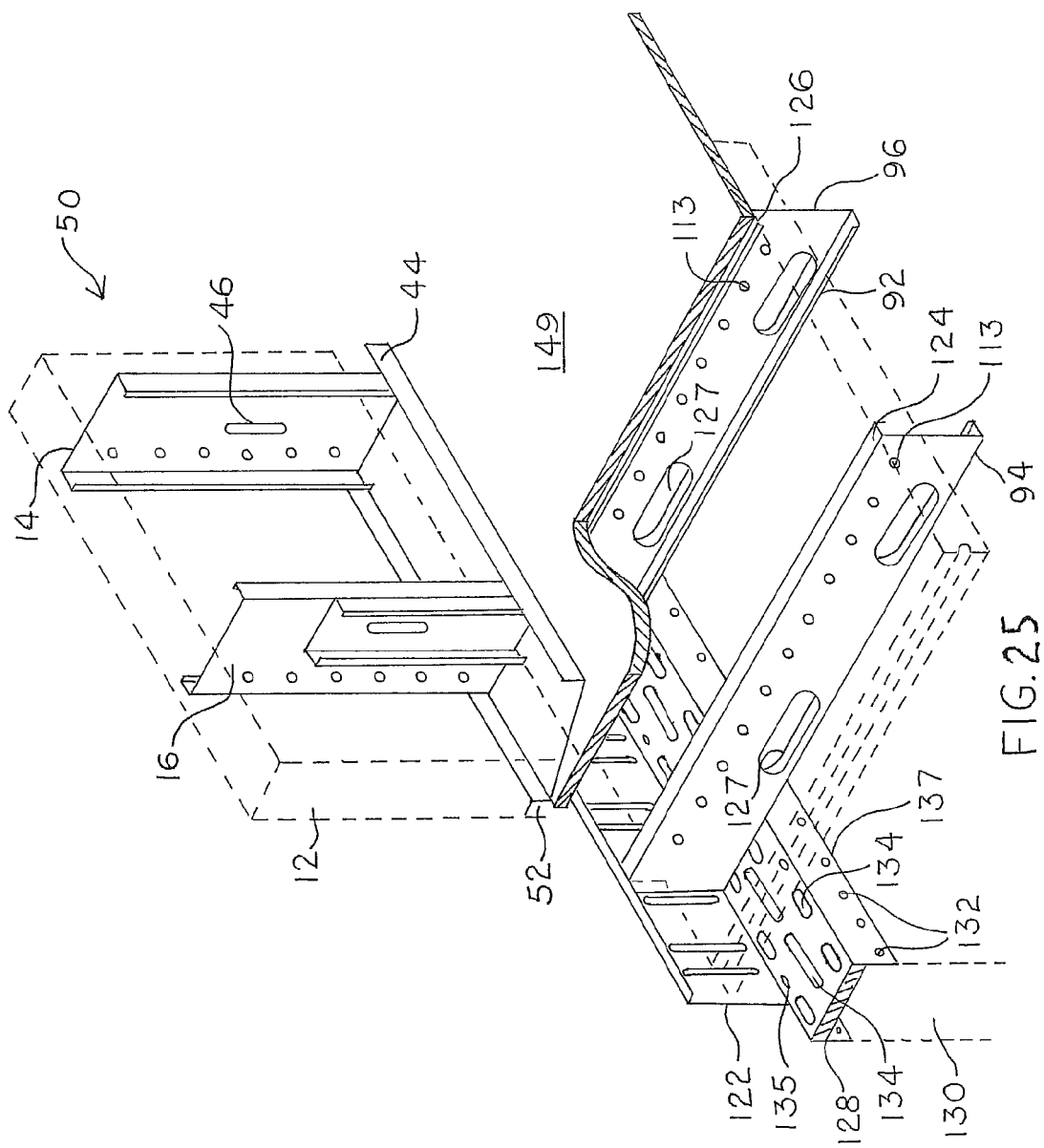
FIG. 25 shows a perspective view of a construction method according to the invention.

As shown in FIG. 25, an end of embedded metal joists 94 and 96 are seated in and attached to a joist rim 122 and a second joist rim is attached to the other end of embedded metal joists 94 and 96. A lightweight concrete layer 149, as a floor, can be applied over transverse members 124 and/or 126.

Referring to FIG. 25, embedded metal joists 94 and 96 have utility holes 127 spaced along their length. Utility holes 127 are useful for accommodating wiring for electricity, telephone, cable television, speakers, and other electronic devices. Utility holes 127 can have various cross-sectional shapes, non-limiting examples being round, oval, elliptical, square, rectangular, triangular, hexagonal or octagonal. The cross-sectional area of Utility holes 127 can also vary independently one from another or they can be uniform. The cross-sectional area of utility holes 127 is limited by the dimensions of embedded metal joists 94 and 96, as utility holes 127 will fit within their dimensions and not significantly detract from their structural integrity and strength. The cross-sectional area of utility holes 127 can independently be at least 1, in some cases at least 2, and in other cases at least 5 cm$^2$ and can be up to 30, in some cases up to 25, in other cases up to 20 cm$^2$. The cross-sectional area of utility holes 127 can independently be any value or range between any of the values recited above.

Expansion holes 113, as mentioned above are useful in that as expanded polymer body 92 is molded, the polymer matrix expands through expansion holes 113 and the expanding polymer fuses. This allows the polymer matrix to encase and hold embedded studs 94 and 96 by way of the fusion in the expanding polymer. In an embodiment of the invention, expansion holes 113 can have a flanged and in many cases a rolled flange surface to provided added strength to the embedded metal studs.

In an embodiment of the invention, the floor system can be placed on a foundation. However, because foundations are rarely perfectly level, a level track can be attached to the foundation prior to placement of the floor system. The level track includes a top surface having a length and two side rails extending from opposing edges of the top surface, where the width of the top surface is greater than a width of the foundation and the length of the top surface is generally about the same as the length of the foundation. The level track is generally attached to the foundation by placing the level track over the foundation with the side rails generally contacting the sides of the foundation, situating the top surface such that it conforms to level and permanently attaching the level track to the foundation. A rim joist can be used to aid in attaching the top surface to an end of the plurality of composite floor panels.

Figure 26:
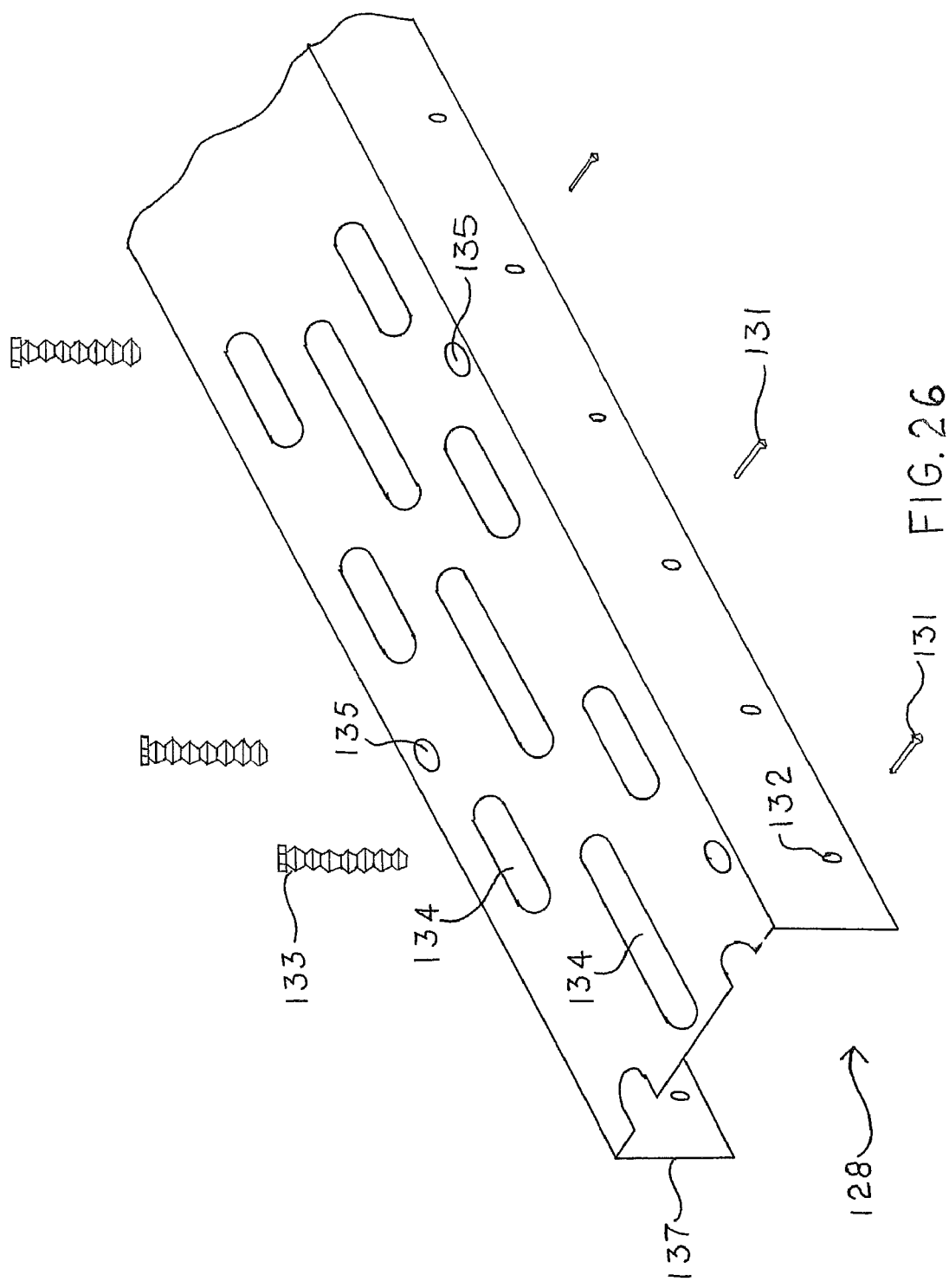
FIG. 26 shows a partial perspective view of a level track according to the invention.

More particularly, a level track 128 can be attached to foundation 130 prior to placement of the floor system (see FIGS. 25 and 26). Level track 128 can be placed on foundation 128 and leveled. The level is made permanent by fastening level track 128 to foundation 130 by using fasteners 131 (nails shown, although screws or other suitable devices can be used) via fastening holes 132. Screws 133 can also be used to attach level track 128 to foundation 130 via screw holes 135. Some of screw holes 135 can be used in conjunction with screws 133 to attach a bottom lip of joist rim 122 to level track 128. Screws 133 can also maintain the level position of level track 128 until a more permanent positioning is achieved. Alternatively or additionally mortar can be applied via mortar holes 134 to fill the space between level track 128 and the top of foundation 130. After level track 128 has been attached and/or the mortar has sufficiently set, the flooring system can be fastened to the foundation.

Level track 128 includes side rails 137, which are adapted to extend over a portion of foundation 130. The width of level track 128 is the transverse distance of a top portion of level track 128 from one side rail 137 to the other. The width of level track 128 is typically slightly larger than the width of foundation 130. The width of level track 128 can be at least 10 cm, in some cases at least 15 cm, in other cases at least 20 cm and in some instances at least 21 cm. Also, the width of level track 128 can be up to 40 cm, in some cases up to 35 cm, and in other cases up to 30 cm. The width of level track 128 can be any value or range between any of the values recited above.

The length of side rail 137 is the distance it extends from a top portion of level track 128 and is sufficient in length to allow for proper leveling of level track 128 and attachment to foundation 130 via fasteners 131 and fastening holes 132. The length of side rail 137 can be at least 4 cm, in some cases at least 5 cm, and in other cases at least 7 cm. Also, the length of side rail 137 can be up to 20 cm, in some cases up to 15 cm, and in other cases up to 12 cm. The length of side rail 137 can be any value or range between any of the values recited above.

A wall system 50 can be attached to or set on lightweight concrete layer 149 as shown in FIG. 25. In wall system 50, a bottom end of metal studs 14 and 16, partially embedded in polymer body 14 are seated in and attached to a bottom track 44 and a top slip track (not shown). This configuration leads to the formation of bottom channel 52.

In an embodiment of the invention, the LWC composition is formed, set and/or hardened in the form of a construction panel, without the use of a pre-formed building panel as described above. In this embodiment, the construction panel can be adapted for use in a floor, wall, ceiling, or roof.

Additionally, the LWC compositions of the invention can be used as a stucco or as a plaster, being applied by any means well known to those of ordinary skill in those trades; as a wall board, of the sandwich type of construction wherein the hardened material is sandwiched by suitably strong paper or other construction material; as pavers for sidewalks, driveways and the like; as a pour material for sidewalks, driveways and the like; as a monolithic pour material for floors of buildings; as chimney stacks or smoke stacks; as bricks; as roof pavers; as monolithic pour material for radiant heat floor systems; as blocks for landscape retaining walls; as pre-stressed concrete wall systems; as tilt-up wall systems, i.e. where a wall component is poured on site and then tilted up when hardened; and as mason's mortar.

In an embodiment of the invention, the concrete compositions according to the invention are formed, set and/or hardened in the form of a concrete masonry unit. As used herein, the term "concrete masonry unit" refers to a hollow or solid concrete article including, but not limited to scored, split face, ribbed, fluted, ground face, slumped and paving stone varieties. Embodiments of the invention provide walls that include, at least in part, concrete masonry units made according to the invention.

In an embodiment of the invention, the molded construction articles and materials and concrete masonry units described above are capable of receiving and holding penetrating fasteners, non-limiting examples of such include nails, screws, staples and the like. This can be beneficial in that surface coverings can be attached directly to the molded construction articles and materials and concrete masonry units molded construction articles and materials and concrete masonry units.

In an embodiment of the invention, a standard 2½ inch drywall screw can be screwed into a poured and set surface containing the present light weight concrete composition, to a depth of 1½ inches, and is not removed when a force of at least 500, in some cases at least 600 and in other cases at least 700 and up to 800 pounds of force is applied perpendicular to the surface screwed into for one, in some cases five and in other cases ten minutes.

Embodiments of the present invention provide lightweight structural units such as gypsum wallboard and the like. These units include a core of cementitious material as described above, covered at least on both of its major surfaces by cover or face papers which are adhered to the cured cementitious core. While the product to be made can be described as a gypsum wallboard in which the base cementitious material is some form of gypsum composition or combinations of gypsum compositions, it will be understood that for different applications, other forms of cementitious material such as plaster of Paris, stucco, cements of all kinds may be used to make other products and fall within the scope of the present invention.

As used herein, the term "gypsum" refers to the mineral gypsum as found in nature is primarily calcium sulfate dihydrate ($CaSO_4.2H_2O$) and "gypsum compositions" refer to compositions and/or mixtures that contain gypsum. To make gypsum wallboard, the mineral is ground and calcined so that it is primarily the hemihydrate of calcium sulfate ($CaSO_4.\frac{1}{2}H_2O$) and denoted as hemihydrate, stucco or calcined gypsum. If dehydration is complete, calcium sulfate ($CaSO_4.$).

Embodiments of the invention provide for making a lightweight core for a structural unit includes the following combinations of materials:

(1) a base gypsum composition that includes calcined gypsum;
(2) polymer particles having an average particle size of from 0.2 mm to 8.0 mm and a bulk density of from 0.03 g/cc to 0.64 g/cc as described above;
(3) optionally a surfactant,
(4) optionally a frothing agent suitable for use with latex;
(5) optionally a film forming component, such as a latex;
(6) optionally a starch composition, and
(7) optionally water, plus other additives as may be desired.

The slurry or mixture can be prepared by adding to a suitable vessel a part of the water, one or more surfactants, and a frothing agent, which under agitation forms a froth. After allowing for appropriate air to be entrained, the latex and starch can be added. During continued agitation, the gypsum is added slowly to prevent lumping or clumping, and then the balance of the predetermined amount of water is added. To this the polymer particles are added with stirring or agitation continued to obtain a smooth homogeneous mixture. When it serves an advantageous purpose, the order of addition can be varied.

In an embodiment of the invention, the polymer particles can be added to the gypsum based material at from about 0.1 to up to about 3% by weight of the gypsum, in some cases from about 0.5 to about 3 weight percent, from about 10 to about 60 percent by volume of the gypsum based material, or at the levels defined above.

The latex can be used at from about 0.1 to about 5.0 percent by weight of gypsum and in some cases from 1 to 3 weight percent.

In an embodiment of the invention, the latex contains a styrene butadiene copolymer, a vinyl acetate homopolymer or copolymer, a non-limiting example being an ethylene vinyl acetate copolymer, or combinations thereof.

The surfactant and/or frothing agent, when used as a single or combined additive, can be used at from about 0.075% to about 0.3% by weight of gypsum, in some cases about 0.1 to 0.2 weight percent. In particular embodiments, magnesium lauryl sulfate is used.

The starch can be used at from about 0.5 to about 3.0% by weight of gypsum, and in some cases at about 1 to about 2 weight percent.

Gypsum, limestone and/or dolomite can provide the balance of the formulation.

Advantageously, the polymer particles not only lighten the weight of the wallboard, but add insulating value and in reducing the amount of gypsum they reduce the water requirement in the formulation. Thus an advantage to the present invention is that the gypsum mixture or slurry requires very little or no water in excess of that required for proper hydration. Further, the total water content in the gypsum based material can be as low as practicable, on the order of about 50 to 60% by weight of hemihydrate, keeping in mind that it is desirable to use only as much excess of water over that required to react with the cementitious compound as is necessary to provide the desired homogenous flowable mixture which may by readily placed into a mold or other means for making lightweight cementitious cores for wallboard.

The prepuff or polymer particle density, diameter and volume can be varied to provide targeted and/or otherwise desirable properties to the gypsum composition. This permits the engineering of specific characteristics into sheetrock, wallboard or other products made from the present lightweight gypsum composition, non-limiting examples being fire resistance, insulation value, shear resistance, finished board weight, and/or fastener holding and tear-out strength.

An advantage to the present invention is the more uniform size and distribution of the polymer particles within the wallboard or gypsum material than prior art attempts at including expanded particles in the wallboard and/or compositions. Further, the presence of the polymer particles provides added strength as well as flexibility to the wallboard. In the final product, this shows up as an increase in compressive strength as well as flexural strength.

In an embodiment of the invention, when wallboard containing the above-described gypsum composition is exposed to extreme heat and/or flames, a honeycomb structure results which can maintain much of the strength of the wall board. This can be advantageous in increasing the length of time until failure, which aids in evacuating structures made using such materials.

In an embodiment of the invention, a standard 1¼" inch drywall screw can be screwed into the present light weight wallboard or gypsum material, to a depth of ½ inches, and is not removed when a force of at least 500, in some cases at least 600 and in other cases at least 700 and up to 800 pounds of force is applied perpendicular to the surface screwed into for one, in some cases five and in other cases ten minutes.

In an embodiment of the invention, wallboard containing the above-described gypsum composition has a minimum compressive strength of at least 300 psi (21.1 $kgf/cm^2$), in some cases at least 400 psi (28.1 $kgf/cm^2$), in other cases at least 500 psi (35.2 $kgf/cm^2$), in some instances at least 600 psi (42.2 $kgf/cm^2$), and in other instances at least 700 psi (49.2 $kgf/cm^2$). Compressive strengths are determined according to ASTM C39.

The present invention is also directed to buildings that include the LWC compositions according to the invention.

The present invention also provides a method of making an optimized lightweight concrete article that includes:

identifying the desired density and strength properties of a set lightweight concrete composition;

determining the type, size and density of polymer beads to be expanded for use in the light weight concrete composition;

determining the size and density the polymer beads are to be expanded to;

expanding the polymer beads to form expanded polymer beads;

dispersing the expanded polymer beads in a cementitious mixture to form the light weight concrete composition; and allowing the light weight concrete composition to set in a desired form.

The desired density and strength properties of the set and/or hardened LWC composition are determined based on the intended application.

In an embodiment of the invention, the type, size and density of polymer beads to be expanded and the size and density the polymer beads are to be expanded to can be determined based on empirical and/or published data.

In another embodiment of the invention finite element analysis can be used to determine the type, size and density of polymer beads to be expanded and the size and density the polymer beads are to be expanded to.

The resulting lightweight concrete composition is allowed to set and/or harden to provide LWC articles and concrete masonry units as described above.

The present invention will further be described by reference to the following examples. The following examples are merely illustrative of the invention and are not intended to be limiting. Unless otherwise indicated, all percentages are by weight and Portland cement is used unless otherwise specified.

EXAMPLES

Unless otherwise indicated, the following materials were utilized:

Type III Portland Cement (CEMEX, S. A. de C. V., MONTERREY, MEXICO).

Mason Sand (165 pcf bulk density/2.64 specific gravity)

Potable Water—ambient temperature (~70° F./21° C.)

Expandable Polystyrene—M97BC, F271C, F271M, F271T (NOVA Chemicals Inc., Pittsburgh, Pa.)

EPS Resin—1037C (NOVA Chemicals, Inc.)

½ inch Expanded Slate (Carolina Stalite Company, Salisbury, N.C.—89.5 pcf bulk density/1.43 specific gravity)

Unless otherwise indicated, all compositions were prepared under laboratory conditions using a model 42N-5 blender (Charles Ross & Son Company, Hauppauge, N.Y.) having a 7-ft$^3$ working capacity body with a single shaft paddle. The mixer was operated at 34 rpm. Conditioning was performed in a LH-10 Temperature and Humidity Chamber (manufactured by Associated Environmental Systems, Ayer, Mass.). Samples were molded in 6"×12" single use plastic cylinder molds with flat caps and were tested in triplicate. Compression testing was performed on a Forney FX250/300 Compression Tester (Forney Incorporated, Hermitage, Pa.), which hydraulically applies a vertical load at a desired rate. All other peripheral materials (slump cone, tamping rods, etc.) adhered to the applicable ASTM test method. The following ASTM test methods and procedures were followed:

ASTM C470—Standard Specification for Molds for Forming Concrete Test Cylinders Vertically ASTM C192—Standard Practice for Making and Curing Concrete Test Specimens in the Laboratory ASTM C330—Standard Specification for Lightweight Aggregates for Structural Concrete ASTM C511—Standard Specification for Mixing Rooms, Moist Cabinets, Moist Rooms, and Water Storage Tanks Used in the Testing of Hydraulic Cements and Concretes ASTM C143—Standard Test Method for Slump of Hydraulic-Cement Concrete ASTM C1231—Standard Practice for Use of Unbonded Caps in Determination of Compressive Strength of Hardened Concrete Cylinders ASTM C39—Standard Test Method for Compressive Strength of Cylindrical Concrete Specimens Cylinders were kept capped and at ambient laboratory conditions for 24 hours. All cylinders were then aged for an additional 6 days at 23±2° C., 95% relative humidity. The test specimens were then tested.

Example 1

Polystyrene in unexpanded bead form (M97BC—0.65 mm, F271T—0.4 mm, and F271M—0.33 mm) was pre-expanded into EPS foam (prepuff) particles of varying densities as shown in the table below.

| Bead Type | Bead Mean Size, μm | Bulk Density, lb/ft$^3$ | Prepuff Particle Mean Size, μm | Standard deviation, μm |
| --- | --- | --- | --- | --- |
| F271M | 330 | 2.32 | 902 | 144 |
| F271M | 330 | 3.10 | 824 | 80 |
| F271M | 330 | 4.19 | 725 | 103 |
| F271T | 400 | 2.40 | 1027 | 176 |
| F271T | 400 | 3.69 | 1054 | 137 |
| F271T | 400 | 4.57 | 851 | 141 |
| M97BC | 650 | 2.54 | 1705 | 704 |
| M97BC | 650 | 3.29 | 1474 | 587 |
| M97BC | 650 | 5.27 | 1487 | 584 |

The data show that the prepuff particle size varies inversely with the expanded density of the material.

Example 2

Polystyrene in unexpanded bead form (0.65 mm, 0.4 mm, and 0.33 mm) was pre-expanded into prepuff particles with a bulk density of 2 lb/ft$^3$ as shown in the table below. The prepuff particles were formulated into a LWC composition, in a 3.5 cubic foot drum mixer, that included 46.5 wt. % (25.3 vol. %) Portland cement, 16.3 wt. % (26.3 vol. %) water, and 1.2 wt. % (26.4 vol. %) prepuff particles. The resulting LWC compositions had a concrete density of 90 lb/ft$^2$. The average compressive strength (determined according to ASTM C39, seven day break test) is shown in the table below.

| Bead Mean Size, μm | Prepuff Particle Bulk Density, lb/ft³ | Concrete Density, lb/ft³ | Concrete Compressive Strength, psi |
|---|---|---|---|
| 650 | 2.00 | 90 | 1405 |
| 400 | 2.00 | 90 | 1812 |
| 330 | 2.00 | 90 | 1521 |

The data show that as the mean unexpanded bead size decreases, at a constant prepuff particle density, that surprisingly higher compressive strength does not necessarily result from ever decreasing unexpanded bead size as suggested in the prior art. More particularly, the data show that an optimum unexpanded bead size with respect to compressive strength at 2.00 pcf exists when loaded to obtain 90 pcf concrete density. This optimum appears to be between 330 microns and 650 microns for this particular formulation.

Example 3

Since the prepuff particle density also impacts the overall concrete density, changing the EPS density requires a change in the EPS loading level to maintain a constant concrete density. This relationship holds only as long as the total amount of prepuff particles is not so large as to compromise the strength of the surrounding concrete matrix. The relationship between the prepuff particle density and loading level provides additional opportunities to optimize concrete strength while controlling the overall concrete density.

Polystyrene in unexpanded bead form (0.65 mm) was pre-expanded into prepuff particles having varying densities as shown in the table below. The prepuff particles were formulated into LWC compositions containing the components shown in the table below, in a 3.5 cubic foot drum mixer, and each having a concrete density of 90 lb/ft³.

|  | Sample A | Sample B | Sample C |
|---|---|---|---|
| Prepuff Particle Bulk Density (lb/ft³) | 1.26 | 3.29 | 5.37 |
| Portland Cement, wt. % (vol. %) | 46.7 (28.5) | 46.2 (22.1) | 45.8 (18.9) |
| Water, wt. % (vol. %) | 16.4 (29.8) | 16.2 (23) | 16.1 (19.7) |
| EPS, wt. % (vol. %) | 0.7 (16.8) | 1.8 (35.6) | 2.6 (44.9) |
| Sand, wt. % (vol. %) | 36.2 (24.9) | 35.8 (19.3) | 35.5 (16.5) |

The following data table numerically depicts the relationship between prepuff density and concrete strength at a constant concrete density of 90 lb/ft³.

|  | Bead Mean Size, μm | Prepuff Particle Bulk Density, lb/ft³ | Concrete Density, lb/ft³ | Concrete Compressive Strength, psi |
|---|---|---|---|---|
| Sample A | 650 | 1.26 | 90 | 1463 |
| Sample B | 650 | 3.29 | 90 | 1497 |
| Sample C | 650 | 5.37 | 90 | 2157 |

The data show that as the prepuff particle density increases, the compressive strength of the LWC composition also increases at constant concrete density.

Example 4

Polystyrene in unexpanded bead form (0.65 mm) was pre-expanded into prepuff particles having a bulk density of 1.1 lb/ft³ as shown in the table below. The prepuff particles were formulated into LWC compositions, in a 3.5 cubic foot drum mixer, containing the components shown in the table below.

|  | Sample D | Sample E | Sample F | Sample G |
|---|---|---|---|---|
| Prepuff Particle Bulk Density (lb/ft³) | 1.1 | 1.1 | 1.1 | 1.1 |
| Portland Cement, wt. % (vol. %) | 46.4 (22.3) | 46.8 (21.6) | 46.3 (18.9) | 46.1 (16.6) |
| Water, wt. % (vol. %) | 17 (24.3) | 16.4 (22.5) | 17 (20.6) | 17 (18.2) |
| EPS, wt. % (vol. %) | 0.6 (33.9) | 0.6 (37) | 0.9 (44) | 1.1 (50.8) |
| Sand, wt. % (vol. %) | 36 (19.5) | 36.2 (18.9) | 35.9 (16.5) | 35.8 (14.5) |

The following data table numerically depicts the relationship between prepuff density and concrete strength at a constant concrete density of 90 lb/ft³.

|  | Bead Mean Size, μm | Prepuff Particle Bulk Density, lb/ft³ | Concrete Density, lb/ft³ | Concrete Compressive Strength, psi |
|---|---|---|---|---|
| Sample D | 650 | 1.1 | 93.8 | 1900 |
| Sample E | 650 | 1.1 | 89.6 | 1252 |
| Sample F | 650 | 1.1 | 80.9 | 982 |
| Sample G | 650 | 1.1 | 72.4 | 817 |

The data show that as prepuff particle loading in the LWC composition increases at constant foam particle density, the light weight concrete density and compressive strength decreases.

Example 5

Polystyrene in unexpanded bead form (0.65 mm) was pre-expanded into prepuff particles having various densities as shown in the table below. The prepuff particles were formulated into LWC compositions, in a 3.5 cubic foot drum mixer, containing the components shown in the table below.

|  | Sample H | Sample I | Sample J | Sample K |
|---|---|---|---|---|
| Prepuff Particle Bulk Density (lb/ft$^3$) | 1.1 | 2.3 | 3.1 | 4.2 |
| Portland Cement, wt. % (vol. %) | 46.8 (21.6) | 46.8 (26.8) | 46.8 (28.4) | 46.8 (29.7) |
| Water, wt. % (vol. %) | 16.4 (22.5) | 16.4 (28) | 16.4 (29.6) | 16.4 (31) |
| EPS, wt. % (vol. %) | 0.6 (37) | 0.6 (21.8) | 0.6 (17.2) | 0.6 (13.4) |
| Sand, wt. % (vol. %) | 36.2 (18.9) | 36.2 (23.4) | 36.2 (24.8) | 36.2 (25.9) |

The following table numerically depicts the relationship between prepuff density and concrete strength at a constant concrete prepuff loading based on the weight of the formulation.

|  | Bead Mean Size, μm | Prepuff Particle Bulk Density, lb/ft$^3$ | Concrete Density, lb/ft$^3$ | Compressive Strength, psi |
|---|---|---|---|---|
| Sample H | 650 | 1.1 | 89.6 | 1252 |
| Sample I | 650 | 2.32 | 109.6 | 1565 |
| Sample J | 650 | 3.1 | 111.7 | 2965 |
| Sample K | 650 | 4.2 | 116.3 | 3045 |

The data show that as prepuff particle density in the light weight concrete composition increases at constant prepuff particle loading (by weight), light weight concrete density and compressive strength increases.

Example 6

Polystyrene in unexpanded bead form (0.65 mm) was pre-expanded into prepuff particles having various densities as shown in the table below. The prepuff particles were formulated into LWC compositions, in a 3.5 cubic foot drum mixer, containing the components shown in the table below.

|  | Sample L | Sample M |
|---|---|---|
| Prepuff Particle Bulk Density (lb/ft$^3$) | 1.1 | 3.1 |
| Portland Cement, wt. % (vol. %) | 46.3 (18.9) | 46.2 (21.4) |
| Water, wt. % (vol. %) | 17 (20.6) | 16.2 (22.3) |
| EPS, wt. % (vol. %) | 0.9 (44) | 1.8 (37.5) |
| Sand, wt. % (vol. %) | 35.9 (16.5) | 35.8 (18.7) |

The following table numerically depicts the relationship between prepuff density and concrete strength at a constant concrete density.

|  | Bead Mean Size, μm | Prepuff Particle Bulk Density, lb/ft$^3$ | Concrete Density, lb/ft$^3$ | Compressive Strength, psi |
|---|---|---|---|---|
| Sample L | 650 | 1.1 | 80.9 | 982 |
| Sample M | 650 | 3.1 | 79.8 | 1401 |

The data show that as prepuff particle density in the LWC composition increases at constant concrete density, the compressive strength of the LWC increases.

Example 7

Polystyrene in unexpanded bead form (0.65 mm) was pre-expanded into prepuff particles having various densities as shown in the table below. The prepuff particles were formulated into LWC compositions, in a 3.5 cubic foot drum mixer, containing the components shown in the table below.

|  | Sample N | Sample O |
|---|---|---|
| Prepuff Particle Bulk Density (lb/ft$^3$) | 3.9 | 5.2 |
| Portland Cement, wt. % (vol. %) | 46 (21.5) | 45.6 (21.4) |
| Water, wt. % (vol. %) | 16.1 (22.4) | 16 (22.3) |
| EPS, wt. % (vol. %) | 2.3 (37.3) | 3 (37.5) |
| Sand, wt. % (vol. %) | 35.6 (18.8) | 35.4 (18.7) |

The following data table numerically depicts the relationship between prepuff density and concrete strength at a constant concrete density.

|  | Bead Mean Size, μm | Prepuff Particle Bulk Density, lb/ft$^3$ | Concrete Density, lb/ft$^3$ | Compressive Strength, psi |
|---|---|---|---|---|
| Sample N | 650 | 3.9 | 85.3 | 1448 |
| Sample O | 650 | 5.2 | 84.3 | 1634 |

The data show that as prepuff particle density in the LWC composition increases at constant concrete density, the compressive strength of the LWC increases.

Example 8

The following examples demonstrate the use of expanded slate as an aggregate in combination with the prepuff particles of the present invention. Polystyrene in unexpanded bead form was pre-expanded into prepuff particles having various densities as shown in the table below. The prepuff particles were formulated into LWC compositions, in a 3.5 cubic foot drum mixer, containing the components shown in the table below.

| Mixed expanded slate/EPS runs | Example P | Example Q |
|---|---|---|
| Bead Mean Size, micron | 0.33 | 0.4 |
| Prepuff Particle Bulk Density, pcf | 5.24 | 4.5 |
| Weight % | | |
| Cement | 19.84% | 21.02% |
| EPS | 1.80% | 1.44% |
| Expanded slate | 42.02% | 39.07% |
| Water | 6.96% | 7.36% |
| Volume % | | |
| Cement | 9.53% | 10.34% |
| EPS | 22.71% | 21.74% |
| Expanded slate | 41.91% | 39.91% |
| Water | 9.95% | 10.78% |
| LWC density (pcf) | 90.9 | 93.7 |
| LWC strength (psi) | 1360.0 | 1800.0 |

The data show that desirable light weight concrete can be obtained using the prepuff of the present invention and expanded slate as aggregate in light weight concrete compositions.

Example 9

The following examples demonstrate the use of expanded slate as an aggregate used in combination with the prepuff particles of the present invention. Polystyrene in unexpanded bead form was pre-expanded into prepuff particles having various densities as shown in the table below. The prepuff particles were formulated into LWC compositions, in a 3.5 cubic foot drum mixer, containing the components shown in the table below.

Example 10

One-foot square, 4 inch thick concrete forms were made by pouring formulations prepared according to examples X and Y in the table below into forms and allowing the formulations to set for 24 hours.

| | Example X | Example Y |
|---|---|---|
| bead size (mm) | 0.4 | 0.65 |
| Prepuff density (lb./ft$^3$) | 3.4 | 4.9 |
| wt % | | |
| Cement | 35.0% | 33.1% |
| Sand | 23.2% | 45.4% |
| EPS | 1.5% | 2.9% |
| Slate | 26.3% | 0.0% |
| Water | 14.0% | 13.2 |
| total | 100.0% | |
| water/cement | 0.40 | 40.0% |
| Volume % | | |
| Cement | 16.1% | 16.0% |
| Sand | 12.1% | 24.7% |
| EPS | 27.3% | 40.3% |
| Slate | 25.2% | 0.0% |
| Water | 19.2% | 19.1% |
| total | 100.0% | |
| compressive strength (psi) | 2536 | 2109 |
| density (pcf) | 91.1 | 90.6 |

After 7 days, a one-foot square, ½ inch sheet of plywood was fastened directly to the formed concrete. A minimum of one-inch penetration was required for adequate fastening. The results are shown in the table below.

| | Example R | Example S | Example T | Example U | Example V | Example W |
|---|---|---|---|---|---|---|
| Bead size (mm) | 0.5 | 0.4 | 0.4 | 0.4 | 0.4 | 0.4 |
| Prepuff density (lb./ft$^3$) | 40 (unexpended) | 3.4 | 3.4 | 3.4 | 3.4 | 3.4 |
| Weight % | | | | | | |
| Cement | 34.4% | 35.0% | 36.2% | 37.3% | 35.9% | 37.1% |
| Sand | 0.0% | 23.2% | 9.9% | 0.0% | 15.8% | 1.9% |
| EPS | 25.0% | 1.5% | 1.4% | 0.6% | 1.5% | 1.3% |
| Slate | 25.9% | 26.3% | 38.1% | 47.1% | 32.4% | 44.7% |
| Water | 14.6% | 14.0% | 14.5% | 14.9% | 14.4% | 14.9% |
| Total | 100.0% | 100.0% | 100.0% | 100.0% | 100.0% | 100.0% |
| water/cement | 0.43 | 0.40 | 0.40 | 0.40 | 0.40 | 0.40 |
| Volume % | | | | | | |
| Cement | 15.8% | 16.1% | 16.1% | 18.3% | 16.1% | 16.1% |
| Sand | 0.0% | 12.1% | 5.0% | 0.0% | 8.0% | 1.0% |
| EPS | 39.5% | 27.3% | 24.4% | 11.9% | 26.4% | 23.4% |
| Slate | 24.7% | 25.2% | 35.3% | 48.0% | 30.3% | 40.3% |
| Water | 20.0% | 19.2% | 19.2% | 21.8% | 19.2% | 19.2% |
| total | 100.0% | 100.0% | 100.0% | 100.0% | 100.0% | 100.0% |
| compressive strength (psi) | 3813 | 2536 | 2718 | 4246 | 2549 | 2516 |
| density (pcf) | 89.3 | 91.1 | 90.7 | 98.0 | 89.7 | 89.9 |

| Fastener 7d coated nails | Example X | Example Y |
|---|---|---|
| attachment | No penetration when slate is encountered | 100% penetration and attachment |
| removal | Easily removed | Could not be manually removed from the concrete without mechanical assistance |
| 2½ inch standard dry wall screw | | |
| attachment | No penetration when slate is encountered | 100% penetration and attachment. Screw broke before concrete failed. |
| removal | Easily removed | Could not be manually removed from the concrete without mechanical assistance. Screw could be removed and reinserted with no change in holding power. |

The data demonstrates that the present light-weight concrete composition, without slate, provides superior gripping capability with plywood using standard fasteners compared to traditional expanded slate formulations, while slate containing concrete did not readily accept fasteners. This represents an improvement over the prior art as the time consuming practice of fixing anchors into the concrete to enable the fasteners to grip thereto can be eliminated.

Example 11

One-foot square, 4 inch thick concrete forms were made by pouring the formulations of Examples X and Y into forms and allowing the formulations to set for 24 hours. After 7 days, a one-foot square, ½ inch sheet of standard drywall sheet was fastened directly to the formed concrete using standard 1¾ inch drywall screws. A minimum of one-inch screw penetration was required for adequate fastening. The results are shown in the table below.

| Fastener 1¾ inch standard dry wall screw | Example X | Example Y |
|---|---|---|
| attachment | No penetration when slate is encountered | 100% penetration and attachment. Screw could penetrate through the drywall. |
| removal | Easily removed. | Could not be manually removed from the concrete without mechanical assistance. Screw could be removed and reinserted with no change in holding power. |

The data demonstrates that the present light-weight concrete composition, without slate, provides superior gripping capability compared to traditional expanded slate formulations, which did not readily accept fasteners. This represents an improvement over the prior art as the time consuming practice of fastening nailing studs to the concrete to allow for attaching the drywall thereto can be eliminated.

Example 12

Two-foot square, 4 inch thick concrete forms were made by pouring the formulations Examples X and Y into a form and allowing the formulations to set for 24 hours. After 7 days, a three foot long, 2"×4" stud was fastened directly to the formed concrete using standard 16 d nails. A minimum of two-inch nail penetration was required for adequate fastening. The results are shown in the table below.

| Fastener 16d nail | Example X | Example Y |
|---|---|---|
| attachment | No penetration when slate is encountered | 100% penetration and attachment. |
| removal | Easily removed. | Could not be manually removed from the concrete without mechanical assistance. |

The data demonstrates that the present light-weight concrete composition, without slate, provides superior gripping capability compared to traditional expanded slate formulations, which did not readily accept fasteners. This represents an improvement over the prior art as the expensive and time consuming practice of using TAPCON® (available from Illinois Tool Works Inc., Glenview, Ill.) or similar fasteners, lead anchors, or other methods known in the art to fasten studs to concrete can be eliminated.

Example 13

Concrete without additional aggregate was made using the ingredients shown in the table below.

| | Ex. AA | Ex. BB | Ex. CC | Ex. DD | Ex. EE | Ex. FF | Ex. GG | Ex. HH | Ex. II |
|---|---|---|---|---|---|---|---|---|---|
| Starting Bead | F271T | F271C | M97BC | F271T | F271C | M97BC | F271T | F271C | M97BC |
| bead size (mm) | 0.4 | 0.51 | 0.65 | 0.4 | 0.51 | 0.65 | 0.4 | 0.51 | 0.65 |
| Density (pcf) | 1.2 | 1.3 | 1.5 | 3.4 | 3.3 | 3.4 | 5.7 | 5.5 | 4.9 |
| Prepuff size (mm) | 1.35 | 1.56 | 2.08 | 0.87 | 1.26 | 1.54 | 0.75 | 1.06 | 1.41 |
| Expansion Factor | 48 | 48 | 48 | 18 | 18 | 18 | 12 | 12 | 12 |
| wt % | | | | | | | | | |
| Cement | 33.0 | 35.8 | 35.0 | 33.0 | 33.0 | 35.0 | 33.0 | 33.0 | 33.1 |
| Sand | 51.5 | 47.2 | 50.1 | 50.3 | 50.4 | 48.9 | 49.0 | 49.2 | 45.3 |

-continued

|  | Ex. AA | Ex. BB | Ex. CC | Ex. DD | Ex. EE | Ex. FF | Ex. GG | Ex. HH | Ex. II |
|---|---|---|---|---|---|---|---|---|---|
| EPS | 0.6 | 0.8 | 0.9 | 1.8 | 1.7 | 2.2 | 3.0 | 3.0 | 2.9 |
| Water | 14.9 | 16.1 | 14.0 | 14.8 | 14.8 | 14.0 | 14.9 | 14.8 | 13.2 |
| Volume % | | | | | | | | | |
| Cement | 16.0 | 16.0 | 16.0 | 16.0 | 16.0 | 16.0 | 16.0 | 16.0 | 16.0 |
| Sand | 28.1 | 23.7 | 25.8 | 27.5 | 27.5 | 25.2 | 26.8 | 26.9 | 24.7 |
| EPS | 34.5 | 38.8 | 39.1 | 35.1 | 35.1 | 39.8 | 35.8 | 35.7 | 40.2 |
| Water | 21.4 | 21.4 | 19.1 | 21.4 | 21.4 | 19.1 | 21.4 | 21.4 | 19.1 |
| compressive strength (psi) | 1750 | 1650 | 1720 | 1770 | 2200 | 1740 | 1850 | 2400 | 2100 |
| density (pcf) | 93 | 87 | 89 | 90 | 92 | 88 | 89 | 90 | 90 |

The data shows that the average prepuff size required to provide maximum compressive strength compositions is dependant, to some degree, on the expansion factor of the prepuff. Focusing on average prepuff size alone does not provide a good indicator of maximum potential concrete strength. This point is illustrated by comparing examples BB and FF. Example FF (1.54 mm size) does not provide maximum compressive strength at an 18× expansion factor, yet it is near the maximum strength that can be obtained from beads expanded 48×.

Using a combination of prepuff size and expansion factor can provide an indicator for maximum concrete strength. As an example, example AA (prepuff size, 1.35 mm and expansion factor 48) provides 93 pcf concrete with a compressive strength of 1750 psi while a similarly sized prepuff, example 11 (prepuff size 1.41 mm and expansion factor 12) provides 90 pcf concrete with a significantly higher compressive strength of 2100 psi. Thus smaller prepuff size and a lower expansion factor can provide higher compressive strength in the present light weight concrete composition within an optimum range of prepuff particle size.

Example 14

Concrete with expanded slate as an aggregate was made using the ingredients shown in the table below.

The data indicates that while the EPS volume required to maintain approximately 90 pcf density concrete decreases somewhat linearly as the slate concentration increases; the present light weight concrete's strength increases exponentially as the amount of slate in the formulation increases. This relationship highlights the potentially significant impact of including aggregates in the present light weight concrete formulation and demonstrates the potential for optimizing the amount of EPS and aggregates in the formulation to maximize strength at a desired density. In addition, the cost of various components can also be included in such a design and the light weight concrete formulation can be optimized for both maximum strength and lowest cost.

Example 15

Concrete with unexpanded EPS (1037C) and no additional aggregate was made using the ingredients shown in the table below.

|  | Ex. JJ | Ex. KK | Ex. LL |
|---|---|---|---|
| bead size (mm) | 0.51 | 0.51 | 0.51 |
| Density (pcf) | 40 | 40 | 40 |

|  | Ex. JJ | Ex. KK | Ex. LL | Ex. MM | Ex. NN | Ex. OO | Ex. PP | Ex. QQ | Ex. RR |
|---|---|---|---|---|---|---|---|---|---|
| Starting Bead | F271T | F271T | F271T | F271T | F271T | F271T | F271T | F271T | F271T |
| bead size (mm) | 0.4 | 0.4 | 0.4 | 0.4 | 0.4 | 0.4 | 0.4 | 0.4 | 0.4 |
| Density (pcf) | 3.4 | 3.4 | 3.4 | 3.4 | 3.4 | 3.4 | 3.4 | 3.4 | 3.4 |
| Prepuff size (mm) | 0.87 | 0.87 | 0.87 | 0.87 | 0.87 | 0.87 | 0.87 | 0.87 | 0.87 |
| Expansion Factor | 18 | 18 | 18 | 18 | 18 | 18 | 18 | 18 | 18 |
| wt % | | | | | | | | | |
| Cement | 35.9 | 33.0 | 30.5 | 35.9 | 33.0 | 30.6 | 35.9 | 33.0 | 30.6 |
| Sand | 0 | 8.2 | 15.6 | 10.6 | 18.0 | 24.3 | 21.1 | 27.7 | 33.2 |
| EPS | 1.1 | 0.8 | 0.5 | 1.3 | 1.0 | 0.7 | 1.6 | 1.2 | 0.9 |
| Exp. Slate | 48.7 | 44.8 | 41.3 | 37.8 | 34.8 | 32.2 | 27.0 | 24.9 | 23.0 |
| Water | 14.4 | 13.2 | 12.2 | 14.4 | 13.2 | 12.2 | 14.4 | 13.2 | 12.2 |
| Volume % | | | | | | | | | |
| Cement | 16.0 | 16.0 | 16.0 | 16.0 | 16.0 | 16.0 | 16.0 | 16.0 | 16.0 |
| Sand | 0 | 4.5 | 9.3 | 5.3 | 9.8 | 14.3 | 10.6 | 15.1 | 19.6 |
| EPS | 19.9 | 15.5 | 10.7 | 24.6 | 20.2 | 15.7 | 29.3 | 24.9 | 20.4 |
| Exp. Slate | 45.0 | 45.0 | 45.0 | 35.0 | 35.0 | 35.0 | 25.0 | 25.0 | 25.0 |
| Water | 19.1 | 19.1 | 19.1 | 19.1 | 19.1 | 19.1 | 19.1 | 19.1 | 19.1 |
| 7 - day strength (psi) | 3220 | 3850 | 4070 | 2440 | 2890 | 3745 | 2300 | 2625 | 3695 |
| Density (pcf) | 92.8 | 98.5 | 102.7 | 90.7 | 96.8 | 101.5 | 88.1 | 94.5 | 101.3 |

-continued

|  | Ex. JJ | Ex. KK | Ex. LL |
|---|---|---|---|
| Expansion Factor | 1 | 1 | 1 |
| wt % | | | |
| Cement | 38.7 | 33.0 | 28.8 |
| Sand | 0 | 21.6 | 37.8 |
| EPS | 43.9 | 30.4 | 20.4 |
| Water | 17.4 | 14.9 | 13.0 |
| Volume % | | | |
| Cement | 16.0 | 16.0 | 16.0 |
| Sand | 0 | 11.8 | 23.6 |
| EPS | 62.6 | 50.7 | 38.9 |
| Slate | 21.4 | 21.4 | 21.4 |
| Water | 16.0 | 16.0 | 16.0 |
| compressive strength (psi) | 2558 | 2860 | 3100 |
| density (pcf) | 76 | 89 | 100 |

The data show that unexpanded polystyrene resin beads (~40 pcf bulk density) can provide a light weight concrete composition having surprisingly high compressive strength (2500-3200 psi) at low density (76-100 pcf).

Example 16

Prepuff from F271T bead expanded to 1.2 lb/ft$^3$, F271C bead expanded to 1.3 lb/ft$^3$ and M97BC bead expanded to 1.5 lb/ft$^3$ were evaluated using scanning electron microscopy (SEM). The surface and inner cells of each are shown in FIGS. 20 and 21 (F271T), 22 and 23 (F271C), and 24 and 25 (M97BC) respectively.

Figure 28:
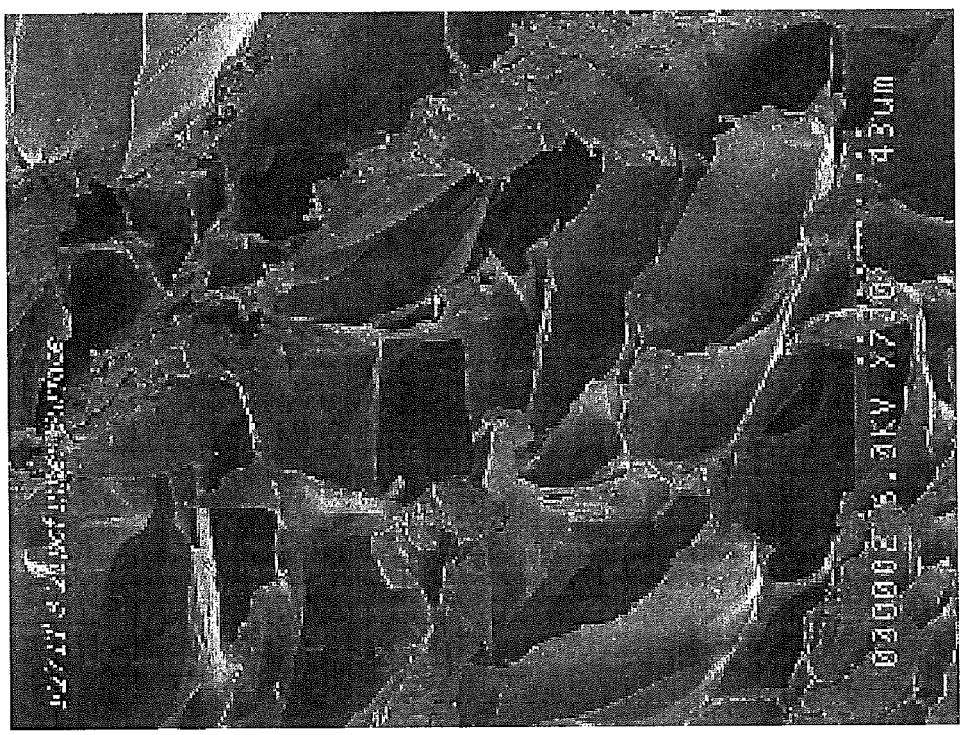
FIG. 28 is a scanning electron micrograph of the interior of a prepuff bead used in the invention.
Figure 27:
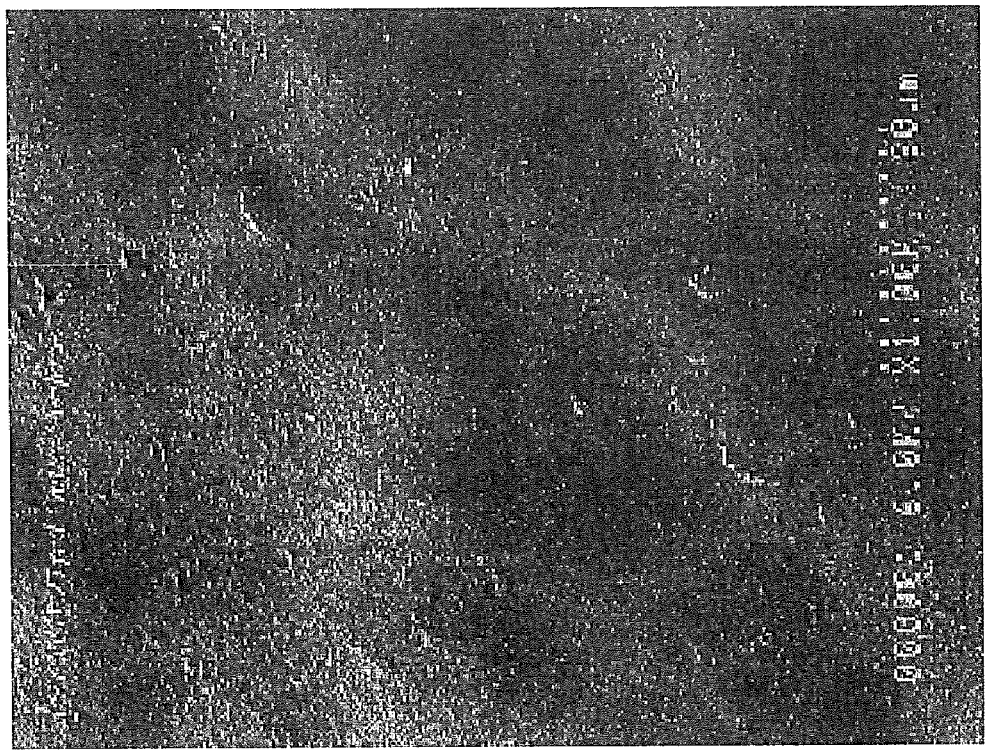
FIG. 27 is a scanning electron micrograph of the surface of a prepuff bead used in the invention.
Figure 30:
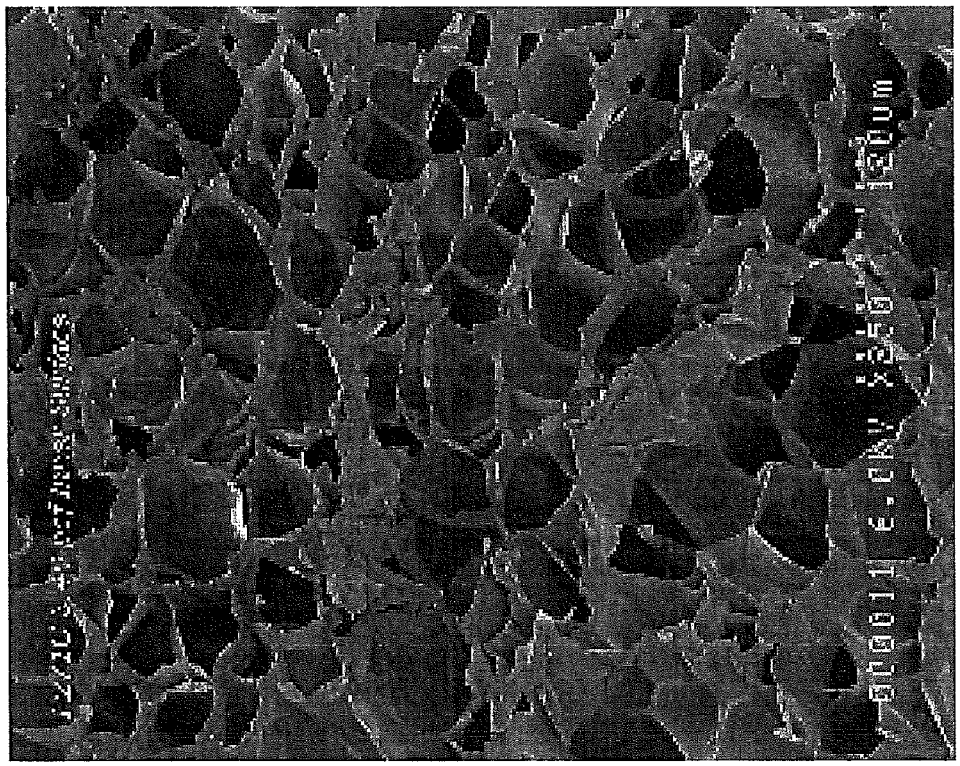
FIG. 30 is a scanning electron micrograph of the interior of a prepuff bead used in the invention.
Figure 29:
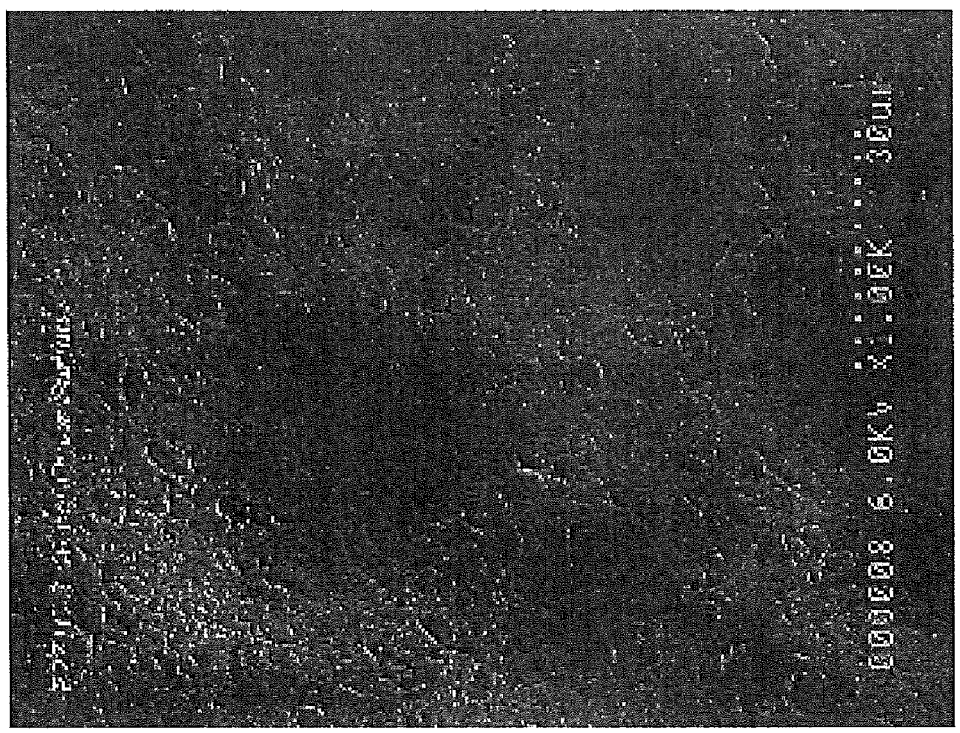
FIG. 29 is a scanning electron micrograph of the surface of a prepuff bead used in the invention.
Figure 32:
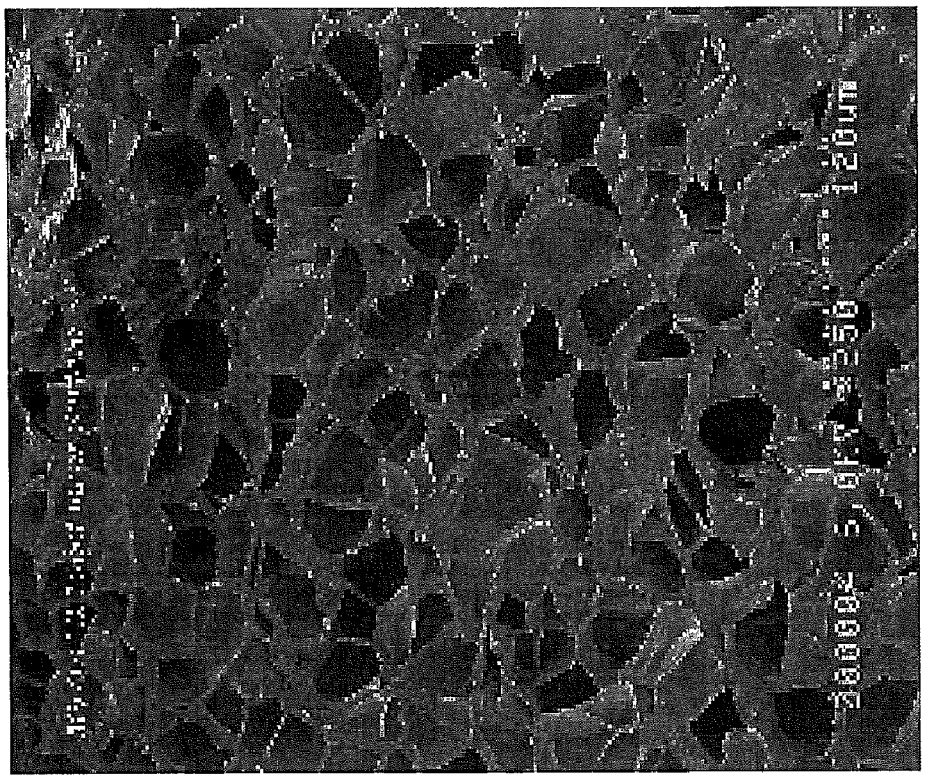
FIG. 32 is a scanning electron micrograph of the interior of a prepuff bead used in the invention.
Figure 31:
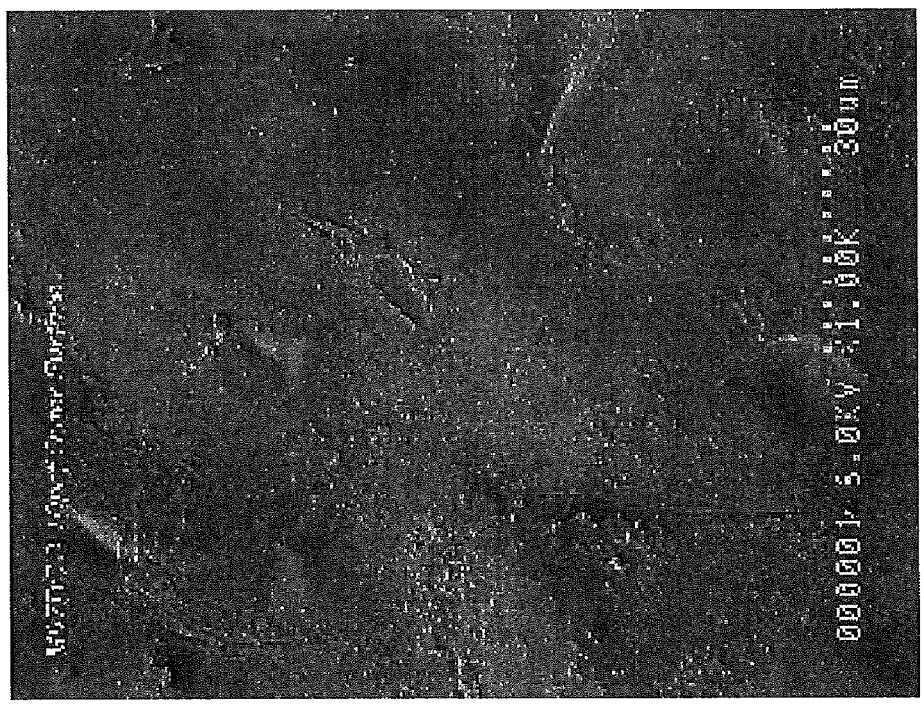
FIG. 31 is a scanning electron micrograph of the surface of a prepuff bead used in the invention.

As shown in FIGS. 25, 27 and 29, the external structure of the prepuff particles was generally sphereical in shape having a continuous surface outer surface or skin. As shown in FIGS. 26, 28 and 30, the internal cellular structure of the prepuff samples resembles a honeycomb-type structure.

The size of the prepuff particles was also measured using SEM, the results are shown in the table below.

|  | (microns) | | |
|---|---|---|---|
|  | T prepuff (1.2 pcf) | C prepuff (1.3 pcf) | BC prepuff (1.5 pcf) |
| Outer diameter | 1216 | 1360 | 1797 |
| Internal cell size | 42.7 | 52.1 | 55.9 |
| Internal cell wall | .42 | .34 | .24 |
| Cell wall/cell size | .0098 | .0065 | .0043 |

|  | C prepuff (3.4 pcf) | BC prepuff (3.1 pcf) |
|---|---|---|
| Outer diameter | — | 1133 | 1294 |
| Internal cell size | — | 38.2 | 31.3 |
| Internal cell wall | — | .26 | .47 |
| Cell wall/cell size | — | .0068 | 0.0150 |

Taken with all of the data presented above, the data provide an indication that internal cellular structure might affect the strength of a light weight concrete formulation.

When used in light weight concrete compositions, the prepuff particles can impact the overall strength of the concrete in two ways. First, the larger particles, which have a lower density, change the concrete matrix surrounding the prepuff particle and secondly, the lower density prepuff particle is less rigid due to the cell structure of the foamed particle. Since the strength of the concrete depends, at least to some extent, on the strength of the prepuff particles, increased prepuff particle strength should result in greater light weight concrete strength. The potential strength increase can be limited by the extent to which it impacts the concrete matrix. The data in the present examples suggest that the original bead particle size can be optimized to provide an optimally sized prepuff particle (which is controlled by the prepuff density), which results in the highest possible lightweight concrete strength.

In other words, within an optimum prepuff particle size and optimum density range, the wall thickness of the prepuff will provide sufficient support to allow the present light weight concrete composition to have better strength than light weight concrete compositions in the prior art.

The data presented herein demonstrate that unlike the presumption and approach taken in the prior art, expanded EPS particles can do surprisingly more than act simply as a void space in the concrete. More specifically, the structure and character of the prepuff particles used in the present invention can significantly enhance the strength of the resulting light weight concrete composition.

Example 17

This example demonstrates the use of fasteners with the present light weight concrete composition and related pull-out strength. This evaluation was used to compare the load capacity of a screw directly installed in the present light weight concrete (approximately 90 pcf) with conventional concrete fasteners installed in normal weight and traditional lightweight concrete.

Fastener pullout testing was performed on three types of concrete: normal weight, 143 pcf (sample MM, 140 pcf normal concrete), lightweight concrete using expanded slate (123 pcf) (sample NN, 120 pcf LWC), and lightweight concrete with EPS (87 pcf) (sample OO, 90 pcf LWC) made as described above according to the formulations in the following table.

|  | Sample MM 140 pcf | Sample NN 120 pcf | Sample OO 90 pcf |
|---|---|---|---|
| EPS bead size (mm) | — | — | 0.51 |
| density (pcf) | — | — | 3.37 |
| wt % | | | |
| cement | 20.2 | 24.8 | 32.9 |
| sand | 34.6 | 36.4 | 52.7 |
| EPS | — | — | 1.86 |
| ⅜" pea gravel | 37.6 | — | — |
| ½" expanded slate | — | 29.4 | — |
| Water | 7.7 | 9.41 | 12.51 |
| vol % | | | |
| cement | 16.0 | 16 | 16 |
| sand | 30.9 | 26.5 | 28.9 |
| EPS | — | — | 37 |
| ⅜" pea gravel | 35.0 | — | — |
| ½" expanded slate | — | 39.4 | — |
| Water | 18.1 | 18.1 | 18.12 |
| comressive strength (psi) | 4941 | 9107 | 2137 |
| density (pcf) | 143 | 123 | 87 |

An apparatus was built that allowed weights to be hung vertically from each fastener using gravity to apply a load in line with the axis of the fastener. The 90 pcf LWC had 2½" standard drywall screws directly installed to approximately 1½" depth. The 120 pcf LWC had two types of fasteners installed into predrilled holes: 2¾" TAPCON® metal screw-type masonry fastening anchors (Illinois Tool Works Inc., Glenview, Ill.) installed approximately 2" deep and standard 2¼" expanding wedge-clip bolt/nut anchors installed approximately 1¼" deep. The 140 pcf normal concrete also had two types of fasteners installed into predrilled holes: 2¾" TAPCON anchors installed approximately 2" deep and standard 2¼" expanding wedge-clip bolt/nut anchors installed approximately 1¼" deep. One of the drywall screws in the light weight concrete was backed out and re-installed into the same fastener hole for testing. Also one of the TAPCON screws was removed and reinstalled to evaluate any loss in capacity. The following tables show the data and loadings for each anchor/fastener tested.

| | | 90 pcf LWC Drywall Screw | | |
|---|---|---|---|---|
| Stone 1: | Screw Length (in) | Exposed (in) | Extract and re-install (in) | Strength (lb) |
| Screw B | 2.5 | 0.594 | 1.906 | 700 @ 30 sec. |

| | | 90 pcf LWC Drywall Screw | | |
|---|---|---|---|---|
| Stone 2: | Screw Length (in) | Exposed (in) | Installed (in) | Strength (lb) |
| Screw C | 2.5 | 1.031 | 1.469 | >740 >10 min. |

| | | 120 pcf LWC TAPCON Screws | | |
|---|---|---|---|---|
| Stone 3: | Screw Length (in) | Exposed (in) | Extract and re-install (in) | Strength (lb) |
| Screw C | 2.75 | 0.875 | 1.875 | >740 >10 min. |

| | | 120 pcf LWC Bolt/Sleeve/Nut | | |
|---|---|---|---|---|
| Stone 4: | Anchor Length (in) | Exposed (in) | Installed (in) | Strength (lb) |
| Anchor D | 2.25 | 0.875 | 1.375 | >740 >10 min. |

| | | 140 pcf normal concrete TAPCON Screws | | |
|---|---|---|---|---|
| Stone 5: | Screw Length (in) | Exposed (in) | Extract and re-install (in) | Strength (lb) |
| Screw C | 2.75 | 0.906 | 1.844 | >740 >10 min. |

| | | 140 pcf normal concrete Bolt/Sleeve/Nut | | |
|---|---|---|---|---|
| Stone 6: | Anchor Length (in) | Exposed (in) | Installed (in) | Strength (lb) |
| Anchor C | 2.25 | 1.094 | 1.156 | >740 >10 min. |

The holding power of the drywall screws in the 90 pcf LWC was surprisingly high as they did not easily break or tear from the concrete. The drywall screws were easy to install, only requiring a standard size electric drill. The gripping strength of the drywall screws in the 90 pcf LWC was such that if the applied drilling torque was not stopped before the screw head reached the surface of the concrete, the head of the screw would twist off. All of the fasteners held the 740 lbs. of load for at least 10 minutes except the backed out and re-inserted drywall screw in the 90 pcf LWC, which held 700 lbs. for 30 seconds before tearing loose from the concrete. This drywall screw did not break at the failure point, but pulled out of the concrete.

Taking the above data as a whole, it has been demonstrated that an optimum prepuff bead size exists (as a non-limiting example, approximately 450-550 μm resin beads expanded to an expansion factor of approximately 10-20 cc/g to a prepuff diameter of approximately 750 to 1400 μm for 90 pcf lightweight concrete) to maximize the compressive strength of the present light weight concrete formulations. The compressive strength of the present light weight concrete formulations can be increased by increasing the present EPS prepuff bead density. Unexpanded polystyrene resin (~40 pcf bulk density) yields LWC of high compressive strength (2500-3200 psi) considering the low density (76-100 pcf). Aggregates can be used in the present light weight concrete formulations. The present light weight concrete formulations, without course aggregates, provide a concrete composition, which may be directly fastened to using standard drills and screws. When the EPS prepuff beads are expanded to low bulk densities (for example <1 pcf), the beads have a weak internal cellular structure, which creates a weaker foam, and in turn provides a light weight concrete composition having a lower compressive strength.

Example 18

A lightweight gypsum composition according to the invention was prepared using SHEETROCK® general purpose joint compound (United States Gypsum Company Corp., Chicago, Ill.), a gypsum based composition reportedly having the following formula:
  Limestone or Dolomite or Gypsum (>45%)
  Water (>38%)
  Mica (<5%)
  Vinyl Acetate Polymer or Ethylene Vinyl Acetate Polymer (<5%)
  Attapulgite (<5%)
  Optionally Talc (<2%)

One part by volume of the joint compound and two parts by volume of the prepuff particles of sample A were blended in a mixer until a smooth uniform composition was obtained.

Lightweight gypsum board samples were prepared in a 12"×4.5" mold either ½" or ⅝" thick. Facing paper was used on each side (recycled 50 lb. acid free paper). One sheet of facing paper was placed in the mold, the mixture described above was placed in the mold to fill the volume of the mold and a second sheet of facing paper was placed over the light weight gypsum composition. The composition was allowed to set and dry at ambient conditions for several days until the weight of the sample did not change. The resulting board samples had similar physical properties to Type X gypsum board.

Control samples were factory produced ½" standard SHEETROCK gypsum board and ⅝" Type X SHEETROCK gypsum board from US Gypsum.

The center of samples (12"×4.5") were positioned 2.5" from the nozzle of a propane torch, which was burned for 90 minutes at 1760° C. The boards prepared from the present lightweight gypsum composition developed a honeycomb structure, with minimal crack development. The commercial sheetrock exhibited significant cracks in both the vertical and horizontal directions. Similar burn through patterns were observed on the non-flame side of all boards. Similar weight loss was observed by weighing the boards before and after the test (Type X 140 g before, 131 g after, 6.4% loss, lightweight gypsum boards according to the invention, 113 g before, 107 g after, 5.3% loss).

Standard 1¼" drywall screws were screwed directly into lightweight gypsum boards of the present invention as described above to a depth of ½". The screws could not be manually pulled from the drywall boards. Standard drywall screws screwed directly into the commercial samples to ½" depth could be manually pulled from the board samples.

The examples demonstrate that lightweight gypsum board according to the invention provides at least similar physical and burn properties to commercially available gypsum board, while demonstrating the added benefit of providing a wall surface that does not require the use of wall anchors in some instances.

The present invention has been described with reference to specific details of particular embodiments thereof. It is not intended that such details be regarded as limitations upon the scope of the invention except insofar as and to the extent that they are included in the accompanying claims.

We claim:

1. A lightweight cementitious composition comprising expandable polymer particles arranged in a cubic lattice;
   wherein the composition comprises
   from 22 to 90 volume percent of a cement composition, and
   from 10 to 78 volume percent of expandable polymer particles having a substantially continuous outer layer, an average particle diameter of from 0.2 mm to 8 mm, a bulk density of from 0.03 g/cc to 0.64 g/cc, and an aspect ratio of from 1 to 3;
   wherein the expandable polymer particles comprise expanded polymer particles having an inner cell wall thickness of at least 0.15 µm;
   wherein after the lightweight cementitious composition is set, has a compressive strength of at least 1700 psi as tested according to ASTM C39 after seven days; and
   wherein the cement is one or more selected from the group consisting of Portland cements, pozzolana cements, aluminous cements, magnesia cements, silica cements and slag cements.

2. The composition according to claim 1, wherein the expandable polymer particles comprise one or more polymers selected from the group consisting of homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

3. The composition according to claim 1, wherein the expandable polymer particles comprise expanded polymer particles prepared by expanding a polymer bead having an unexpanded average resin particle size of from about 0.2 mm to about 2 mm.

4. A lightweight cementitious composition comprising expandable polymer particles arranged in a hexagonal lattice;
   wherein the composition comprises
   from 22 to 90 volume percent of a cement composition, and
   from 10 to 78 volume percent of expandable polymer particles having a substantially continuous outer layer, an average particle diameter of from 0.2 mm to 8 mm, a bulk density of from 0.03 g/cc to 0.64 g/cc, and an aspect ratio of from 1 to 3;
   wherein the expandable polymer particles comprise expanded polymer particles having an inner cell wall thickness of at least 0.15 µm;
   wherein after the lightweight cementitious composition is set, has a compressive strength of at least 1700 psi as tested according to ASTM C39 after seven days; and
   wherein the cement is one or more selected from the group consisting of Portland cements, pozzolana cements, aluminous cements, magnesia cements, silica cements and slag cements.

5. The composition according to claim 4, wherein the expandable polymer particles comprise one or more polymers selected from the group consisting of homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

6. The composition according to claim 4, wherein the expandable polymer particles comprise expanded polymer particles prepared by expanding a polymer bead having an unexpanded average resin particle size of from about 0.2 mm to about 2 mm.

* * * * *